US012283743B2

(12) United States Patent
Wang et al.

(10) Patent No.: US 12,283,743 B2
(45) Date of Patent: Apr. 22, 2025

(54) ANTENNA APPARATUS AND ELECTRONIC DEVICE

(71) Applicant: HUAWEI TECHNOLOGIES CO., LTD., Shenzhen (CN)

(72) Inventors: Hanyang Wang, Reading (GB); Yuanpeng Li, Shenzhen (CN); Dawei Zhou, Shenzhen (CN); Le Chang, Shenzhen (CN); Hai Zhou, Reading (GB)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 211 days.

(21) Appl. No.: 17/773,381

(22) PCT Filed: Oct. 30, 2020

(86) PCT No.: PCT/CN2020/125466
§ 371 (c)(1),
(2) Date: Apr. 29, 2022

(87) PCT Pub. No.: WO2021/083362
PCT Pub. Date: May 6, 2021

(65) Prior Publication Data

US 2022/0407217 A1 Dec. 22, 2022

(30) Foreign Application Priority Data

Oct. 31, 2019 (CN) ......................... 201911054822.7

(51) Int. Cl.
*H01Q 1/24* (2006.01)
*H01Q 5/371* (2015.01)
*H01Q 9/04* (2006.01)

(52) U.S. Cl.
CPC ............ *H01Q 1/243* (2013.01); *H01Q 5/371* (2015.01); *H01Q 9/0421* (2013.01)

(58) Field of Classification Search
CPC ....... H01Q 1/243; H01Q 5/371; H01Q 9/0421
See application file for complete search history.

(56) References Cited

U.S. PATENT DOCUMENTS 6,043,786 A 3/2000 Vannatta et al.
6,130,651 A 10/2000 Yanagisawa et al.
(Continued)

FOREIGN PATENT DOCUMENTS

AU 2019100180 A4 3/2019
CN 1455970 A 11/2003
(Continued)

OTHER PUBLICATIONS

Geng Yanfeng et al., Design of Diffirential Dual-Fequency Filting-Antenna, Journal of Test and Measurement Technology, vol. 31, No. 4, 2017, with an English Abstract, 6 pages.

*Primary Examiner* — Hoang V Nguyen
*Assistant Examiner* — Aladdin Abdulbaki
(74) *Attorney, Agent, or Firm* — Rimon PC

(57) ABSTRACT

A single feed antenna design is conducted on a radiator of a specific shape (for example, a strip radiator or a slot radiator) to excite a plurality of antenna modes. For example, performing a feed design on a strip radiator may excite a CM wire antenna mode and a DM wire antenna mode. For another example, performing a feed design on a slot radiator may feed a CM slot antenna mode and a DM slot antenna mode. The antenna design may be used to cover a plurality of frequency bands when an antenna is miniaturized.

10 Claims, 57 Drawing Sheets

(56) References Cited

U.S. PATENT DOCUMENTS

| | | | | |
|---|---|---|---|---|
| 6,867,736 | B2 | 3/2005 | Faraone et al. | |
| 7,423,598 | B2 | 9/2008 | Bit-Babik et al. | |
| 8,830,131 | B1 | 9/2014 | Doane et al. | |
| 9,276,317 | B1 | 3/2016 | Zheng | |
| 9,368,863 | B2 | 6/2016 | Kwon | |
| 2004/0090372 | A1 | 5/2004 | Nallo et al. | |
| 2007/0240752 | A1 | 10/2007 | Yang | |
| 2008/0100516 | A1 | 5/2008 | Dinallo et al. | |
| 2008/0136727 | A1 | 6/2008 | Bit-Babik et al. | |
| 2008/0272971 | A1 | 11/2008 | Kanno | |
| 2009/0153407 | A1 | 6/2009 | Zhang et al. | |
| 2010/0033380 | A1 | 2/2010 | Pascolini et al. | |
| 2012/0149314 | A1* | 6/2012 | Shimasaki | H01P 5/00 343/843 |
| 2012/0274532 | A1* | 11/2012 | Kurashima | H01Q 9/145 343/848 |
| 2013/0120201 | A1* | 5/2013 | Park | H01Q 1/48 343/749 |
| 2013/0201074 | A1 | 8/2013 | Harper et al. | |
| 2016/0141750 | A1 | 5/2016 | Lankes et al. | |
| 2017/0162948 | A1 | 6/2017 | Wong et al. | |
| 2019/0237854 | A1 | 8/2019 | Li et al. | |

FOREIGN PATENT DOCUMENTS

| | | | |
|---|---|---|---|
| CN | 101710644 | A | 5/2010 |
| CN | 101821901 | A | 9/2010 |
| CN | 101989676 | A | 3/2011 |
| CN | 102299406 | A | 12/2011 |
| CN | 102299414 | A | 12/2011 |
| CN | 203312459 | U | 11/2013 |
| CN | 203932314 | U | 11/2014 |
| CN | 104425893 | A | 3/2015 |
| CN | 105027352 | A | 11/2015 |
| CN | 204793199 | U | 11/2015 |
| CN | 105144480 | A | 12/2015 |
| CN | 105406174 | A | 3/2016 |
| CN | 106134002 | A | 11/2016 |
| CN | 106537690 | A | 3/2017 |
| CN | 206163692 | U | 5/2017 |
| CN | 107394365 | A | 11/2017 |
| CN | 206639921 | U | 11/2017 |
| CN | 107611565 | A | 1/2018 |
| CN | 206976581 | U | 2/2018 |
| CN | 107959120 | A | 4/2018 |
| CN | 108470979 | A | 8/2018 |
| CN | 108631050 | A | 10/2018 |
| CN | 208078185 | U | 11/2018 |
| CN | 109348734 | A | 2/2019 |
| CN | 109449574 | A | 3/2019 |
| CN | 109462016 | A | 3/2019 |
| CN | 109546310 | A | 3/2019 |
| CN | 109586036 | A | 4/2019 |
| CN | 109687111 | A | 4/2019 |
| CN | 110085971 | A | 8/2019 |
| CN | 110364813 | A | 10/2019 |
| JP | H04134907 | A | 5/1992 |
| JP | 2002185238 | A | 6/2002 |
| JP | 2010288175 | A | 12/2010 |
| JP | 03204587 | U | 6/2016 |
| JP | 2019016838 | A | 1/2019 |
| KR | 20170018682 | A | 2/2017 |
| KR | 20170020013 | A | 2/2017 |
| KR | 20170067887 | A | 6/2017 |
| TW | 200501511 | A | 1/2005 |
| WO | 2018158096 | A1 | 9/2018 |
| WO | 2018194546 | A1 | 10/2018 |

* cited by examiner

Simulated S11

ANTENNA APPARATUS AND ELECTRONIC DEVICE

CROSS-REFERENCE TO RELATED APPLICATIONS

This application is a National Stage of International Patent Application No. PCT/CN2020/125466, filed on Oct. 30, 2020, which claims priority to Chinese Patent Application No. 201911054822.7, filed on Oct. 31, 2019. Both of the aforementioned applications are hereby incorporated by reference in their entireties.

TECHNICAL FIELD

The present disclosure relates to the field of antenna technologies, and in particular, to an antenna apparatus applied to an electronic device.

BACKGROUND

Multiple-input multiple-output (MIMO) technology plays a very important role in a 5th generation (5G) wireless communications system. However, it is still a great challenge for a mobile terminal such as a mobile phone to achieve good MIMO performance. One reason is that the very limited space in a mobile terminal limits the frequency band that a MIMO antenna can cover and its performance.

SUMMARY

Embodiments of the present disclosure provide an antenna apparatus, which can cover more frequency bands when an antenna is miniaturized.

According to a first aspect, embodiments of this application provides an electronic device, and the electronic device includes an antenna apparatus. The antenna apparatus may include a strip conductor, and a feed point and a ground point disposed on the strip conductor.

The feed point may be disposed at the middle position of the strip conductor. The feed point may be connected to a feed. The positive electrode of the feed may be connected to the feed point, and the negative electrode of the feed may be connected to ground (for example, a ground plate).

On the strip conductor, the ground point may be disposed in the vicinity of the feed point. The ground point may be connected to a grounding stub. The grounding stub may be configured to be connected to the ground (for example, a ground plate). Herein, vicinity may mean that the length between the feed point and a ground terminal A of the grounding stub is less than a quarter of an operating wavelength 1. That is, the sum of the distance $L_{BC}$ between the feed point and the ground point and the length $L_{CA}$ of the grounding stub is less than a quarter of the operating wavelength 1.

There are two currents with different frequencies on the strip conductor: a first current and a second current. Directions of the first current on two sides of the feed point are opposite, and directions of the second current on the two sides of the feed point are the same. The first current is a current of a CM wire antenna mode, and the second current is a current of a DM wire antenna mode. There are two currents with different frequencies on the strip conductor: the first current and the second current. Therefore, two different resonance frequencies may be generated on the strip conductor. In the first aspect, the first current may be referred to as a first current, and the second current may be referred to as a second current.

The operating wavelength 1 (that is, an operating wavelength of the CM wire antenna mode) may be calculated based on a frequency f1 of the first current. Specifically, an operating wavelength 1 of a radiated signal in the air may be calculated as follows: Wavelength=Speed of light/f1. An operating wavelength 1 of a radiated signal in a medium may be calculated as follows: Wavelength=(Speed of light/$\sqrt{\varepsilon}$)/f1, where $\varepsilon$ is a relative dielectric constant of the medium. In the first aspect, the operating wavelength 1 may be referred to as a first wavelength.

It may be learned that, in the antenna design solution provided in the first aspect, one strip conductor may be used to excite two wire antenna modes: the CM wire antenna mode and the DM wire antenna mode, to cover a plurality of frequency bands when an antenna is miniaturized.

With reference to the first aspect, in some embodiments, the electronic device may include the ground plate, and the grounding stub may be connected to the ground plate. A third current may be distributed on the ground plate, and a frequency of the third current is different from the frequencies of the first current and the second current, and may be lower than the frequencies of the first current and the second current.

With reference to the first aspect, in some embodiments, the electronic device may include a metal bezel, and the strip conductor is a part of the metal bezel of the electronic device. The part of the metal bezel may be located at the bottom of the electronic device or at the top of the electronic device.

With reference to the first aspect, in some embodiments, the grounding stub may connect the metal bezel and the ground plate, for example, may be a metal dome of the strip conductor disposed on the ground plate. The ground plate may include a printed circuit board PCB ground plate of the electronic device and a metal chassis of the electronic device.

With reference to the first aspect, in some embodiments, the feed point may deviate from the middle position of the strip conductor, to cover more frequency bands. In this case, the grounding stub may not need to be disposed in the vicinity of the feed point, that is, the grounding stub may be removed.

There may be more currents with different frequencies on the strip conductor.

According to a second aspect, embodiments of this application provides an electronic device, and the electronic device may include an antenna apparatus. The antenna apparatus may include a metal plate on which a slot is disposed.

An opening may be disposed at a middle position of a first side of the slot. At a first position of the slot, a positive electrode of a feed is connected to the first side of the slot, and a negative electrode of the feed is connected to a second side of the slot. The first position may be disposed in the vicinity of an opening 33. Herein, the vicinity may mean that a distance L3 between a feed position 35 and the opening 33 is less than a quarter of an operating wavelength 2. In the second aspect, the operating wavelength 2 may be referred to as a first wavelength.

On the metal plate, there are a first current and a second current surrounding the slot, frequencies of the first current and the second current are different, the first current is distributed in a same direction surrounding the slot, and the second current is distributed in opposite directions on two sides of the opening surrounding the slot. The first current is a current of a CM slot antenna mode, and the second current is a current of a DM slot antenna mode. The first wavelength is determined by a frequency of the first current.

It may be learned that, in the antenna design solution provided in the second aspect, one slotted conductor may be used to excite two slot antenna modes: the CM slot antenna mode and the DM slot antenna mode, to cover a plurality of frequency bands when an antenna is miniaturized.

With reference to the second aspect, in some embodiments, the electronic device may include a ground plate, and the metal plate may be the ground plate. The ground plate may include a printed circuit board PCB ground plate of the electronic device and a metal chassis of the electronic device.

According to a third aspect, embodiments of this application provides an electronic device, and the electronic device includes an antenna apparatus. The antenna apparatus may include at least one wire antenna and a slot antenna, and the slot antenna may include a metal plate on which a slot is disposed.

A feed may be connected at a middle position of the slot antenna, a positive electrode of the feed is connected to one side of the slot, and a negative electrode of the feed is connected to the other side of the slot. The wire antenna may be parallel to a plane on which the metal plate is located, an intersecting part of a projection of the wire antenna on the metal plate and the slot may be located at a middle position of the projection, a distance between the intersecting part and the middle position of the slot antenna may be less than half of a first wavelength. The first wavelength is an operating wavelength of the slot antenna.

A first current surrounding the slot may be distributed on the slot antenna, and directions of the first current on two sides of the middle position of the slot antenna are opposite; and a second current is distributed in a same direction on the wire antenna.

It may be learned that, in the antenna design solution provided in the third aspect, the fed slot antenna works in a DM slot antenna mode, and may be further coupled to one or more wire antennas that work in a DM wire antenna mode, to cover a plurality of frequency bands. In addition, the wire antenna may be designed as a floating antenna disposed on a rear cover, does not occupy design space in the electronic device, and is little affected by an internal component.

With reference to the third aspect, in some embodiments, a distance between the wire antenna and the plane on which the metal plate is located may be less than a first distance, for example, less than 1 millimeter. It should be understood that a smaller coupling distance leads to a stronger coupling effect. A specific value of the coupling distance is not limited in this application, provided that the slot antenna can be coupled to the floating wire antenna.

With reference to the third aspect, in some embodiments, the at least one wire antenna may be two or more wire antennas of different lengths. Projections of the two or more wire antennas on the metal plate may be parallel to each other. The two or more wire antennas may be located on a first plane, and the first plane may be parallel to the plane on which the metal plate is located. Because the two or more wire antennas have different lengths, frequencies of the second current distributed on the two or more wire antennas are also different.

With reference to the third aspect, in some embodiments, the wire antenna may be a floating antenna, and may be disposed on an inner surface of the rear cover, or disposed on an outer surface of the rear cover, or built in the rear cover. For example, the wire antenna may be a metal strip pasted on the inner surface of the rear cover, or may be printed on the inner surface of the rear cover by using conductive silver paste.

With reference to the third aspect, in some embodiments, the electronic device may include a ground plate, and the metal plate may be the ground plate. The ground plate may include a printed circuit board PCB ground plate of the electronic device and a metal chassis of the electronic device.

According to a fourth aspect, embodiments of this application provides an electronic device, and the electronic device includes an antenna apparatus. The antenna apparatus may include a wire antenna and a slot antenna.

A feed may be connected at a middle position of the wire antenna, that is, a feed position of the wire antenna may be the middle position of the wire antenna. Specifically, a positive electrode of the feed may be connected to one side of the middle position, and a negative electrode of the feed may be connected to the other side of the middle position. The slot antenna may include a metal plate and a slot. The slot antenna may be formed by slotting the metal plate (for example, a PCB ground plate). The slot may be filled with materials such as a polymer, glass, ceramics, or a combination of these materials.

The wire antenna may be parallel to a plane on which the slot antenna is located, and perpendicular to the slot of the slot antenna. The plane may be referred to as a slotted plane, that is, a plane on which the metal plate is located. A projection of the wire antenna on the slotted plane and the slot of the slot antenna may intersect at a middle position of the projection. A distance L6 between an intersecting part A, of the projection of the wire antenna on the slotted plane and the slot, and a middle position B of the slot antenna may be greater than an eighth of an operating wavelength 4 and less than half of the operating wavelength 4. The operating wavelength 4 is an operating wavelength of the slot antenna. In the fourth aspect, the operating wavelength 4 may be referred to as a first wavelength.

A current surrounding the slot is distributed on the slot antenna in opposite directions on two sides of the middle position of the slot antenna, and a current is distributed on the wire antenna in a same direction on two sides of the middle position.

It may be learned that, in the antenna design solution provided in the fourth aspect, the fed wire antenna works in a DM wire antenna mode, and may be further coupled to the slot antenna that works in a DM slot antenna mode, to cover a plurality of frequency bands. The wire antenna may be designed as a floating antenna disposed on a rear cover, does not occupy design space in the electronic device, and is little affected by internal components. In the antenna structure, the fed wire antenna may be further coupled to more slot antennas of different sizes, to cover more frequency bands.

With reference to the fourth aspect, in some embodiments, the wire antenna may be a floating antenna, and may be disposed on an inner surface of the rear cover, or disposed on an outer surface of the rear cover, or built in the rear cover. For example, the wire antenna may be a metal strip pasted on the inner surface of the rear cover, or may be printed on the inner surface of the rear cover by using conductive silver paste.

With reference to the fourth aspect, in some embodiments, the electronic device may include a ground plate, and the metal plate may be the ground plate. The ground plate may include a printed circuit board PCB ground plate of the electronic device and a metal chassis of the electronic device.

According to a fifth aspect, embodiments of this application provides an electronic device, and the electronic device includes an antenna apparatus. The antenna apparatus may include a wire antenna and a slot antenna.

The wire antenna has a feed point, and the feed point may be disposed at a middle position of the wire antenna. The feed point is connected to a positive electrode of a feed, and a negative electrode of the feed is connected to ground. The slot antenna may include a metal plate on which a slot is disposed, and an opening may be disposed at a middle position of a first side of the slot.

At the middle position of the wire antenna, the wire antenna may be perpendicular to a plane on which the metal plate is located. The positive electrode of the feed connected to the wire antenna is located on one side of the opening, and the negative electrode of the feed connected to the wire antenna is located on the other side of the opening.

A current surrounding the slot may be distributed in a same direction on the slot antenna, and a current may be distributed on the wire antenna in opposite directions on two sides of the middle position of the wire antenna.

It may be learned that, in the antenna design solution provided in the fifth aspect, the fed wire antenna works in a CM wire antenna mode, and may be further coupled to the slot antenna that works in a CM slot antenna mode, to cover a plurality of frequency bands. In the antenna structure, the fed wire antenna may be further coupled to more slot antennas of different sizes, to cover more frequency bands.

With reference to the fifth aspect, in some embodiments, the electronic device may include a ground plate, and the metal plate may be the ground plate. The ground plate may include a printed circuit board PCB ground plate of the electronic device and a metal chassis of the electronic device.

According to a sixth aspect, embodiments of this application provide an electronic device, and the electronic device includes an antenna apparatus. The antenna apparatus may include a wire antenna and a slot antenna, and the slot antenna includes a metal plate on which a slot is disposed.

An opening may be disposed at a middle position of a first side of the slot, a feed may be connected at the opening, a positive electrode of the feed is connected to one side of the opening, and a negative electrode of the feed is connected to the other side of the opening.

At a middle position of the wire antenna, the wire antenna may be perpendicular to a plane on which the metal plate is located. A positive electrode of a feed connected to the wire antenna may be located on one side of the opening, and a negative electrode of the feed connected to the wire antenna may be located on the other side of the opening.

A current surrounding the slot may be distributed in a same direction on the slot antenna, and a current may be distributed on the wire antenna in opposite directions on two sides of the middle position.

It may be learned that, in the antenna design solution provided in the sixth aspect, the fed slot antenna works in a CM slot antenna mode, and may be further coupled to the wire antenna that works in a CM wire antenna mode, to cover a plurality of frequency bands.

With reference to the sixth aspect, in some embodiments, the electronic device may include a ground plate, and the metal plate may be the ground plate. The ground plate may include a printed circuit board PCB ground plate of the electronic device and a metal chassis of the electronic device.

According to a seventh aspect, embodiments of this application provides an electronic device, and the electronic device includes an antenna apparatus. The antenna apparatus may include a wire antenna and a slot antenna.

The wire antenna may have a feed point, and the feed point may be disposed at a middle position of the wire antenna. The feed point is connected to a positive electrode of a feed, and a negative electrode of the feed is connected to ground. The slot antenna may include a metal plate on which a slot is disposed.

The wire antenna may be parallel to the slot antenna, and a connection line between the middle position of the wire antenna and a middle position of the slot antenna may be perpendicular to both the wire antenna and the slot antenna.

A current may be distributed on the wire antenna in opposite directions on two sides of the middle position, and a current surrounding the slot may be distributed on the slot antenna in opposite directions on two sides of the middle position of the slot antenna.

It may be learned that, in the antenna design solution provided in the seventh aspect, the fed wire antenna works in a CM wire antenna mode, and may be further coupled to the slot antenna that works in a DM slot antenna mode, to cover a plurality of frequency bands. In the antenna structure, the fed wire antenna may be further coupled to more slot antennas of different sizes, to cover more frequency bands.

With reference to the seventh aspect, in some embodiments, the electronic device may include a ground plate, and the metal plate may be the ground plate. The ground plate may include a printed circuit board PCB ground plate of the electronic device and a metal chassis of the electronic device.

According to an eighth aspect, embodiments of this application provides an electronic device, and the electronic device includes an antenna apparatus. The antenna apparatus may include a wire antenna and a slot antenna.

The slot antenna may include a metal plate on which a slot is disposed. A feed may be connected at a middle position of the slot antenna, a positive electrode of the feed is connected to one side of the slot antenna, and a negative electrode of the feed is connected to the other side of the slot antenna.

The wire antenna may be parallel to the slot antenna, and a connection line between a middle position of the wire antenna and the middle position of the slot antenna may be perpendicular to both the wire antenna and the slot antenna.

A current may be distributed on the wire antenna in opposite directions on two sides of the middle position, and a current surrounding the slot may be distributed on the slot antenna in opposite directions on two sides of the middle position of the slot antenna.

It may be learned that, in the antenna design solution provided in the eighth aspect, the fed slot antenna works in a DM slot antenna mode, and may be further coupled to the wire antenna that works in a CM wire antenna mode, to cover a plurality of frequency bands. In the antenna structure, the fed slot antenna may be further coupled to more wire antennas of different sizes, to cover more frequency bands.

With reference to the eighth aspect, in some embodiments, the electronic device may include a ground plate, and the metal plate may be the ground plate. The ground plate may include a printed circuit board PCB ground plate of the electronic device and a metal chassis of the electronic device.

According to a ninth aspect, embodiments of this application provides an electronic device, and the electronic device includes an antenna apparatus. The antenna apparatus may include a wire antenna and a slot antenna.

A feed may be connected at a middle position of the wire antenna, a positive electrode of the feed is connected to one side of the middle position, and a negative electrode of the feed is connected to the other side of the middle position. The slot antenna may include a metal plate on which a slot is disposed, and an opening may be disposed at a middle position of a first side of the slot.

The wire antenna may be parallel to the slot antenna, and a connection line between the middle position of the wire antenna and a middle position of the slot antenna may be perpendicular to both the wire antenna and the slot antenna.

A current may be distributed on the wire antenna in a same direction on two sides of the middle position of the wire antenna, and a current surrounding the slot may be distributed in a same direction on the slot antenna.

It may be learned that, in the antenna design solution provided in the ninth aspect, the fed wire antenna works in a DM wire antenna mode, and may be further coupled to the slot antenna that works in a CM slot antenna mode, to cover a plurality of frequency bands. The wire antenna may be designed as a floating antenna disposed on a rear cover, does not occupy design space in the electronic device, and is little affected by internal components. In the antenna structure, the fed wire antenna may be further coupled to more slot antennas of different sizes, to cover more frequency bands.

With reference to the ninth aspect, in some embodiments, the electronic device may include a ground plate, and the metal plate may be the ground plate. The ground plate may include a printed circuit board PCB ground plate of the electronic device and a metal chassis of the electronic device.

According to a tenth aspect, embodiments of this application provides an electronic device, and the electronic device includes an antenna apparatus. The antenna apparatus may include a wire antenna and a slot antenna.

The slot antenna includes a metal plate on which a slot may be disposed, and an opening may be disposed at a middle position of a first side of the slot. A feed may be connected at the opening, a positive electrode of the feed is connected to one side of the opening, and a negative electrode of the feed is connected to the other side of the opening.

The wire antenna may be parallel to the slot antenna, and a connection line between a middle position of the wire antenna and a middle position of the slot antenna may be perpendicular to both the wire antenna and the slot antenna.

A current may be distributed on the wire antenna in a same direction on two sides of the middle position of the wire antenna, and a current surrounding the slot may be distributed in a same direction on the slot antenna.

It may be learned that, in the antenna design solution provided in the tenth aspect, the fed slot antenna works in a CM slot antenna mode, and may be further coupled to the wire antenna that works in a DM wire antenna mode, to cover a plurality of frequency bands. The wire antenna may be designed as a floating antenna disposed on a rear cover, does not occupy design space in the electronic device, and is little affected by internal components. In the antenna structure, the fed wire antenna may be further coupled to more slot antennas of different sizes, to cover more frequency bands.

With reference to the tenth aspect, in some embodiments, the electronic device may include a ground plate, and the metal plate may be the ground plate. The ground plate may include a printed circuit board PCB ground plate of the electronic device and a metal chassis of the electronic device.

According to an eleventh aspect, embodiments of this application provides an electronic device, and the electronic device includes an antenna apparatus. The antenna apparatus may include a strip and a slot.

The strip and the slot may be parallel to each other. The slot may be formed by slotting a ground plate. A first side of the slot is close to the strip, and an opening may be disposed on the first side. The opening may be disposed at the middle position of the first side, or may be disposed at a position deviating from the middle position.

The strip may have a connection point B, and may be connected to a grounding stub at the connection point B. The grounding stub may be configured to connect the first side of the slot and the strip at one end (an end C) of the opening. A feed point A may be disposed on the strip, and the feed point A may be configured to be connected to a feed. Specifically, the positive electrode of the feed is connected to the feed point A, and the negative electrode of the feed is connected to the first side of the slot at the other end (an end D) of the opening.

The distance L8 between the feed point A and the connection point B on the strip may be less than a quarter of an operating wavelength 5. The operating wavelength 5 is an operating wavelength of the strip, that is, an operating wavelength of a CM wire antenna mode. In the eleventh aspect, the operating wavelength 5 may be referred to as a first wavelength.

A current is distributed in the same direction on the strip, and a current surrounding the slot is distributed in the same direction on a metal plate.

It may be learned that, in the antenna design solution provided in the eleventh aspect, a CM wire antenna and a CM slot antenna are combined, to obtain an antenna structure having strip features of both the CM wire antenna and the CM slot antenna. A single feed design may be used to excite the CM wire antenna mode and a CM slot antenna mode, to cover a plurality of frequency bands.

According to a twelfth aspect, embodiments of this application provides an electronic device, and the electronic device includes an antenna apparatus. The antenna apparatus may include a strip conductor and a slot.

The slot may be disposed on the strip conductor, and a slotting direction of the slot may be perpendicular to an extension direction of the strip conductor. The slot may be perpendicular to the strip conductor at a middle position of the strip conductor. A feed may be connected at a middle position of the slot, a positive electrode of the feed is connected to one side of the slot, and a negative electrode of the feed is connected to the other side of the slot.

A current may be distributed on the strip conductor in a same direction on two sides of the middle position of the slot, and a current surrounding the slot may be further distributed on the strip conductor in opposite directions on the two sides of the middle position of the slot.

It may be learned that, in the antenna design solution provided in the twelfth aspect, the strip conductor may be slotted to have strip features of both a DM wire antenna and a DM slot antenna, and a feed design may be used to excite two slot antenna modes: a DM wire antenna mode and a DM slot antenna mode, to cover a plurality of frequency bands when an antenna is miniaturized.

According to a thirteenth aspect, embodiments of this application provides an electronic device, and the electronic device includes an antenna apparatus. The antenna apparatus may include a strip and a slot.

The strip and the slot are parallel to each other. The slot is disposed on a metal plate. A first strip is connected at a middle position of the strip, and the first strip is configured to be connected to a first side of the slot. A feed is connected at a middle position of the slot, a positive electrode of the feed is connected to the first side of the slot, and a negative electrode of the feed is connected to a second side of the slot.

A current is distributed on the strip in opposite directions on two sides of the middle position of the strip, and a current surrounding the slot is distributed on the metal plate in opposite directions on two sides of the middle position of the slot.

It may be learned that, in the antenna design solution provided in Embodiment 13, an antenna structure having strip features of both a CM wire antenna and a DM slot antenna may be used in combination with a single feed design to excite a CM wire antenna mode and a DM slot antenna mode, to cover a plurality of frequency bands.

According to a fourteenth aspect, embodiments of this application provides an electronic device, and the electronic device includes an antenna apparatus. The antenna apparatus may include a strip and a slot.

The strip and the slot may be parallel to each other. The slot may be formed by slotting a ground plate. A first side of the slot is close to the strip, and an opening may be disposed on the first side. The opening may be disposed at the middle position of the first side, or may be disposed at a position deviating from the middle position.

The strip may have a first connection point and a second connection point. The strip may be connected to a first strip at the first connection point, and the strip may be connected to a second strip at the second connection point. The first strip may be configured to connect the first side of the slot and the strip at one end (an end C) of the opening. The second strip may be configured to connect the first side of the slot and the strip at the other end (an end D) of the opening.

A feed may be connected at the opening. At the opening, a positive electrode of the feed is connected to the first strip at one end (the end C) of the opening, and a negative electrode of the feed is connected to the second strip at the other end (the end D) of the opening.

A current is distributed in a same direction on the strip, and a current surrounding the slot is distributed in a same direction on a metal plate.

It may be learned that, in the antenna design solution provided in the fourteenth aspect, a DM wire antenna and a CM slot antenna are combined, to obtain an antenna structure having strip features of both the DM wire antenna and the CM slot antenna. A single feed design may be used to excite a DM wire antenna mode and a CM slot antenna mode, to cover a plurality of frequency bands.

BRIEF DESCRIPTION OF DRAWINGS

To describe technical solutions in embodiments of this application more clearly, the following describes accompanying drawings used in embodiments of this application.

DESCRIPTION OF EMBODIMENTS

The following describes embodiments of the present disclosure with reference to the accompanying drawings in embodiments of the present disclosure.

The technical solutions provided in embodiments of this application are applicable to an electronic device that uses one or more of the following communications technologies: a Bluetooth (BT) communications technology, a global positioning system (GPS) communications technology, a wireless fidelity (Wi-Fi) communications technology, a global system for mobile communications (GSM) communications technology, a wideband code division multiple access (WCDMA) communications technology, a long term evolution (LTE) communications technology, a 5G communications technology, a SUB-6G communications technology, and other future communications technologies. In the embodiments of this application, the electronic device may be a mobile phone, a tablet computer, a personal digital assistant (PDA), or the like.

Figure 1:
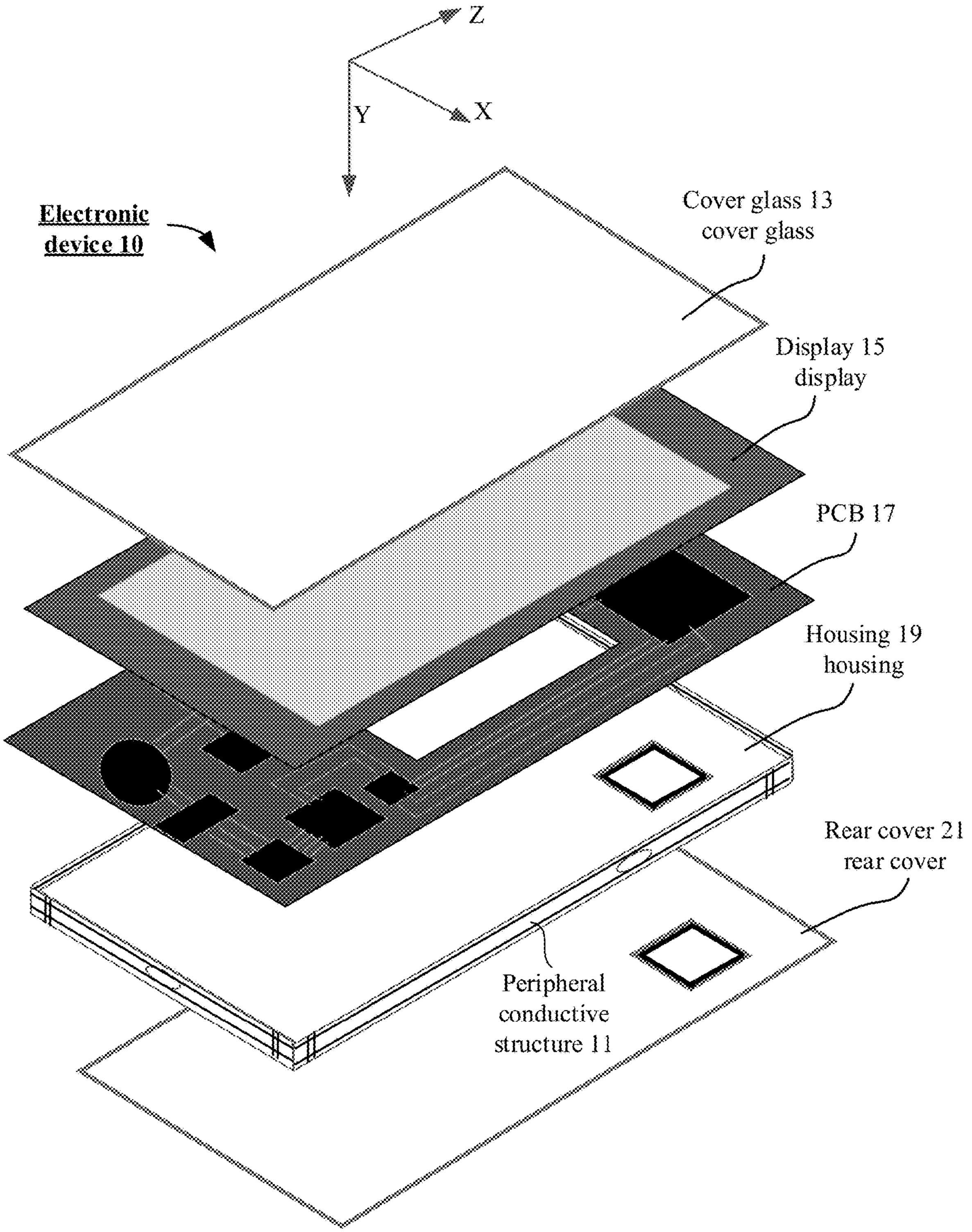
FIG. 1 is a schematic diagram of a structure of an electronic device on which an antenna design solution according to an embodiment of this application is based.

FIG. 1 shows an example of an internal environment of an electronic device on which an antenna design solution provided in an embodiment of this application is based. As shown in FIG. 1, an electronic device 10 may include a cover glass 13, a display 15, a printed circuit board PCB 17, a housing 19, and a rear cover 21.

The cover glass 13 may be disposed close to the display 15, and may be mainly configured to protect the display 15 against dust.

The printed circuit board PCB 17 may be an FR-4 dielectric board, or may be a Rogers dielectric board, or may be a dielectric board mixing Rogers and FR-4, or the like. Herein, FR-4 is a grade designation for a flame-retardant material, and the Rogers dielectric board is a high-frequency board. A metal layer may be disposed on a side that is of the printed circuit board PCB 17 and that is close to the housing 19, and the metal layer may be formed by etching metal on a surface of the PCB 17. The metal layer may be configured to ground an electronic element carried on the printed circuit board PCB 17, to prevent a user from an electric shock or prevent device damage. The metal layer may be referred to as a PCB ground plate. In addition to the PCB ground plate, the electronic device 10 may have another ground plate used for grounding, for example, a metal chassis.

The housing 19 is mainly configured to support the entire system. The housing 19 may include a peripheral conductive structure 11, and the structure 11 may be made of a conductive material such as metal. The structure 11 may extend around a periphery of the electronic device 10 and the display 15. Specifically, the structure 11 may surround four sides of the display 15 to help fix the display 15. In an implementation, the structure 11 made of a metal material may be directly used as a metal bezel of the electronic device 10 to form an appearance of the metal bezel, and is applicable to a metal ID. In another implementation, a non-metallic bezel such as a plastic bezel may be further disposed on an outer surface of the structure 11 to form an appearance of the non-metallic bezel, and is applicable to a non-metallic ID.

The rear cover 21 may be a rear cover made of a metal material, or may be a rear cover made of a non-conductive material, such as a glass rear cover, a plastic rear cover, or another non-metallic rear cover.

FIG. 1 only schematically shows some components included in the electronic device 10, and actual shapes, actual sizes, and actual structures of these components are not limited by FIG. 1.

To bring a more comfortable visual feeling to the user, the electronic device 10 may use a bezel-less screen industrial design (ID). A bezel-less screen means a very large screen-to-body ratio (usually over 90%). A width of a bezel of the bezel-less screen is greatly reduced, and internal components of the electronic device 10, such as a front-facing camera, a phone receiver, a fingerprint sensor, and an antenna, need to be rearranged. Especially for an antenna design, a clearance area is reduced and antenna space is further compressed. However, a size, a bandwidth, and efficiency of an antenna are correlated with each other and affect each other. If the size (space) of the antenna is reduced, the efficiency-bandwidth product of the antenna is definitely reduced.

The antenna design solution provided in an embodiment of this application may implement a miniaturized multimode antenna, which may cover more frequency bands.

First, four antenna modes are described in the embodiments of this application.

1. Common Mode (CM) Wire Antenna Mode

Figure 2A:
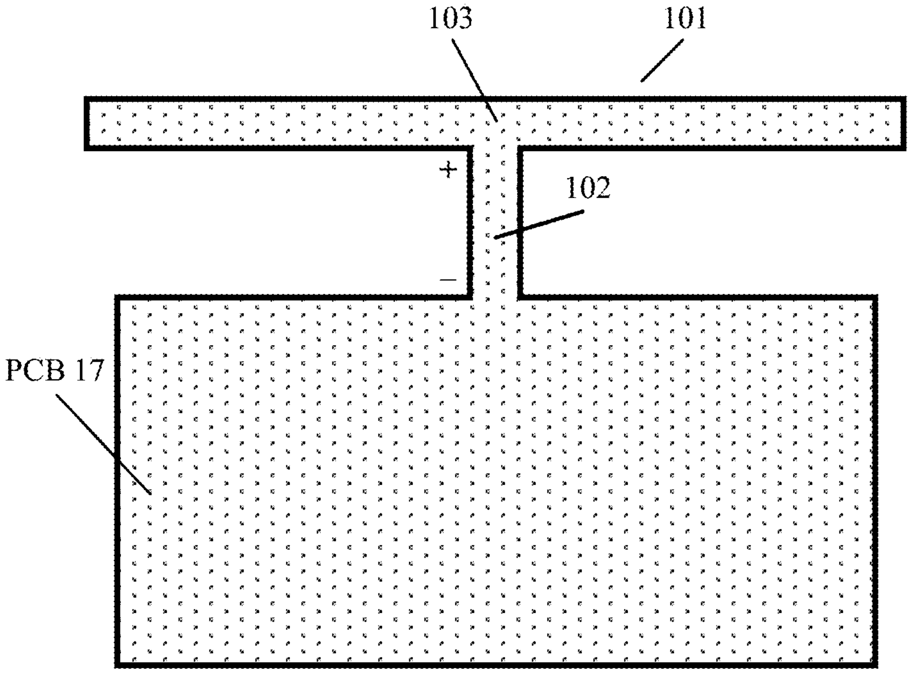
FIG. 2A shows a CM wire antenna according to an embodiment of this application.

As shown in FIG. 2A, a wire antenna 101 is connected to a feed at a middle position 103. A positive electrode of the feed is connected to the middle position 103 of the wire antenna 101, and a negative electrode of the feed is connected to ground (for example, a ground plate).

Figure 2B:
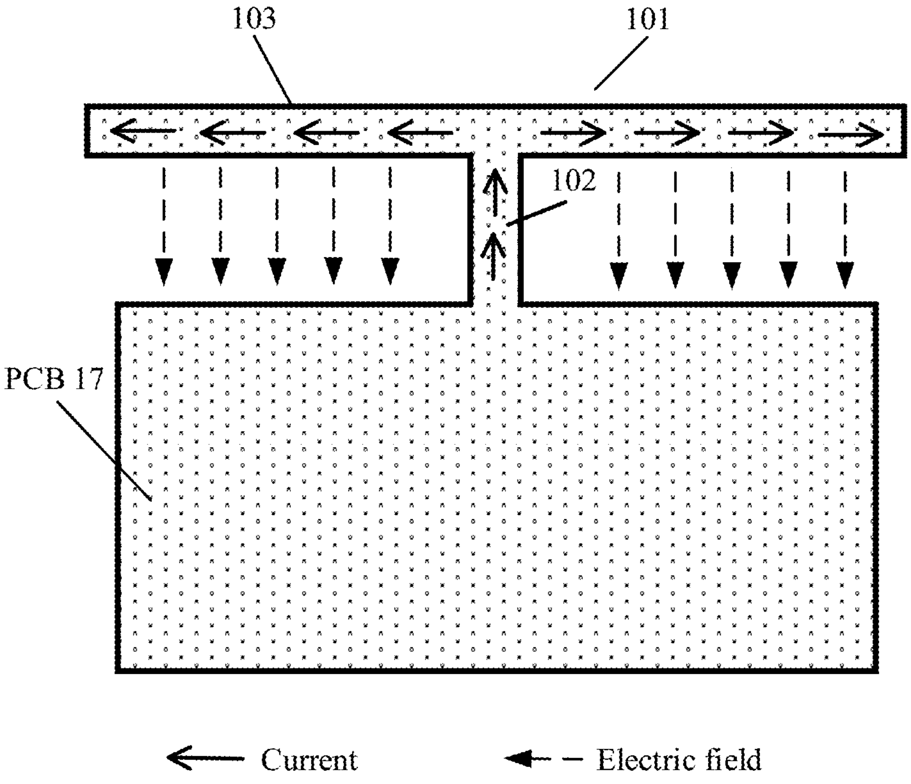
FIG. 2B shows a schematic diagram of current and electric field distribution in a CM wire antenna mode according to an embodiment of this application.

FIG. 2B shows current and electric field distribution of the wire antenna 101. As shown in FIG. 2B, a current is symmetrically distributed in opposite directions on two sides of the middle position 103, and an electric field is distributed in a same direction on the two sides of the middle position 103. As shown in FIG. 2B, a current at a feed position 102 is distributed in a same direction. Based on the current distribution in the same direction at the feed position 102, feeding shown in FIG. 2A may be referred to as wire antenna CM feeding. A wire antenna mode shown in FIG. 2B may be referred to as a CM wire antenna mode. The current and the electric field that are shown in FIG. 2B may be respectively referred to as a current and an electric field of the CM wire antenna mode.

The current and the electric field of the CM wire antenna mode are generated by two horizontal strips of the wire antenna 101 on the two sides of the middle position 103 as quarter-wavelength antennas. The current is strong at the middle position 103 of the wire antenna 101 and weak at two ends of the wire antenna 101. The electric field is weak at the middle position 103 of the wire antenna 101 and strong at the two ends of the wire antenna 101.

2. Differential Mode (DM) Wire Antenna Mode

Figure 3A:
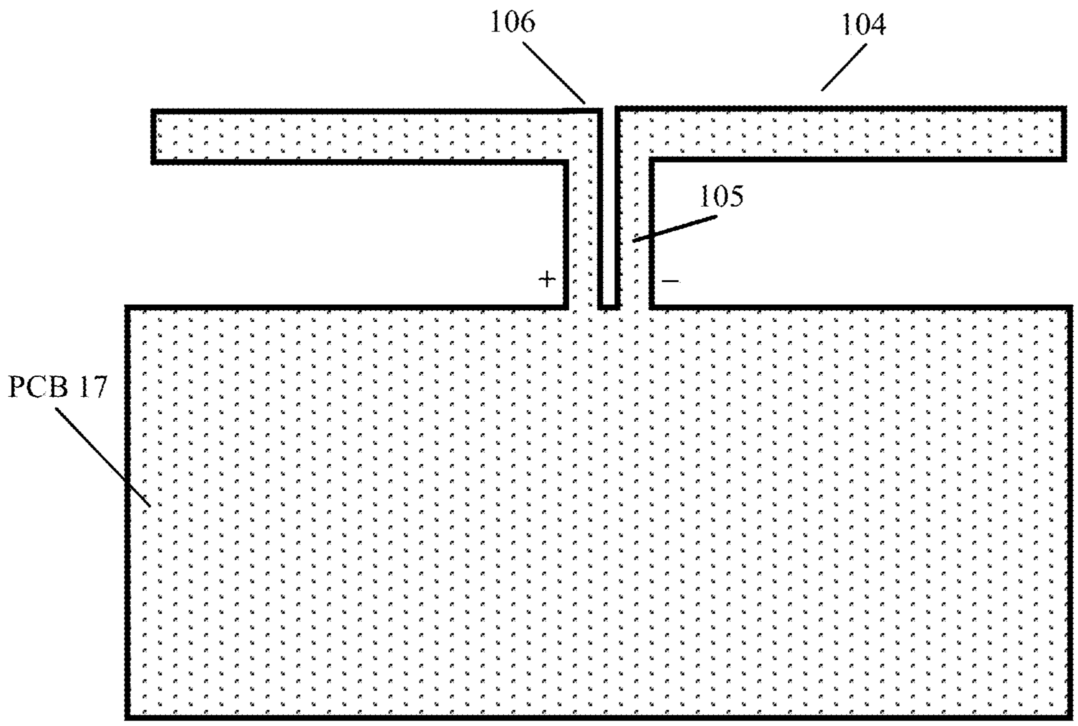
FIG. 3A shows a DM wire antenna according to an embodiment of this application.

As shown in FIG. 3A, a wire antenna 104 is connected to a feed at a middle position 106. A positive electrode of the feed is connected to one side of the middle position 106, and a negative electrode of the feed is connected to the other side of the middle position 106.

Figure 3B:
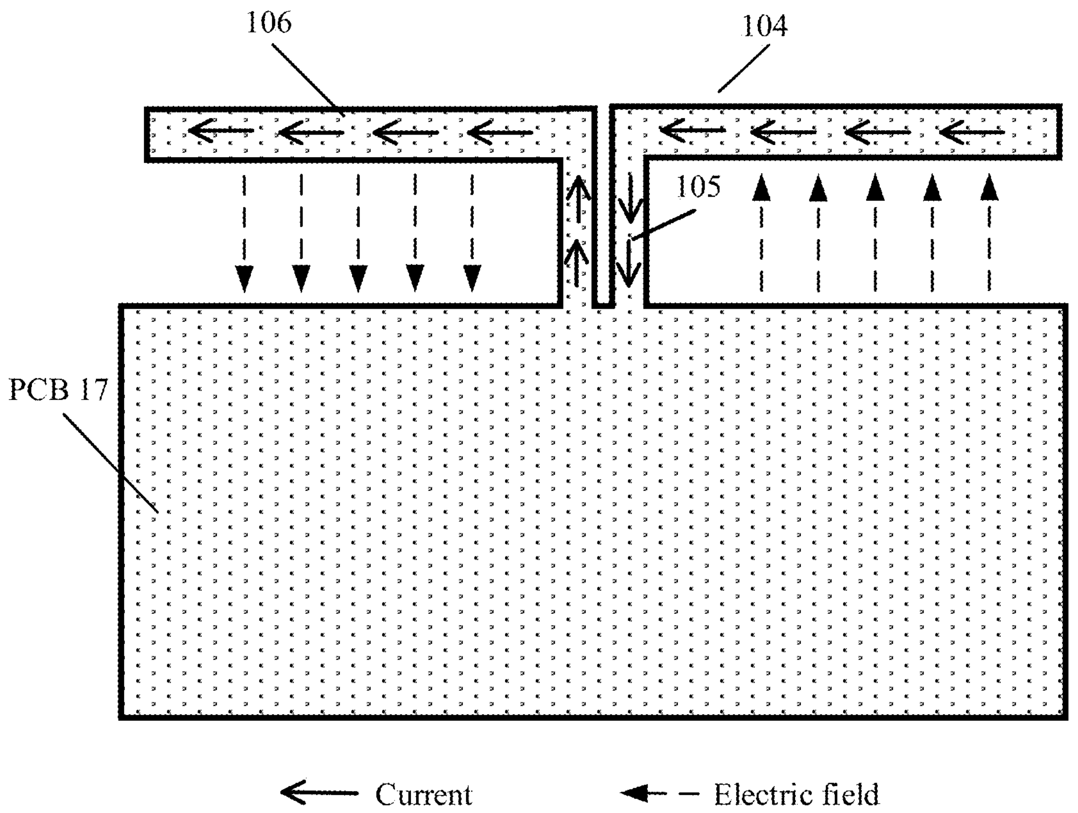
FIG. 3B shows current and electric field distribution in a DM wire antenna mode according to an embodiment of this application.

FIG. 3B shows current and electric field distribution of the wire antenna 104. As shown in FIG. 3B, a current is anti-symmetrically distributed in a same direction on two sides of the middle position 106, and an electric field is distributed in opposite directions on the two sides of the middle position 106. As shown in FIG. 3B, a current at a feed position 105 is distributed in opposite directions. Based on the current distribution in the opposite directions at the feed position 105, feeding shown in FIG. 3A may be referred to as wire antenna DM feeding. A wire antenna mode shown in FIG. 3B may be referred to as a DM wire antenna mode. The current and the electric field that are shown in FIG. 3B may be respectively referred to as a current and an electric field of the DM wire antenna mode.

The current and the electric field of the DM wire antenna mode are generated by the entire wire antenna 104 as a half-wavelength antenna. The current is strong at the middle position 106 of the wire antenna 104 and weak at two ends of the wire antenna 104. The electric field is weak at the middle position 106 of the wire antenna 104 and strong at the two ends of the wire antenna 104.

3. Common Mode (CM) Slot Antenna Mode

Figure 4A:
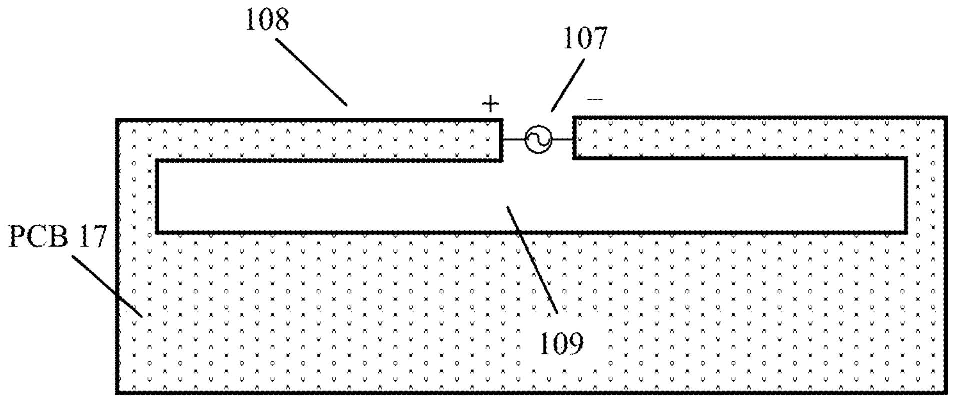
FIG. 4A shows a CM slot antenna according to an embodiment of this application.

As shown in FIG. 4A, a slot antenna 108 may be formed by slotting a ground plate. An opening 107 is disposed on one side of a slot 109, and the opening 107 may be disposed at a middle position of the side. A feed may be connected at the opening 107. A positive electrode of the feed may be connected to one side of the opening 107, and a negative electrode of the feed may be connected to the other side of the opening 107.

Figure 4B:
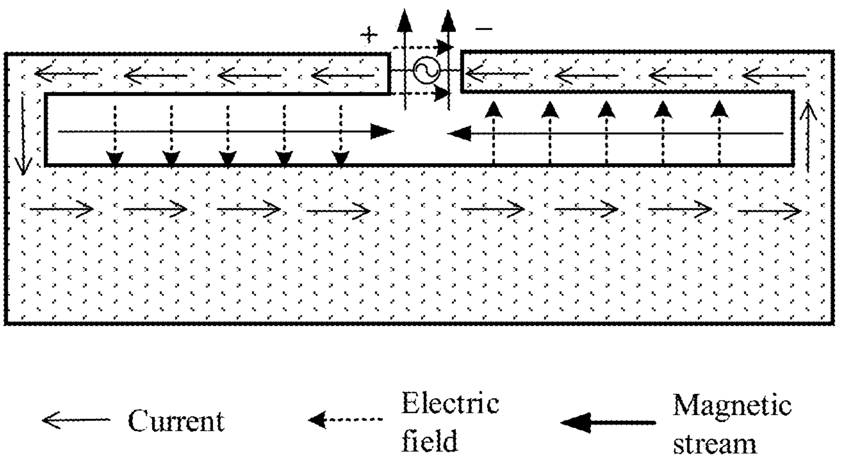
FIG. 4B shows current, electric field, and magnetic stream distribution in a CM slot antenna mode according to an embodiment of this application.

FIG. 4B shows current, electric field, and magnetic stream distribution of the slot antenna 108. As shown in FIG. 4B, a current surrounding the slot 109 is distributed in a same direction on a conductor (for example, the ground plate) around the slot 109, an electric field is distributed in opposite directions on two sides of the middle position of the slot 109, and a magnetic stream is distributed in opposite directions on the two sides of the middle position of the slot 109. As shown in FIG. 4B, an electric field at the opening 107 (that is, a feed position) is in a same direction, and a magnetic stream at the opening 107 (that is, the feed position) is in a same direction. Based on the magnetic stream in the same direction at the opening 107 (the feed position), feeding shown in FIG. 4A may be referred to as slot antenna CM feeding. A slot antenna mode shown in FIG. 4B may be referred to as a CM slot antenna mode. The electric field, the current, and the magnetic stream that are shown in FIG. 4B may be respectively referred to as an electric field, a current, and a magnetic stream of the CM slot antenna mode.

The current and the electric field of the CM slot antenna mode are generated by slot antenna bodies of the slot antenna 108 on the two sides of the middle position as quarter-wavelength antennas. The current is weak at the middle position of the slot antenna 108 and strong at two ends of the slot antenna 108. The electric field is strong at the middle position of the slot antenna 108 and weak at the two ends of the slot antenna 108.

4. Differential Mode (DM) Slot Antenna Mode

Figure 5A:
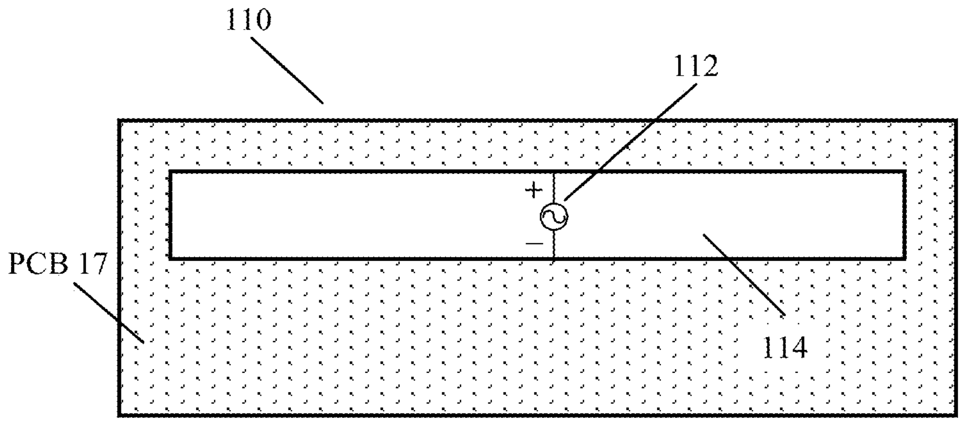
FIG. 5A shows a DM slot antenna according to an embodiment of this application.

As shown in FIG. 5A, a slot antenna 110 may be formed by slotting a ground plate. A feed is connected at a middle position 112 of the slot antenna 110. A middle position of one side of a slot 114 is connected to a positive electrode of the feed, and a middle position of the other side of the slot 114 is connected to a negative electrode of the feed.

Figure 5B:
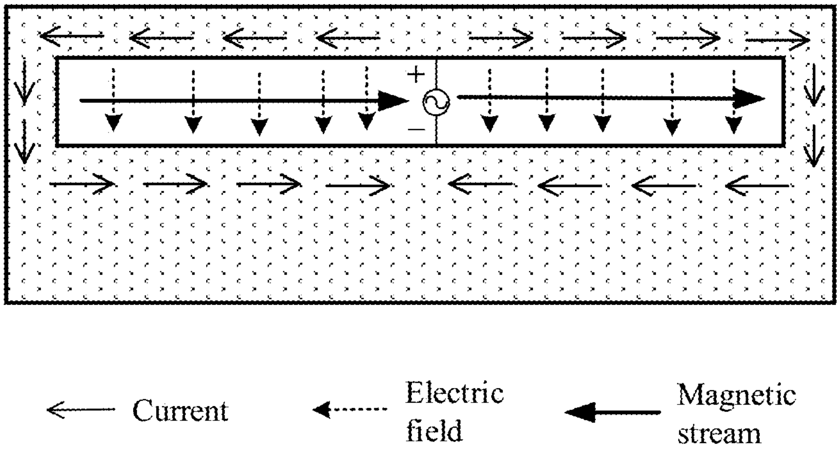
FIG. 5B shows current, electric field, and magnetic stream distribution in a DM slot antenna mode according to an embodiment of this application.

FIG. 5B shows current, electric field, and magnetic stream distribution of the slot antenna 110. As shown in FIG. 5B, a current surrounding the slot 114 is distributed on a conductor (for example, the ground plate) around the slot 114 in opposite directions on two sides of the middle position of the slot 114, an electric field is distributed in opposite directions on two sides of the middle position 112, and a magnetic stream is distributed in a same direction on the two sides of the middle position 112. A magnetic stream at the feed is distributed in opposite directions (not shown). Based on the magnetic stream distributed in the opposite directions at the feed, feeding shown in FIG. 5A may be referred to as slot antenna DM feeding. A slot antenna mode shown in FIG. 5B may be referred to as a DM slot antenna mode. The electric field, the current, and the magnetic stream that are shown in FIG. 5B may be respectively referred to as an electric field, a current, and a magnetic stream of the DM slot antenna mode.

The current and the electric field of the DM slot antenna mode are generated by the entire slot antenna 110 as a half-wavelength antenna. The current is weak at the middle position of the slot antenna 110 and strong at two ends of the slot antenna 110. The electric field is strong at the middle position of the slot antenna 110 and weak at the two ends of the slot antenna 110.

Embodiment of this application provides the following antenna design solutions to integrate a plurality of antenna modes in the foregoing four antenna modes, to cover more frequency bands and miniaturize an antenna.

Solution 1

In solution 1, a feed design is performed on a conductor of a specific shape to excite two antenna modes in the foregoing four antenna modes. In this way, two antenna modes may be excited from a conductor of a specific shape, to cover a plurality of frequency bands when an antenna is miniaturized.

Solution 1 is based on a principle that a conductor of any shape may have a plurality of characteristic modes without considering feeding. One or more of the characteristic modes may be enhanced by using a feed design, to select a desired characteristic mode.

The following describes in detail a plurality of embodiments of solution 1 with reference to the accompanying drawings.

Embodiment 1

In Embodiment 1, for a strip conductor, a feed design may be used to excite two desired characteristic modes. The two desired characteristic modes are a CM wire antenna mode shown in FIG. 2A and FIG. 2B and a DM wire antenna mode shown in FIG. 3A and FIG. 3B. In other words, the CM wire antenna mode and the DM wire antenna mode may be selected from a plurality of characteristic modes of the strip conductor by performing the feed design on the strip conductor.

Figure 6A:
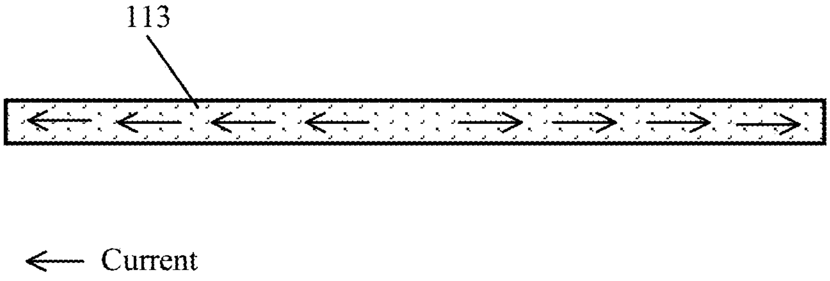
FIG. 6A and FIG. 6B show characteristic modes of strip conductors.
Figure 6B:
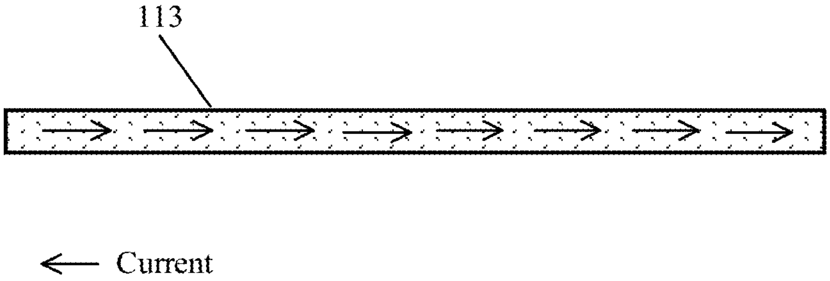

FIG. 6A and FIG. 6B show two characteristic modes of a strip conductor 111 (without considering feeding). A characteristic mode shown in FIG. 6A is the CM wire antenna mode, and a current on the strip conductor 111 is a current of the CM wire antenna mode, that is, the current on the strip conductor 111 is distributed in the opposite directions. A characteristic mode shown in FIG. 6B is the DM wire antenna mode, and a current on the strip conductor 111 is a current of the DM wire antenna mode, that is, the current on the strip conductor 111 is distributed in the same direction.

Figure 7A:
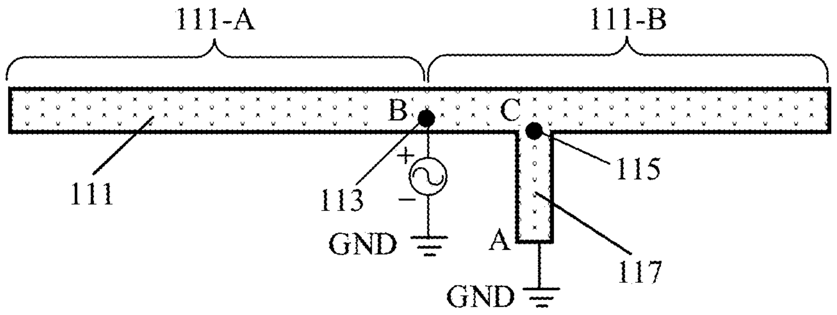
FIG. 7A shows an antenna design solution according to embodiment 1.

FIG. 7A shows an antenna design solution according to embodiment 1. As shown in FIG. 7A, a wire antenna provided in Embodiment 1 may include a strip conductor ill, a feed point 113, and a ground point 115.

The feed point 113 may be disposed at a middle position of the strip conductor 111. The feed point 113 may be connected to a feed. A positive electrode of the feed may be connected to the feed point 113, and a negative electrode of the feed may be connected to ground (for example, a ground plate).

On the strip conductor 111, the ground point 115 may be disposed in the vicinity of the feed point 113. The ground point 115 may be connected to a grounding stub 117. The grounding stub 117 may be configured to be connected to ground (for example, the ground plate). Herein, the vicinity may mean that a length between the feed point 113 and a ground terminal A of the grounding stub 117 is less than a quarter of an operating wavelength 1. That is, a sum of a distance $L_{BC}$ between the feed point 113 and the ground point 115 and a length $L_{CA}$ of the grounding stub 117 is less than a quarter of the operating wavelength 1. The operating wavelength 1 is an operating wavelength of a CM wire antenna mode of the wire antenna shown in FIG. 7A. A calculation manner of the operating wavelength 1 is described in the following content, and is not described herein.

The feed point 113 is disposed at the middle position of the strip conductor 111, so that a current is strong at the middle position of the strip conductor 111 and weak at two ends of the strip conductor 111. This may be consistent with current intensity distribution of the CM wire antenna mode and current intensity of the DM wire antenna mode, thereby well coupling two characteristic modes of the strip conductor 111: the CM wire antenna mode and the DM wire antenna mode. In other words, a design of the feed point 113 may excite the wire antenna shown in FIG. 7A to generate the CM wire antenna mode and the DM wire antenna mode.

Figure 7B:
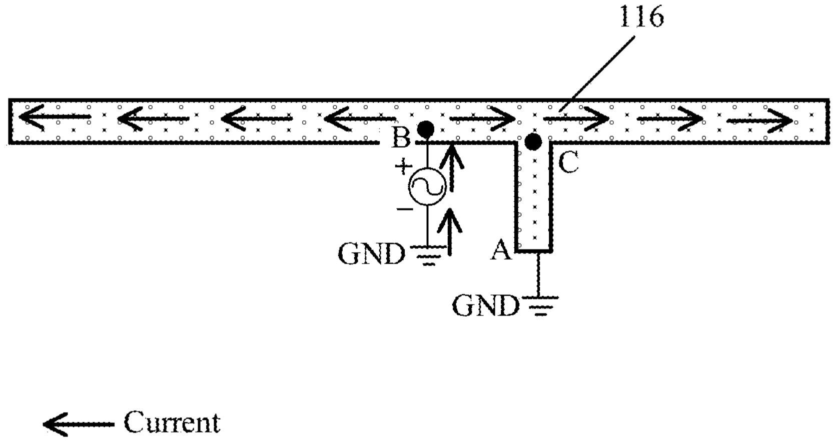
FIG. 7B and FIG. 7C show current distribution of an antenna structure according to embodiment 1.
Figure 7C:
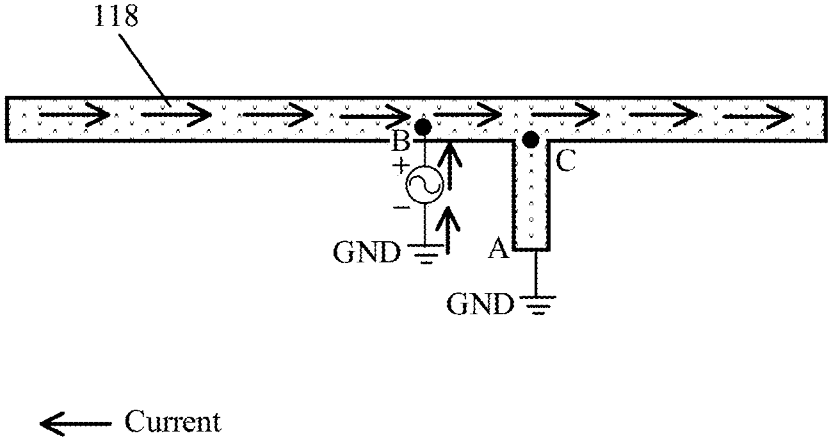

FIG. 7B and FIG. 7C respectively show two currents with different frequencies distributed on the strip conductor 111: a current 116 and a current 118. The directions of the current 116 on two sides of the feed point 113 are opposite, and the directions of the current 118 on the two sides of the feed point 113 are the same. The current 116 is a current of the CM wire antenna mode, and the current 118 is a current of the DM wire antenna mode. The current 116 is a current that is of a quarter-wavelength mode and that is generated by horizontal strips 111-A and 111-B of the strip conductor 111 on the two sides of the feed point 113, and the current 118 is a current that is of a half-wavelength mode and that is generated by the entire strip conductor 111. There are two currents with different frequencies on the strip conductor 111: the current 116 and the current 118. Therefore, two different resonance frequencies may be generated on the strip conductor III. The wire antenna shown in FIG. 7A may have at least two different operating frequency bands. In Embodiment 1, the current 116 may be referred to as a first current, and the current 118 may become a second current.

The operating wavelength 1 (that is, the operating wavelength of the CM wire antenna mode of the wire antenna shown in FIG. 7A) may be calculated based on a frequency f1 of the current 116, because the current 116 is a current of the CM wire antenna mode. Specifically, an operating wavelength 1 of a radiated signal in the air may be calculated as follows: Wavelength=Speed of light/f1. An operating wavelength 1 of a radiated signal in a medium may be calculated as follows: Wavelength=(Speed of light/$\sqrt{\varepsilon}$)/f1, where ε is a relative dielectric constant of the medium. In Embodiment 1, the operating wavelength 1 may be referred to as a first wavelength.

Figure 7D:
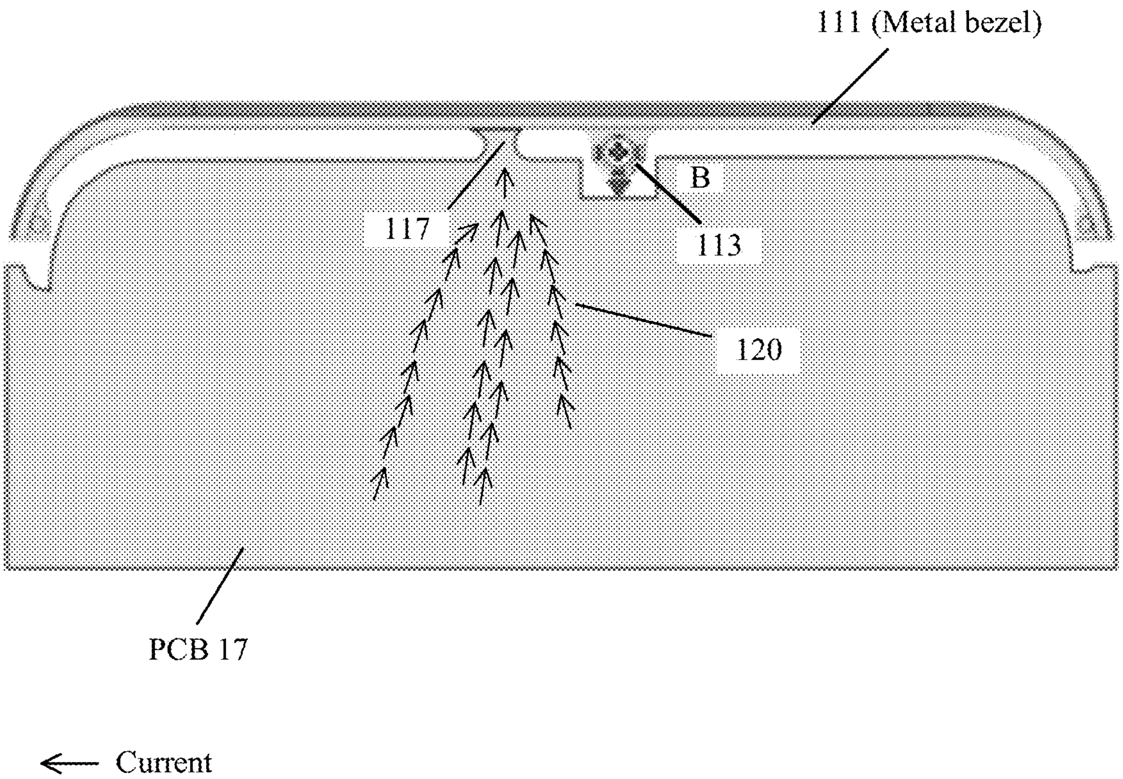
FIG. 7D shows an implementation of the antenna design solution according to Embodiment 1 in an actual entire system.
Figure 7E:
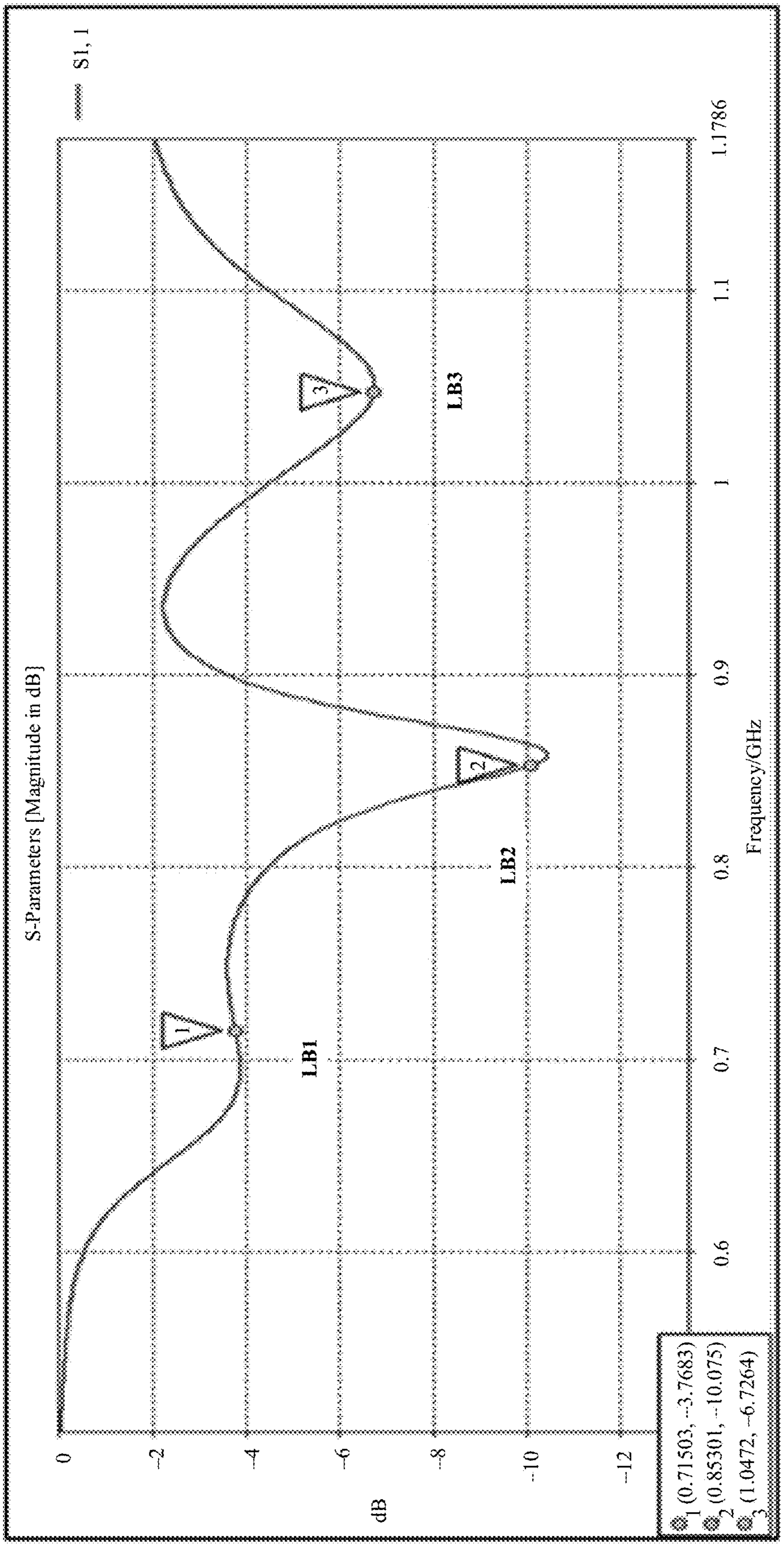
FIG. 7E shows an S11 simulation of an antenna shown in FIG. 7D.

FIG. 7D shows an implementation of the antenna design solution according to Embodiment 1 in an actual entire system. As shown in FIG. 7D, the strip conductor 111 may be a part of a metal bezel of an electronic device, for example, a metal bezel located at the top or the bottom of the electronic device. The strip conductor 111 may be fed at the middle position of the strip conductor 111. The grounding stub 117 may connect the metal bezel and the ground plate, for example, may be a metal dome of the strip conductor 111 disposed on the ground plate. The grounding stub 117 may be disposed in the vicinity of the feed point 113. FIG. 7E shows an S11 simulation of an antenna shown in FIG. 7D. As shown in FIG. 7E, the antenna may actually generate three resonances: a resonance “1” (LB1), a resonance “2” (LB2), and a resonance “3” (LB2). The resonance “1” is in the vicinity of 0.7 GHz, the resonance “2” is in the vicinity of 0.85 GHz, and the resonance “3” is in the vicinity of 1.05 GHz. The resonance “2” may be generated by a half-wavelength mode of the strip conductor 111, that is, the resonance “2” is a resonance of the DM wire antenna mode. The resonance “3” may be generated by a quarter-wavelength mode of the strip conductor 111, that is, the resonance “3” is a resonance of the CM wire antenna mode. The resonance “1” may be generated by the ground plate that is excited by the quarter-wavelength mode of the strip conductor 111, and a current 120 is distributed on the ground plate. A frequency of the current 120 may be different from the frequencies of the current 116 and the current 118, and may be lower than the frequencies of the current 116 and the current 118. In Embodiment 1, the current 120 may be referred to as a third current.

It may be learned that, in the antenna design solution provided in Embodiment 1, one strip conductor may be used to excite two wire antenna modes: the CM wire antenna mode and the DM wire antenna mode, to cover a plurality of frequency bands when an antenna is miniaturized.

Extended Solution of Embodiment 1

Figure 8A:
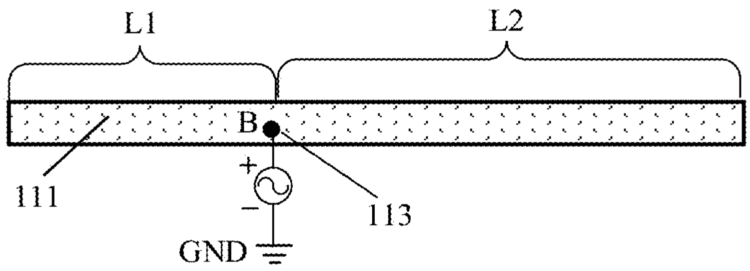
FIG. 8A shows an extended solution of embodiment 1.
Figure 8B:
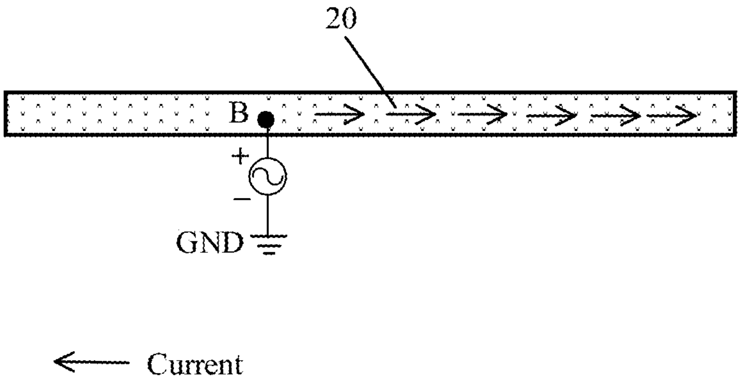
FIG. 8B to FIG. 8E show current distribution of an antenna structure shown in FIG. 8A.
Figure 8C:
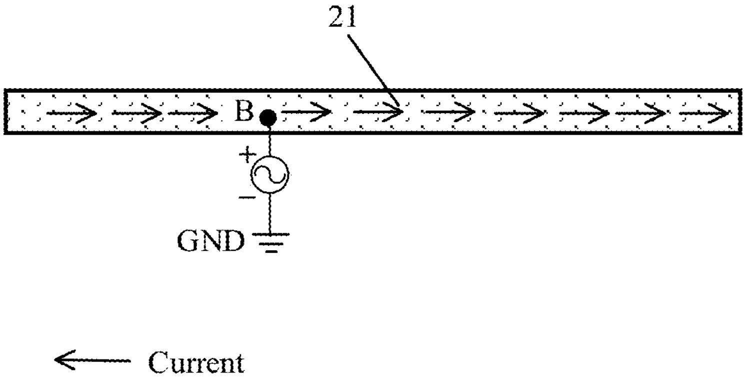
Figure 8D:
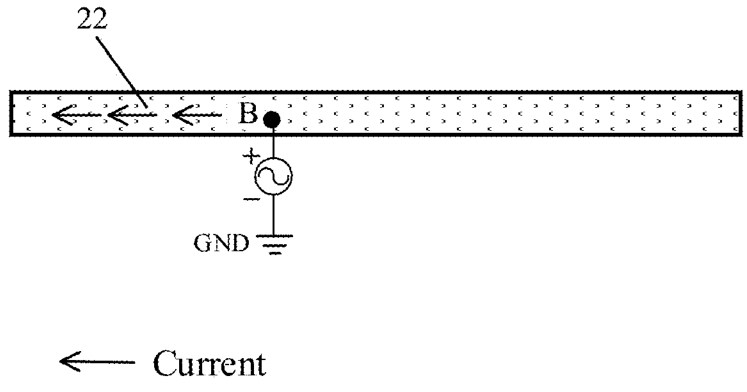
Figure 8E:
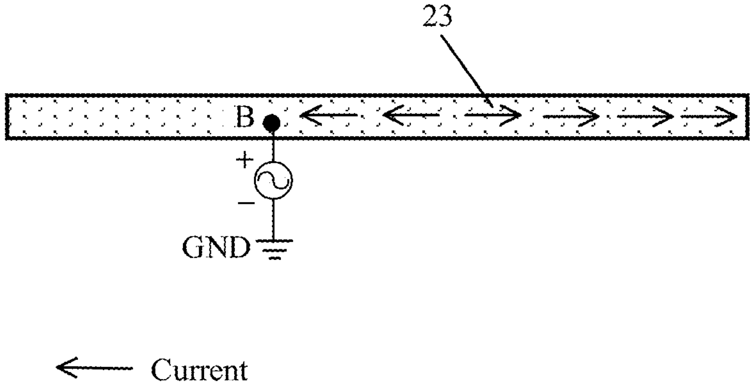

As shown in FIG. 8A, the feed point 113 may deviate from the middle position of the strip conductor 111, to cover more frequency bands. In other words, in an antenna structure shown in FIG. 8A, the distance L1 between the feed point 113 and one end of the strip conductor 111 is not equal to the distance L2 between the feed point 113 and the other end of the strip conductor 111. The strip conductor 111 may be divided into a long strip and a short strip by using the feed point 113 as a dividing line. The long strip is a horizontal strip whose length is L2 in FIG. 8A, and the short strip is a horizontal strip whose length is L1 in FIG. 8A. In the antenna structure shown in FIG. 8A, the grounding stub 117 may not need to be disposed in the vicinity of the feed point 113, that is, the grounding stub 117 may be removed.

Different from the embodiment in FIG. 7A, in the antenna structure shown in FIG. 8A, there may be more currents with different frequencies on the strip conductor Ill: a current 20, a current 21, a current 22, and a current 23, which may be respectively shown in FIG. 8B to FIG. 8E. On the strip conductor 111, the current 20, the current 22, and the current 23 are in the opposite directions on the two sides of the feed point 113. The current 21 is in the same direction on the entire strip conductor 111. The current 20 is a current that is of a quarter-wavelength mode and that is generated by the long strip. The current 21 is a current that is of a half-wavelength mode and that is generated by the entire strip conductor 111. The current 22 is a current that is of a quarter-wavelength mode and that is generated by the short strip. The current 23 is a current that is of a three-quarter wavelength mode and that is generated by the long strip. Because there may be more currents with different frequencies on the strip conductor 111, the antenna structure shown in FIG. 8A may cover more operating frequency bands when an antenna is miniaturized.

Embodiment 2

In Embodiment 2, for a specific slotted conductor, a feed design may be used to excite two desired characteristic modes. The two desired characteristic modes are a CM slot antenna mode shown in FIG. 4A and FIG. 4B and a DM slot antenna mode shown in FIG. 5A and FIG. 5B. In other words, the CM slot antenna mode and the DM slot antenna mode may be selected from a plurality of characteristic modes of the specific slotted conductor by conducting the feed design on the specific slotted conductor.

Figure 9A:
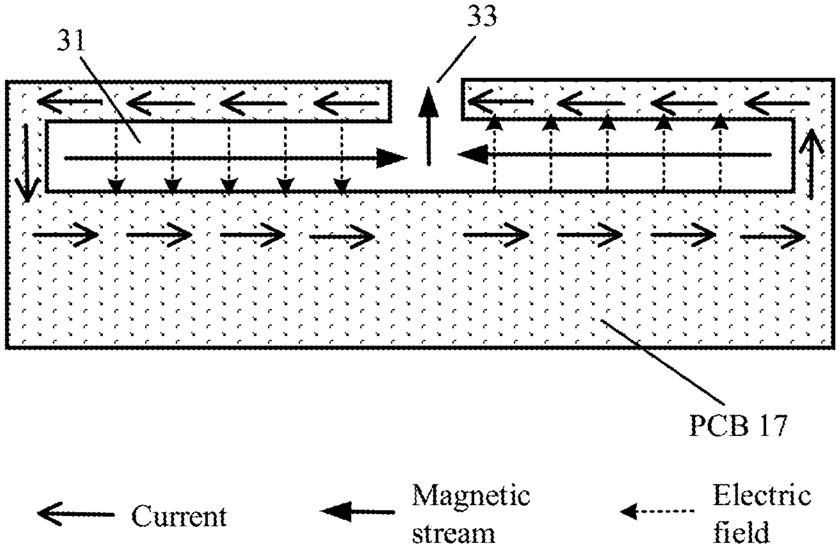
FIG. 9A and FIG. 9B show two characteristic modes of a slotted metal plate.
Figure 9B:
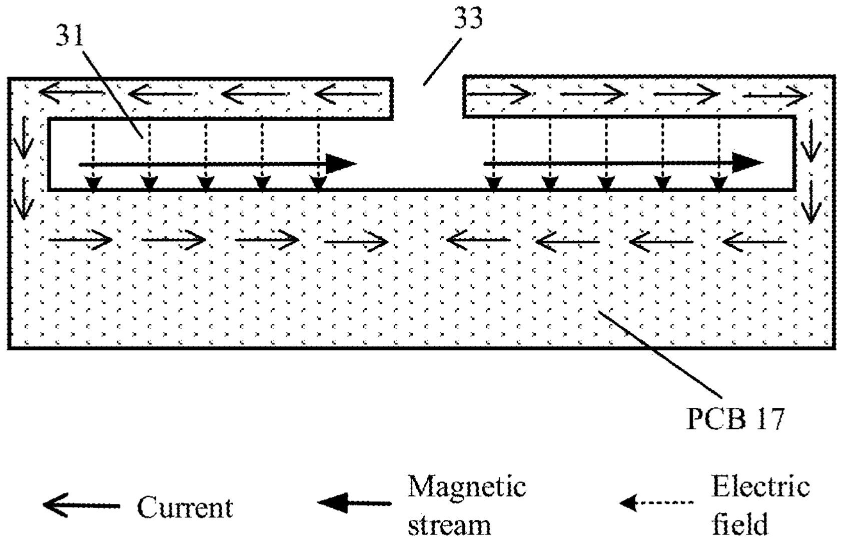

FIG. 9A and FIG. 9B show two characteristic modes of a slotted metal plate (without considering feeding). The slotted metal plate is the specific slotted conductor selected in Embodiment 2, and may be, for example, a ground plate. The slotted metal plate has a slot 31, and the slot 31 may be achieved by slotting the ground plate. An opening 33 is disposed on one side of the slot 31, and the opening 33 may be disposed at the middle position of the side. The opening 33 may connect the slot 31 and free space outside the slot 31. A characteristic mode shown in FIG. 9A is the CM slot antenna mode, and a current and an electric field that are shown in FIG. 9A are a current and an electric field of the CM slot antenna mode. A characteristic mode shown in FIG. 9B is the DM slot antenna mode, and a current and an electric field that are shown in FIG. 9B are a current and an electric field of the DM slot antenna mode. In addition to the CM slot antenna mode and the DM slot antenna mode, the slotted conductor shown in FIG. 9A and FIG. 9B may have another characteristic mode, which is not described herein.

Figure 10A:
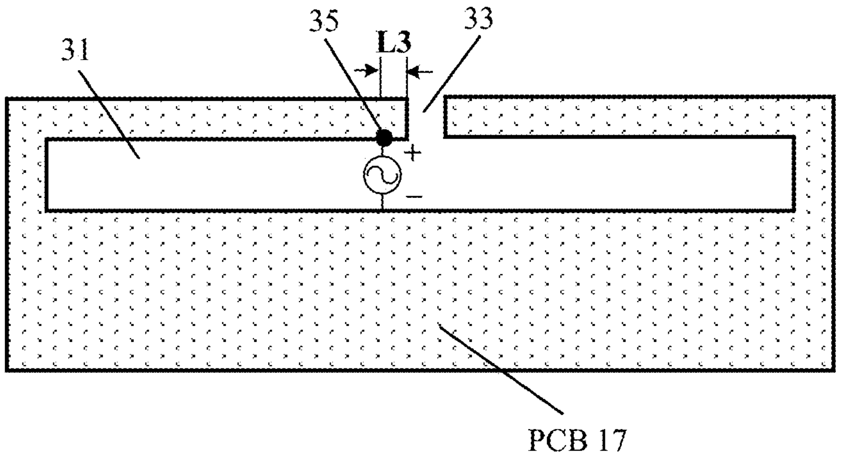
FIG. 10A shows an antenna design solution according to embodiment 2.

FIG. 10A shows an antenna design solution according to embodiment 2. As shown in FIG. 10A, a slot antenna provided in Embodiment 2 may include a metal plate and a slot 31.

The metal plate may be a ground plate. The slot 31 may be achieved by slotting the metal plate (for example, the ground plate). An opening 33 may be disposed on one side of the slot 31, and the opening 33 may be disposed at the middle position of the side. The slot 31 may be filled with materials such as a polymer, glass, ceramics, or a combination of these materials. The opening 33 may also be filled with materials such as a polymer, glass, ceramics, or a combination of these materials.

A feed may be connected at a position 35 of the slot 31. At the position 35, a positive electrode of the feed is connected to one side of the slot 31, and a negative electrode of the feed is connected to the other side of the slot 31. In Embodiment 2, the side connected to the positive electrode of the feed may be referred to as a first side of the slot 31, and the side connected to the negative electrode of the feed may be referred to as a second side of the slot 31. The position 35 may be disposed in the vicinity of the opening 33. Herein, vicinity may mean that a distance L3 between the feed position 35 and the opening 33 is less than a quarter of an operating wavelength 2. The operating wavelength 2 is an operating wavelength of a CM slot antenna mode of the slot antenna shown in FIG. 10A. A calculation manner of the operating wavelength 2 is described in the following content, and is not described herein. Optionally, the distance L3 may be further greater than an eighth of the operating wavelength 2, to facilitate an implementation in an actual entire system. Feeding is performed in the vicinity of the opening 33, so that a current is weak in the vicinity of the middle position of the slot 31 and strong at two ends of the slot 31. This may be consistent with current intensity distribution of a quarter-wavelength mode of a CM slot antenna and current intensity of a half-wavelength mode of a DM slot antenna, thereby well coupling characteristic modes of the slotted metal plate shown in FIG. 10A: the CM slot antenna mode and the DM slot antenna mode.

Figure 10B:
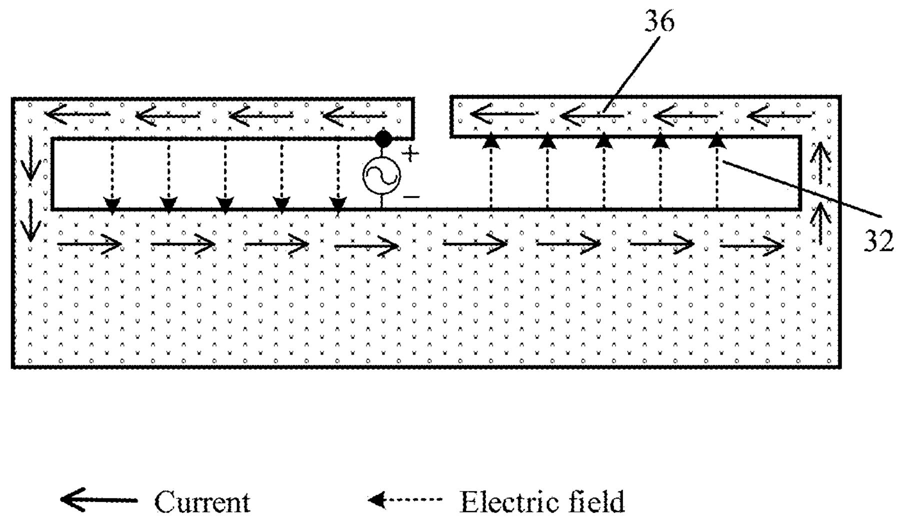
FIG. 10B and FIG. 10C show current distribution of an antenna structure according to embodiment 2.
Figure 10C:
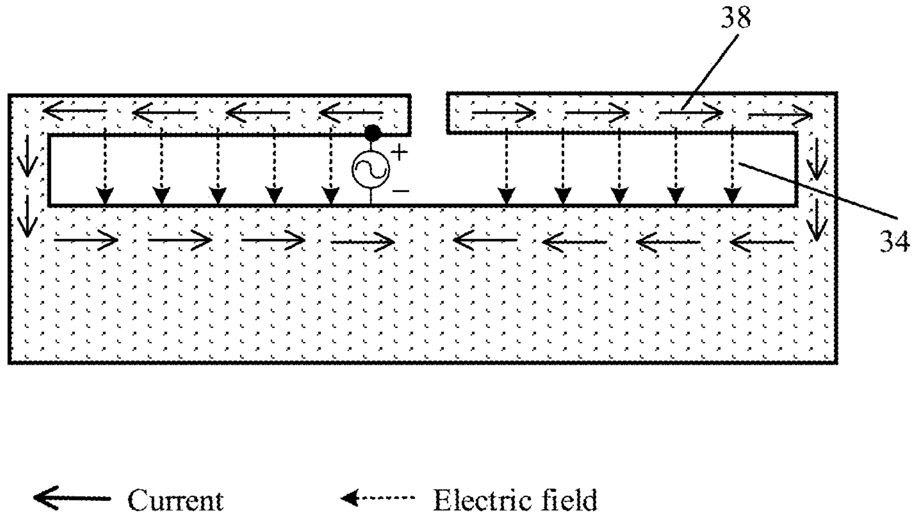

A design of the feed position 35 may excite the slot antenna shown in FIG. 10A to generate the CM slot antenna mode and the DM slot antenna mode. As shown in FIG. 10B and FIG. 10C, on the slot antenna shown in FIG. 10A, there may be two currents with different frequencies surrounding the slot 31: a current 36 and a current 38. In Embodiment 2, the current 36 and the current 38 may be respectively referred to as a first current and a second current. The current 36 is distributed in a same direction surrounding the slot 31, and the current 38 is distributed in opposite directions on two sides of the opening 33 surrounding the slot 31. On the slot antenna shown in FIG. 10A, there may be electric fields with different frequencies: an electric field 32 and an electric field 34. On the slot 31, the electric field 32 is distributed in opposite directions on the two sides of the opening 33, has a same frequency as the current 36, and is an electric field of the CM slot antenna mode. On the slot 31, the electric field 34 is distributed in a same direction, has a same frequency as the current 38, and is an electric field of the DM slot antenna mode. A frequency f3 of the electric field 34 is greater than a frequency f4 of the electric field 32. On the slot antenna shown in FIG. 10A, there are two electric fields with different frequencies: the electric field 32 and the electric field 34. Therefore, the slot antenna may have at least two different operating frequency bands.

The operating wavelength 2 (that is, the operating wavelength of the CM slot antenna mode) may be calculated based on the frequency f4 of the current 36 and the electric field 32, because the electric field 32 is an electric field of the CM slot antenna mode. Specifically, an operating wavelength 2 of a radiated signal in the air may be calculated as follows: Wavelength=Speed of light/f4. An operating wavelength 2 of a radiated signal in a medium may be calculated as follows: Wavelength=(Speed of light/$\sqrt{\varepsilon}$)/f4, where ε is a relative dielectric constant of the medium. In Embodiment 2, the operating wavelength 2 may be referred to as a first wavelength.

It may be learned that, in the antenna design solution provided in Embodiment 2, one slotted conductor may be used to excite two slot antenna modes: the CM slot antenna mode and the DM slot antenna mode, to cover a plurality of frequency bands when an antenna is miniaturized.

Extended Solution of Embodiment 2

Figure 11A:
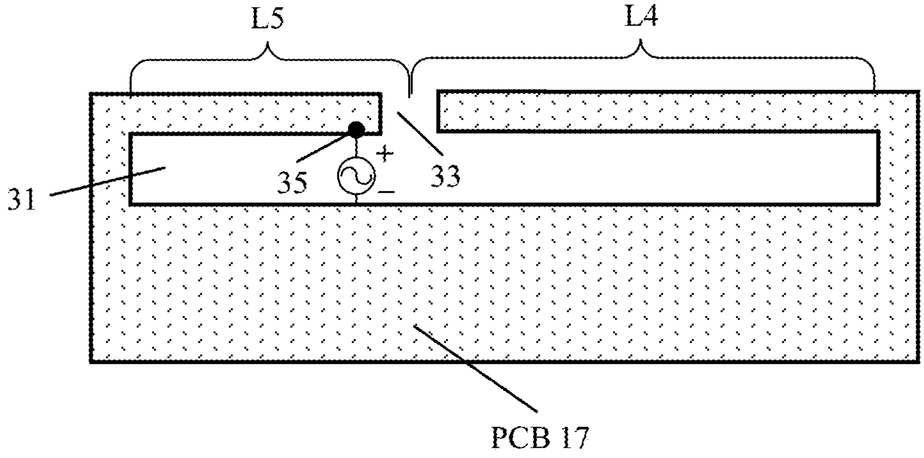
FIG. 11A shows an extended solution of embodiment 1.
Figure 11B:
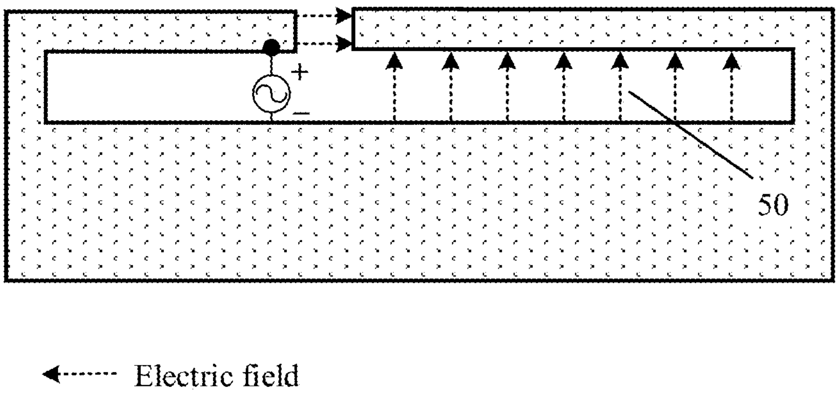
FIG. 11B to FIG. 11E show current distribution of an antenna structure shown in FIG. 11A.
Figure 11C:
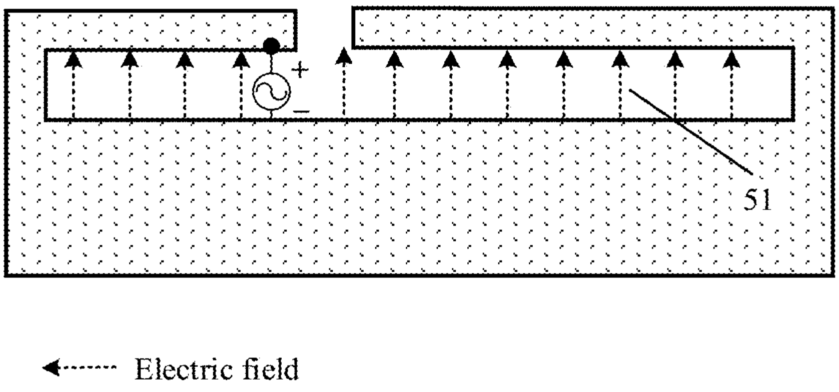
Figure 11D:
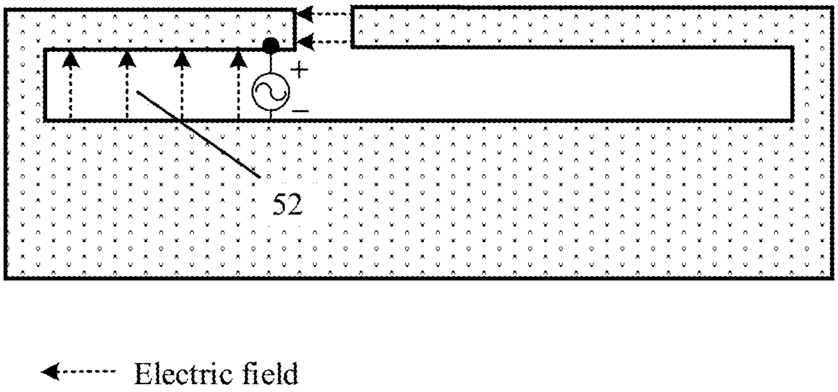
Figure 11E:
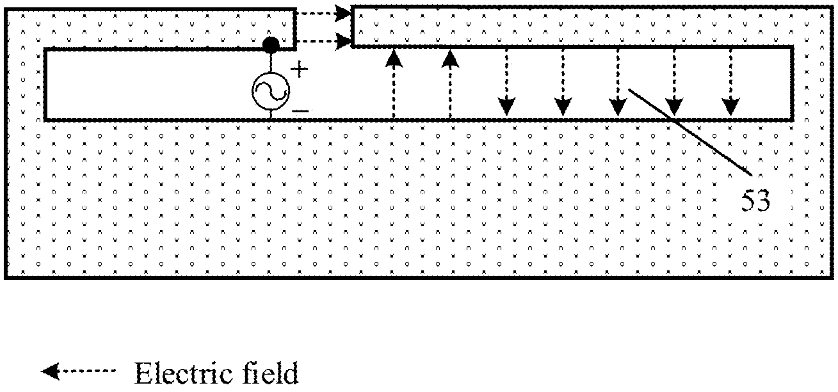

As shown in FIG. 11A, a position of the opening 33 of the slot 31 may deviate from the middle position of the opening side of the slot 31, to cover more frequency bands. In other words, in a slot antenna structure shown in FIG. 11A, a distance L4 between the opening 33 and one end of the slot 31 is not equal to a distance L5 between the opening 33 and the other end of the slot 31. A slot antenna shown in FIG. 11A may be divided into a long slot body and a short slot body by using the position of the opening 33 as a dividing line. The long slot body is a slot body whose length is L4 in FIG. 11A, and the short slot body is a slot body whose length is L5 in FIG. 11A.

In the slot antenna structure shown in FIG. 11A, the feed position 35 may be designed in the vicinity of the opening 33. A meaning expressed by the vicinity is described in Embodiment 2, and is not described herein again. Different from the embodiment in FIG. 10A, on the slot antenna shown in FIG. 11A, there may be more electric fields with different frequencies: an electric field 50, an electric field 51, an electric field 52, and an electric field 53, which may be respectively shown in FIG. 11B to FIG. 11E. The electric field 50, the electric field 51, the electric field 52, and the electric field 53 are distributed in opposite directions on the slot 31. The electric field 51 is distributed in a same direction on a horizontal strip 13. The electric field 50 is an electric field that is of a quarter-wavelength mode and that is generated by the long slot body. The electric field 51 is an electric field that is of a half-wavelength mode and that is generated by the entire slot antenna. The electric field 52 is an electric field that is of a quarter-wavelength mode and that is generated by the short slot body. The electric field 53 is an electric field that is of a quarter-wavelength mode and that is generated by the long slot body. Because there may be more electric fields with different frequencies on the slot antenna shown in FIG. 11A, the antenna structure shown in FIG. 11A may cover more operating frequency bands when an antenna is miniaturized.

Solution 2

In solution 2, a coupled antenna structure is formed by coupling a fed slot antenna to a wire antenna or coupling a fed wire antenna to a slot antenna, to combine a wire antenna mode and a slot antenna mode in the foregoing four antenna modes. In this way, two antenna modes may be excited by feeding one antenna, to cover a plurality of frequency bands when an antenna is miniaturized.

The following describes in detail a plurality of embodiments of solution 2 with reference to the accompanying drawings.

Embodiment 3

In Embodiment 3, a fed antenna may be a DM slot antenna shown in FIG. 5A, a coupled antenna may be a DM wire antenna shown in FIG. 3A, and a DM slot antenna mode and a DM wire antenna mode may be excited.

Figure 12A:
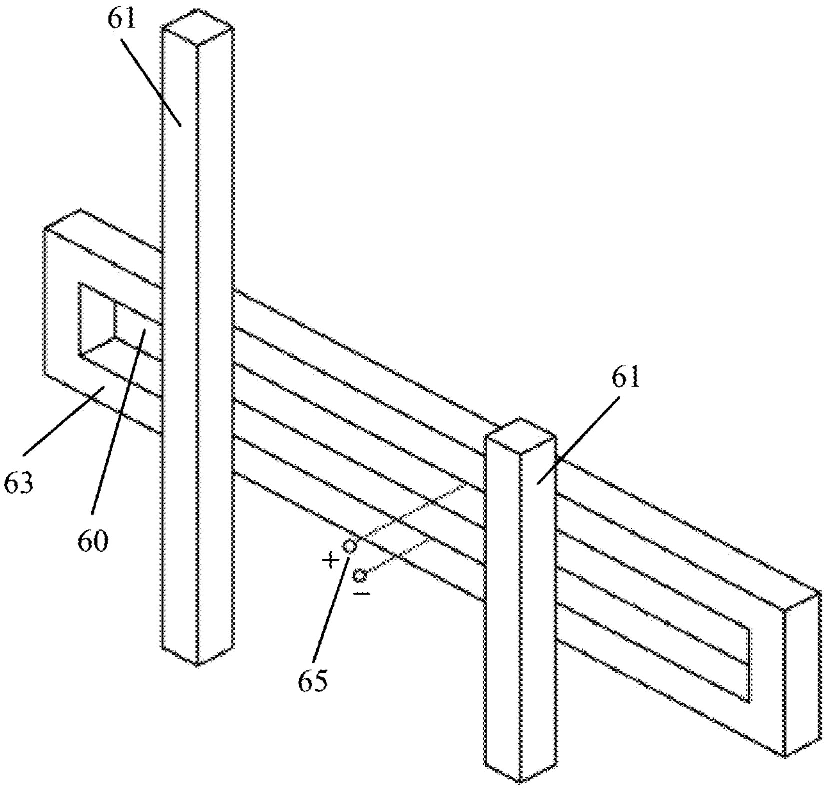
FIG. 12A and FIG. 12B show an antenna design solution according to embodiment 3.
Figure 12B:
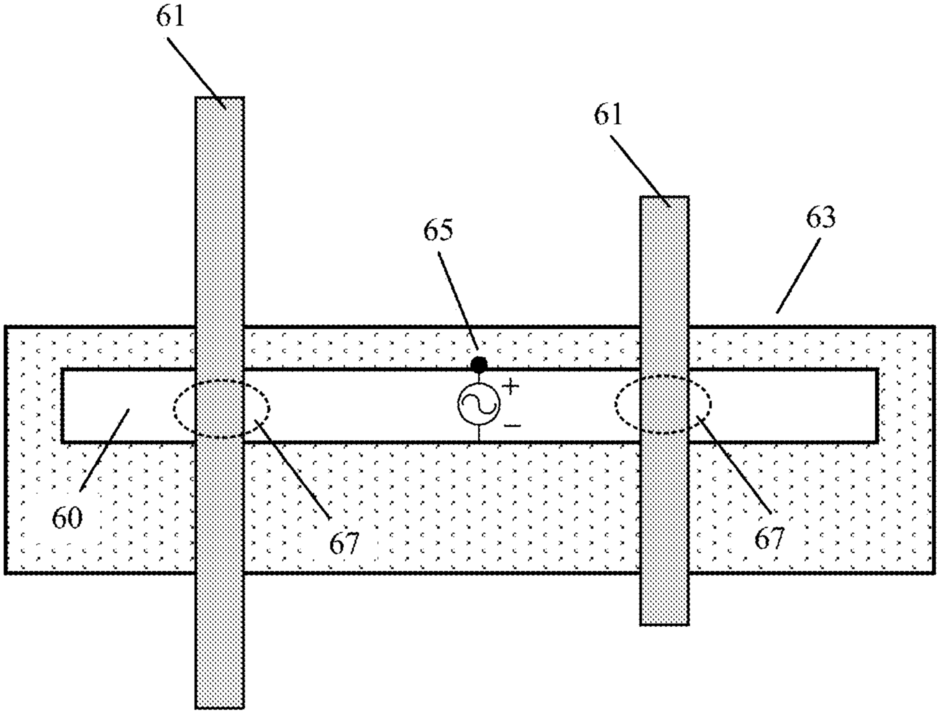

FIG. 12A and FIG. 12B show an antenna design solution according to embodiment 3. FIG. 12A is a three-dimensional schematic diagram of the antenna design solution, and FIG. 12B is a schematic top plane view of the antenna design solution. As shown in FIG. 12A and FIG. 12B, an antenna structure provided in Embodiment 3 may include at least one wire antenna 61 and a slot antenna 63.

The wire antenna 61 may be the DM wire antenna shown in FIG. 3A. The wire antenna 61 may be a floating antenna, and may be disposed on an inner surface of a rear cover 21, or disposed on an outer surface of the rear cover 21, or built in the rear cover 21. For example, the wire antenna 61 may be a metal strip pasted on the inner surface of the rear cover 21, or may be printed on the inner surface of the rear cover 21 by using conductive silver paste.

The slot antenna 63 may be the DM slot antenna shown in FIG. 5A. The slot antenna 63 may include a metal plate and a slot 60. The slot antenna 63 may be formed by slotting the metal plate (for example, a PCB 17). A feed may be connected at a middle position 65 of the slot antenna 63, that is, a feed position 65 of the slot antenna 63 may be the middle position of the slot antenna 63. Specifically, a middle position of one side of the slot 60 may be connected to a positive electrode of the feed, and a middle position of the other side of the slot 60 may be connected to a negative electrode of the feed. The slot 60 may be filled with materials such as a polymer, glass, ceramics, or a combination of these materials.

The wire antenna 61 may be parallel to a plane on which the slot antenna 63 is located, and perpendicular to the slot 60 of the slot antenna 63. The plane may be referred to as a slotted plane, that is, a plane on which the metal plate is located. A projection of the wire antenna 61 on the slotted plane and the slot 60 of the slot antenna 63 may intersect at a middle position of the projection. A distance between an intersecting part 67, of the projection of the wire antenna 61 on the slotted plane and the slot 60, and the feed position 65 of the slot antenna 63 may be less than half of an operating wavelength 3. The operating wavelength 3 is an operating wavelength of the slot antenna 63. In Embodiment 3, the operating wavelength 3 may be referred to as a first wavelength.

A coupling distance between the wire antenna 61 and the fed slot antenna 63 may be a distance between the wire antenna 61 and the plane on which the slot antenna 63 is located. The distance is less than a first distance, for example, less than 1 mm. It should be understood that a smaller coupling distance leads to a stronger coupling effect. A specific value of the coupling distance is not limited in this application, provided that the slot antenna 63 can be coupled to the floating wire antenna 61.

It should be understood that the wire antenna 61 may alternatively not be parallel to the plane on which the fed slot antenna 63 is located. When the wire antenna 61 is not parallel to the plane on which the fed slot antenna 63 is located, the fed slot antenna 63 may also be coupled to the floating wire antenna 61. In this case, a coupling effect may be weaker than a coupling effect when the wire antenna 61 is parallel to the plane on which the fed slot antenna 63 is located.

The following describes a resonance mode that may be generated by an antenna structure example shown in FIG. 12A and FIG. 12B.

Figure 12C:
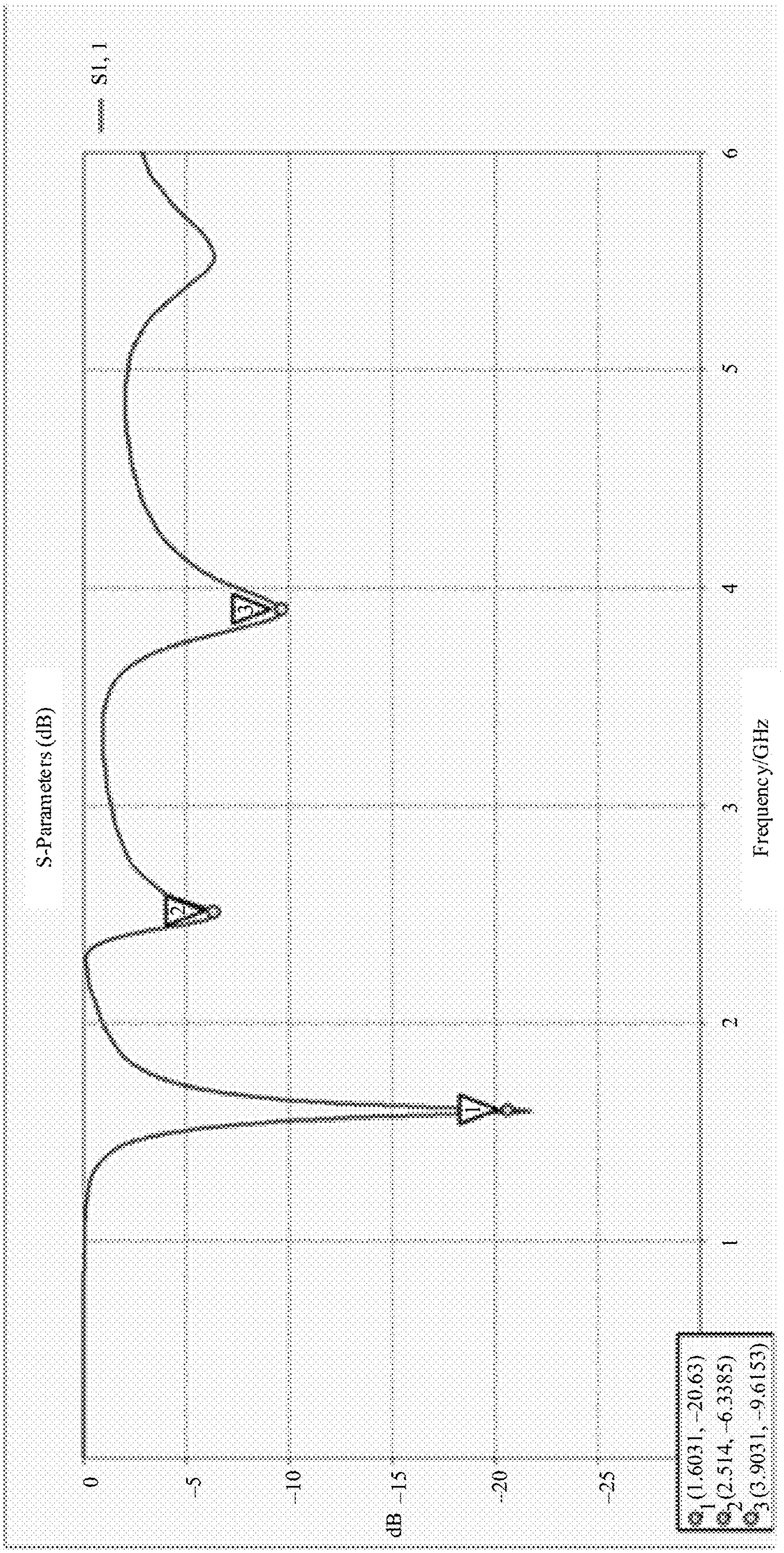
FIG. 12C shows a resonance mode generated by an antenna structure shown in FIG. 12A and FIG. 12B.

Referring to FIG. 12C, "1", "2", and "3" in FIG. 12C represent different resonances. The coupled antenna structure may generate the resonance "1" in the vicinity of 1.6 GHz, the resonance "2" in the vicinity of 2.5 GHz, and the resonance "3" in the vicinity of 3.9 GHz. Specifically, the resonance "1" may be generated by a half-wavelength mode of the slot antenna 63, the resonance "2" may be generated by a half-wavelength mode of a longer wire antenna 61, and the resonance "3" may be generated by a half-wavelength mode of a shorter wire antenna 61.

Figure 12D:
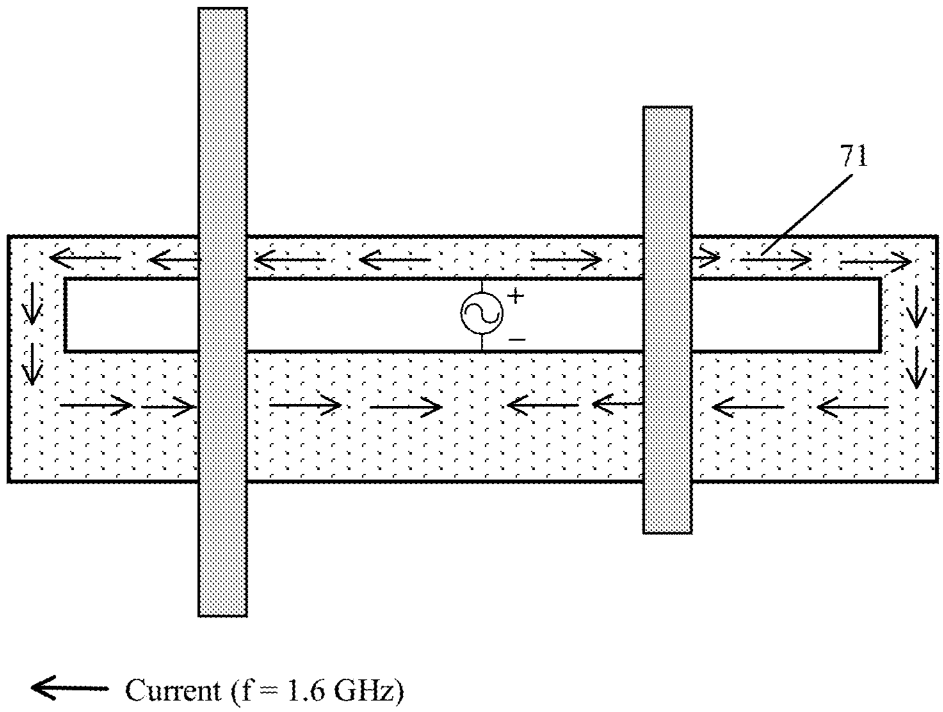
FIG. 12D to FIG. 12F show current distribution of each resonance in FIG. 12C.
Figure 12E:
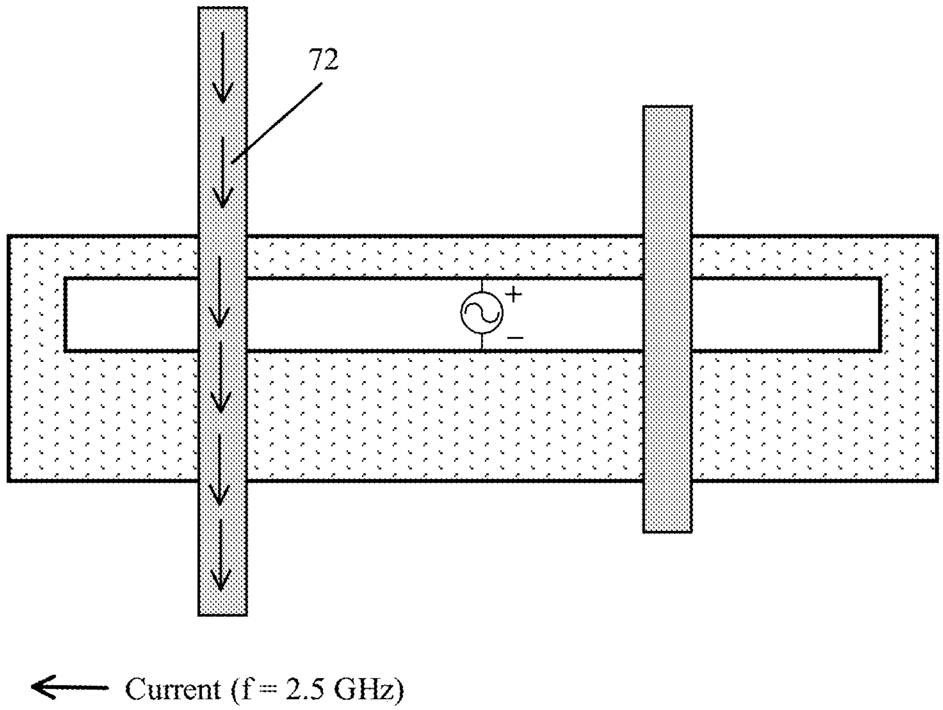
Figure 12F:
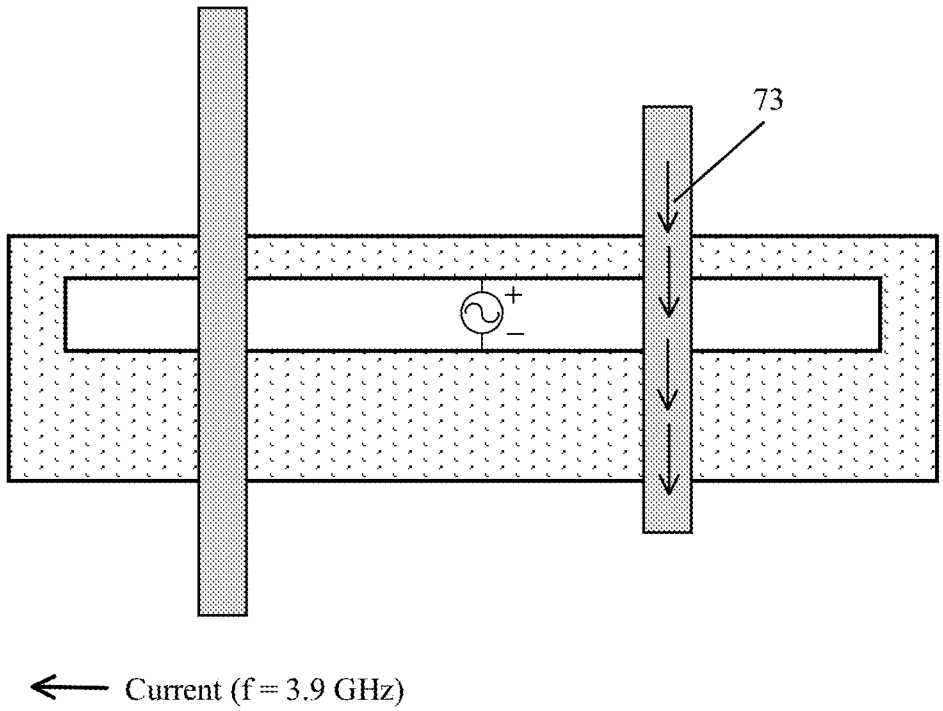

FIG. 12D to FIG. 12F show current distribution examples of the resonances "1", "2", and "3". As shown in FIG. 12D, a current 71 of the resonance "1" is distributed in opposite directions on the slot antenna 63 surrounding the slot 60, and specifically, is symmetrically distributed in opposite directions on two sides of the feed point 65. The current is weak in the vicinity of a middle of the slot 60 and strong in the vicinity of two ends of the slot 60. In Embodiment 3, the current 71 surrounding the slot 63 may be referred to as a first current. As shown in FIG. 12E, a current 72 of the resonance "2" is distributed in a same direction on the longer wire antenna 61, and is strong in a middle of the wire antenna 61 and weak at two ends of the wire antenna 61. As indicated in FIG. 12F, a current 73 of the resonance "3" is distributed in a same direction on the shorter wire antenna 61, and is strong in a middle of the wire antenna 61 and weak at two ends of the wire antenna 61. In Embodiment 3, the current on the wire antenna 61 may be referred to as a second current.

A wavelength mode in which the slot antenna 63 generates the resonance "1" is not limited, and the resonance "1" may alternatively be generated by a one-wavelength mode, a three-half wavelength mode, or the like of the slot antenna 63. A wavelength mode in which the longer wire antenna 61 generates the resonance "2" is not limited, and the resonance "2" may alternatively be generated by a three-half wavelength mode, a five-half wavelength mode, or the like of the longer wire antenna 61. A wavelength mode in which the shorter wire antenna 61 generates the resonance "3" is not limited, and the resonance "3" may alternatively be generated by a three-half wavelength mode, a five-half wavelength mode, or the like of the shorter wire antenna 61.

In the antenna structure example shown in FIG. 12A and FIG. 12B, there are two wire antennas 61 of different lengths. Not limited to this, the antenna structure may alternatively have more wire antennas 61. In other words, the fed slot antenna 63 may be simultaneously coupled to more than two wire antennas 61, to cover more frequency bands. The antenna structure may alternatively have only one wire antenna 61. Projections of the two or more wire antennas 61 of different lengths on the slotted plane may be parallel to each other. Optionally, the two or more wire antennas 61 may be located on a same plane, and the plane may be parallel to the slotted plane. The plane may be referred to as a first plane. Because the two or more wire antennas 61 have different lengths, frequencies of the second current distributed on the two or more wire antennas are also different.

In addition to the 1.6 GHz frequency band, the 2.5 GHz frequency band, and the 3.9 GHz frequency band shown in FIG. 12C, the antenna structure example shown in FIG. 12A and FIG. 12B may generate a resonance of another frequency band, which may be set by adjusting sizes of antenna radiators (for example, the slot antenna 63 and the wire antenna 61) in the antenna structure.

In an embodiment of this application, a frequency band is a frequency range. For example, the 2.5 GHz frequency band may be a frequency range from 2.4835 GHz to 2.5835 GHz, that is, a frequency range in the vicinity of 2.5 GHz.

It may be learned that, in the antenna design solution provided in Embodiment 3, the fed slot antenna 63 works in the DM slot antenna mode, and may be further coupled to one or more wire antennas 61 that work in the DM wire antenna mode, to cover a plurality of frequency bands. In addition, the wire antenna 61 may be designed as a floating antenna disposed on the rear cover, does not occupy design space in the electronic device, and is little affected by internal components.

Embodiment 4

The same as Embodiment 3, an antenna structure provided in Embodiment 4 may also excite the DM wire antenna mode and the DM slot antenna mode. Different from Embodiment 3, a fed antenna in Embodiment 4 may be the DM wire antenna shown in FIG. 3A, and a coupled antenna may be the DM slot antenna shown in FIG. 5A.

Figure 13A:
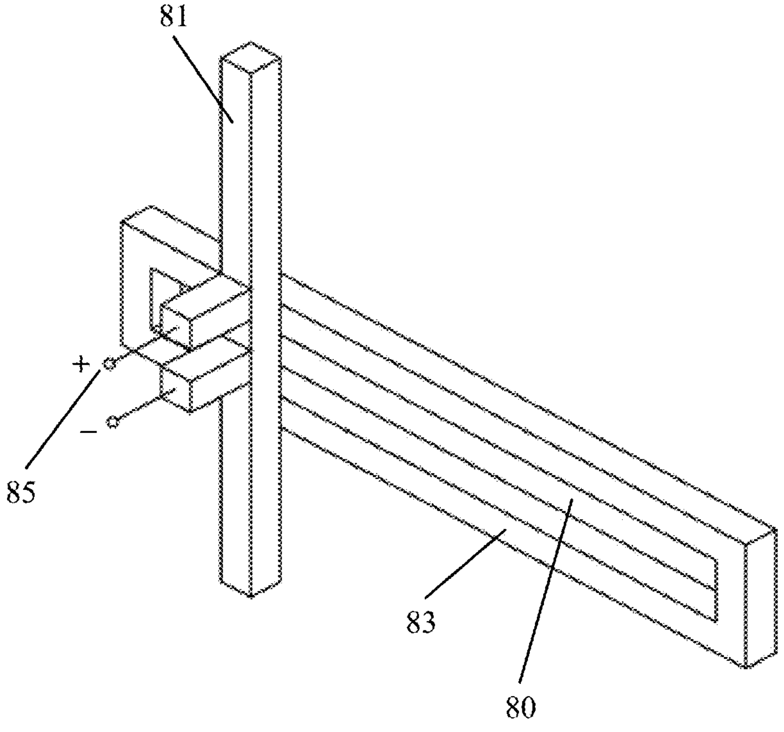
FIG. 13A and FIG. 13B show an antenna design solution according to embodiment 4.
Figure 13B:
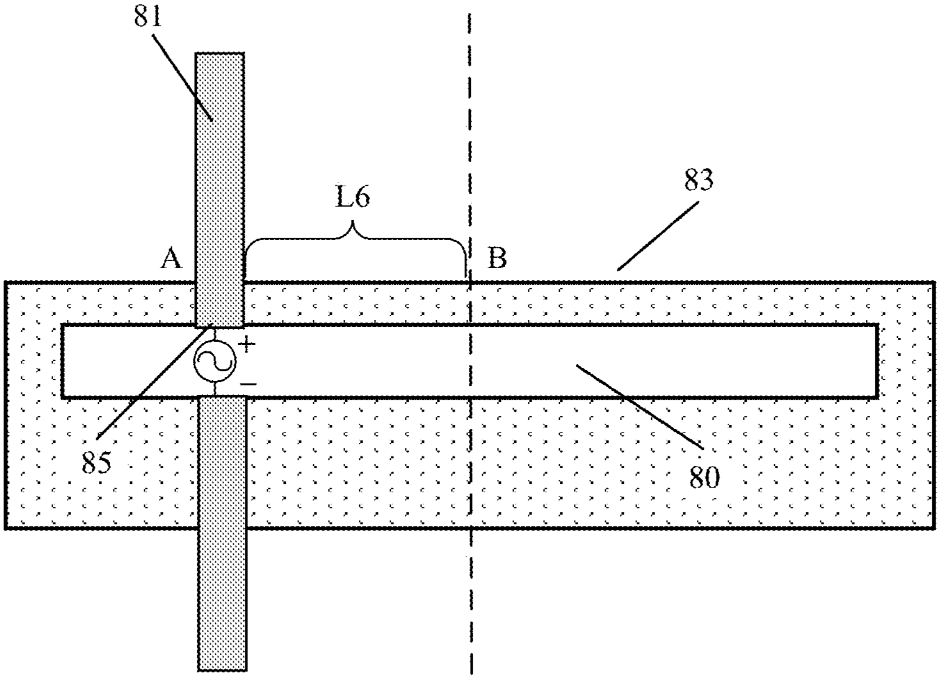

FIG. 13A and FIG. 13B show an antenna design solution according to embodiment 4. FIG. 13A is a three-dimensional schematic diagram of the antenna design solution, and FIG. 13B is a schematic top plane view of the antenna design solution. As shown in FIG. 12A and FIG. 12B, the antenna structure provided in Embodiment 4 may include a wire antenna 81 and a slot antenna 83.

The wire antenna 81 may be the DM wire antenna shown in FIG. 3A. A feed may be connected at a middle position of the wire antenna 81, that is, a feed position 85 of the wire antenna 81 may be the middle position of the wire antenna 81. Specifically, a positive electrode of the feed may be connected to one side of the middle position, and a negative electrode of the feed may be connected to the other side of the middle position. The wire antenna 81 may be a floating antenna, and may be disposed on an inner surface of a rear cover 21, or disposed on an outer surface of the rear cover 21, or built in the rear cover 21.

The slot antenna 83 may be the DM slot antenna shown in FIG. 5A. The slot antenna 83 may include a metal plate and a slot 80. The slot antenna 83 may be formed by slotting the metal plate (for example, a PCB ground plate). The slot 80 may be filled with materials such as a polymer, glass, ceramics, or a combination of these materials.

The wire antenna 81 may be parallel to a plane on which the slot antenna 83 is located, and perpendicular to the slot 80 of the slot antenna 83. The plane may be referred to as a slotted plane, that is, a plane on which the metal plate is located. A projection of the wire antenna 81 on the slotted plane and the slot 80 of the slot antenna 83 may intersect at a middle position of the projection. A distance L6 between an intersecting part A, of the projection of the wire antenna 81 on the slotted plane and the slot 80, and a middle position B of the slot antenna 83 may be greater than an eighth of an operating wavelength 4 and less than half of the operating wavelength 4. The operating wavelength 4 is an operating wavelength of the slot antenna 83. In Embodiment 4, the operating wavelength 4 may be referred to as a first wavelength.

For a related description of a coupling distance between the fed wire antenna 81 and the slot antenna 83, refer to Embodiment 3, and details are not described herein.

The following describes a resonance mode that may be generated by an antenna structure example shown in FIG. 13A and FIG. 13B.

Figure 13C:
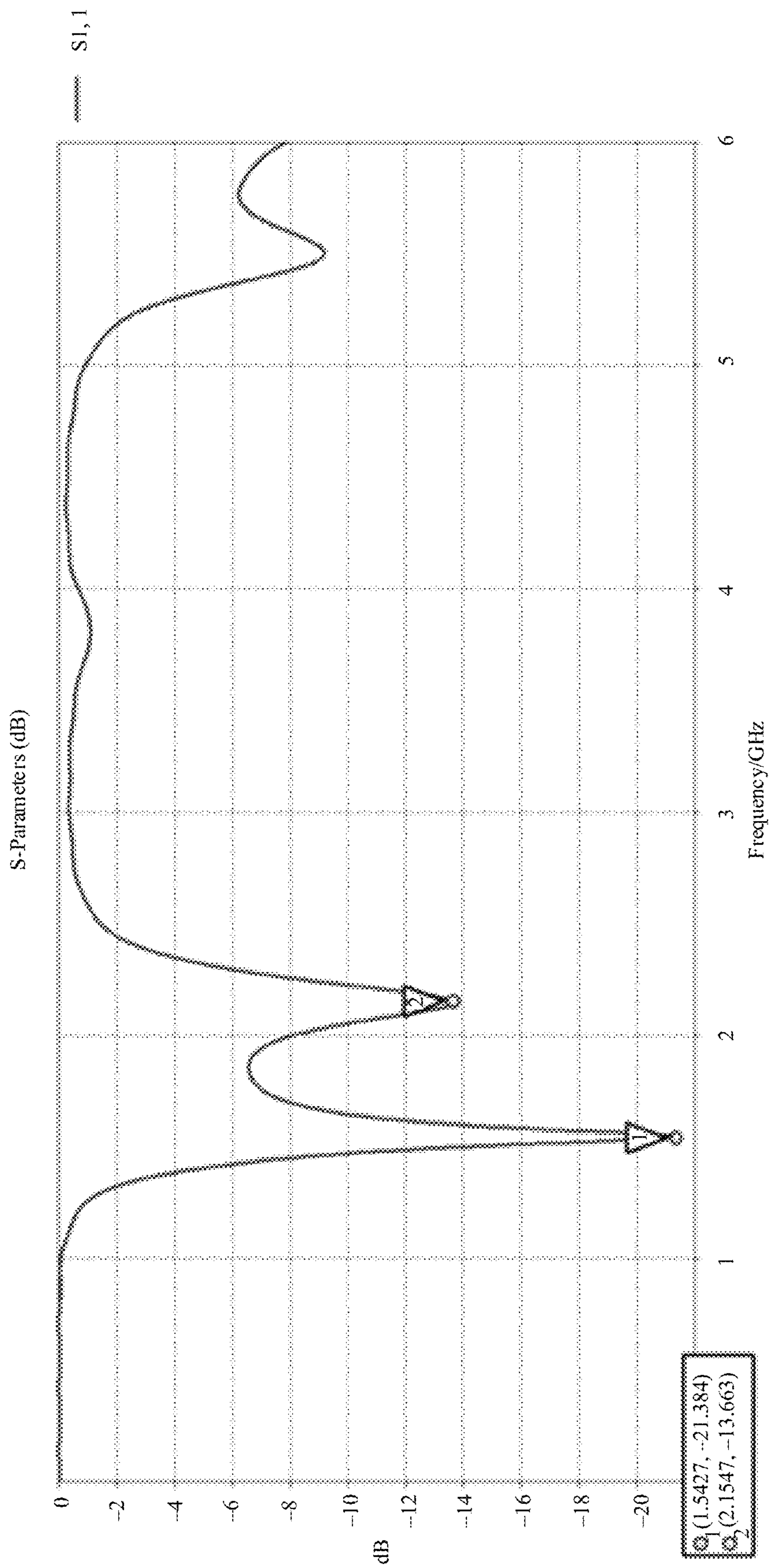
FIG. 13C shows a resonance mode generated by an antenna structure shown in FIG. 13A and FIG. 13B.

Referring to FIG. 13C, “1” and “2” in FIG. 13C represent different resonances. The coupled antenna structure may generate the resonance “1” in the vicinity of 1.5 GHz and the resonance “2” in the vicinity of 2.1 GHz. Specifically, the resonance “1” may be generated by a half-wavelength mode of the wire antenna 81, and the resonance “2” may be generated by a half-wavelength mode of the slot antenna 83.

Figure 13D:
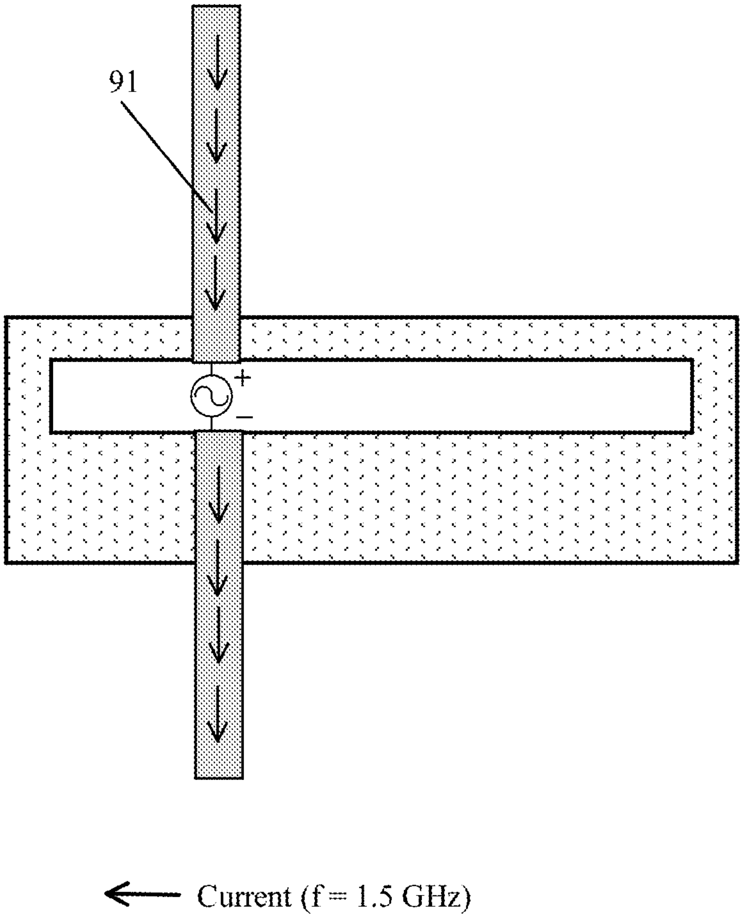
FIG. 13D and FIG. 13E show current distribution of each resonance in FIG. 13C.
Figure 13E:
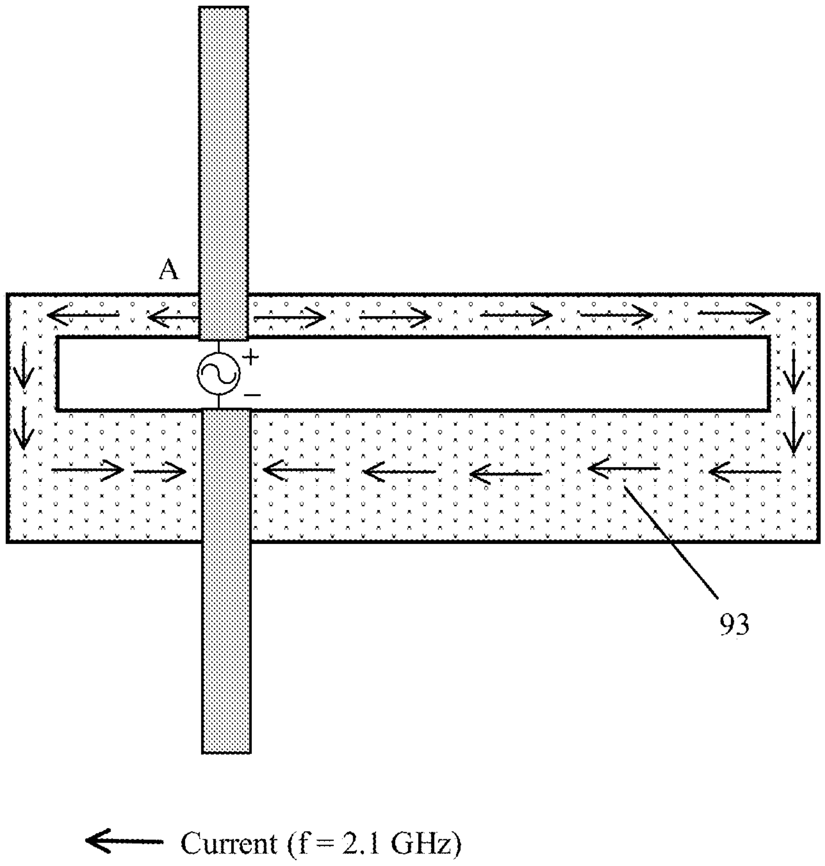

FIG. 13D and FIG. 13E show current distribution examples of the resonances “1” and “2”. As shown in FIG. 13D, a current 91 of the resonance “1” is distributed in a same direction on the wire antenna 81, and specifically, is strong in a middle of the wire antenna 81 and weak at two ends of the wire antenna 81. As shown in FIG. 13E, a current 93 of the resonance “2” is distributed in opposite directions on the slot antenna 83 surrounding the slot 80, and specifically, is distributed in opposite directions on two sides of the position B. The current is weak in the vicinity of the position B and strong in the vicinity of two ends of the slot 80.

In addition to the 1.5 GHz frequency band and the 2.1 GHz frequency band shown in FIG. 13C, the antenna structure example shown in FIG. 13A and FIG. 13B may generate a resonance of another frequency band, which may be set by adjusting sizes of antenna radiators (for example, the slot antenna 83 and the wire antenna 81) in the antenna structure.

It may be learned that, in the antenna design solution provided in Embodiment 4, the fed wire antenna 81 works in the DM wire antenna mode, and may be further coupled to the slot antenna 83 that works in the DM slot antenna mode, to cover a plurality of frequency bands. The wire antenna 81 may be designed as a floating antenna disposed on the rear cover, does not occupy design space in the electronic device, and is little affected by internal components. In the antenna structure, the fed wire antenna 81 may be further coupled to more slot antennas 83 of different sizes, to cover more frequency bands.

Embodiment 5

In Embodiment 5, a fed antenna may be a CM wire antenna shown in FIG. 2A, a coupled antenna may be a CM slot antenna shown in FIG. 4A, and a CM wire antenna mode and a CM slot antenna mode may be excited.

Figure 14A:
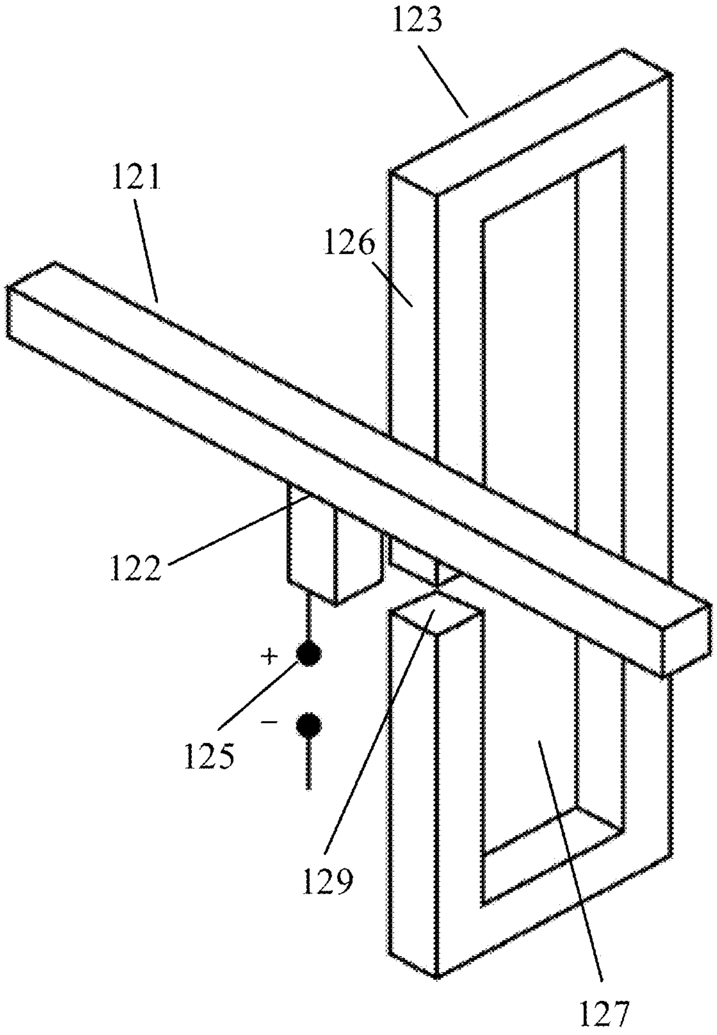
FIG. 14A and FIG. 14B show an antenna design solution according to embodiment 5.
Figure 14B:
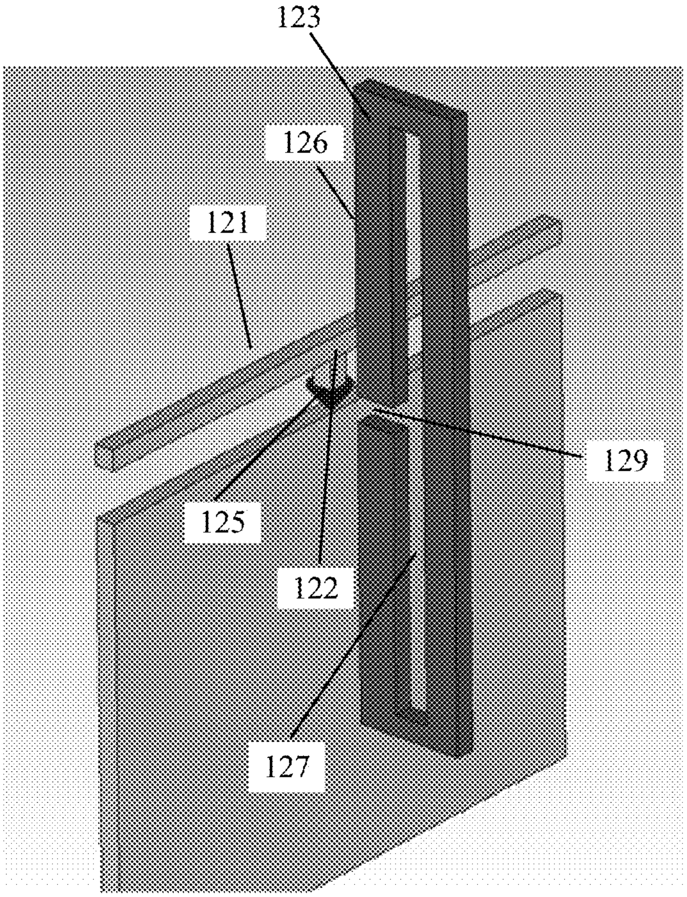

FIG. 14A and FIG. 14B show an antenna design solution according to embodiment 5. As shown in FIG. 14A and FIG. 14B, an antenna structure provided in Embodiment 5 may include a wire antenna 121 and a slot antenna 123.

The wire antenna 121 may be the CM wire antenna shown in FIG. 2A. A feed position 122 of the wire antenna 121 may be disposed at a middle position of the wire antenna 121. The feed position 122 may be connected to a feed 125. A positive electrode of the feed 125 may be connected to the feed position 122, and a negative electrode of the feed 125 may be connected to ground (for example, a ground plate).

The slot antenna 123 may be the CM slot antenna shown in FIG. 4A. The slot antenna 123 may be formed by slotting a metal plate. The slot antenna 123 may include a slot 127. An opening 129 may be disposed on a side 126 that is of the slot 127 and that is close to the wire antenna 121, and the opening 129 may be disposed at the middle position of the side. The slot 127 may be filled with materials such as a polymer, glass, ceramics, or a combination of these materials. The opening 129 may also be filled with materials such as a polymer, glass, ceramics, or a combination of these materials.

The fed wire antenna 121 and the slot antenna 123 may be close to and perpendicular to each other at middle positions of the fed wire antenna 121 and the slot antenna 123. Specifically, on the side 126 of the slot antenna 123, the wire antenna 121 may be perpendicular to a plane on which the slot antenna 123 is located. The plane may be referred to as a slotted plane, that is, a plane on which the metal plate is located. The plane on which the slot antenna 123 is located may be perpendicular to the wire antenna 121 at the middle position of the wire antenna 121. The positive electrode of the feed connected to the wire antenna 121 may be located on one side of the opening 129 of the slot antenna 123, and the negative electrode of the feed connected to the wire antenna 121 may be located on the other side of the opening 129 of the slot antenna 123.

A coupling distance between the wire antenna 121 and the slot antenna 123 may be a distance between the plane on which the slot antenna 123 is located and the wire antenna 121. The distance may be less than a specific value, for example, 1 mm. It should be understood that a smaller coupling distance leads to a stronger coupling effect. A specific value of the coupling distance is not limited in this application, provided that the fed wire antenna 121 can be coupled to the slot antenna 123.

The following describes a resonance mode that may be generated by an antenna structure example shown in FIG. 14A and FIG. 14B.

Figure 14C:
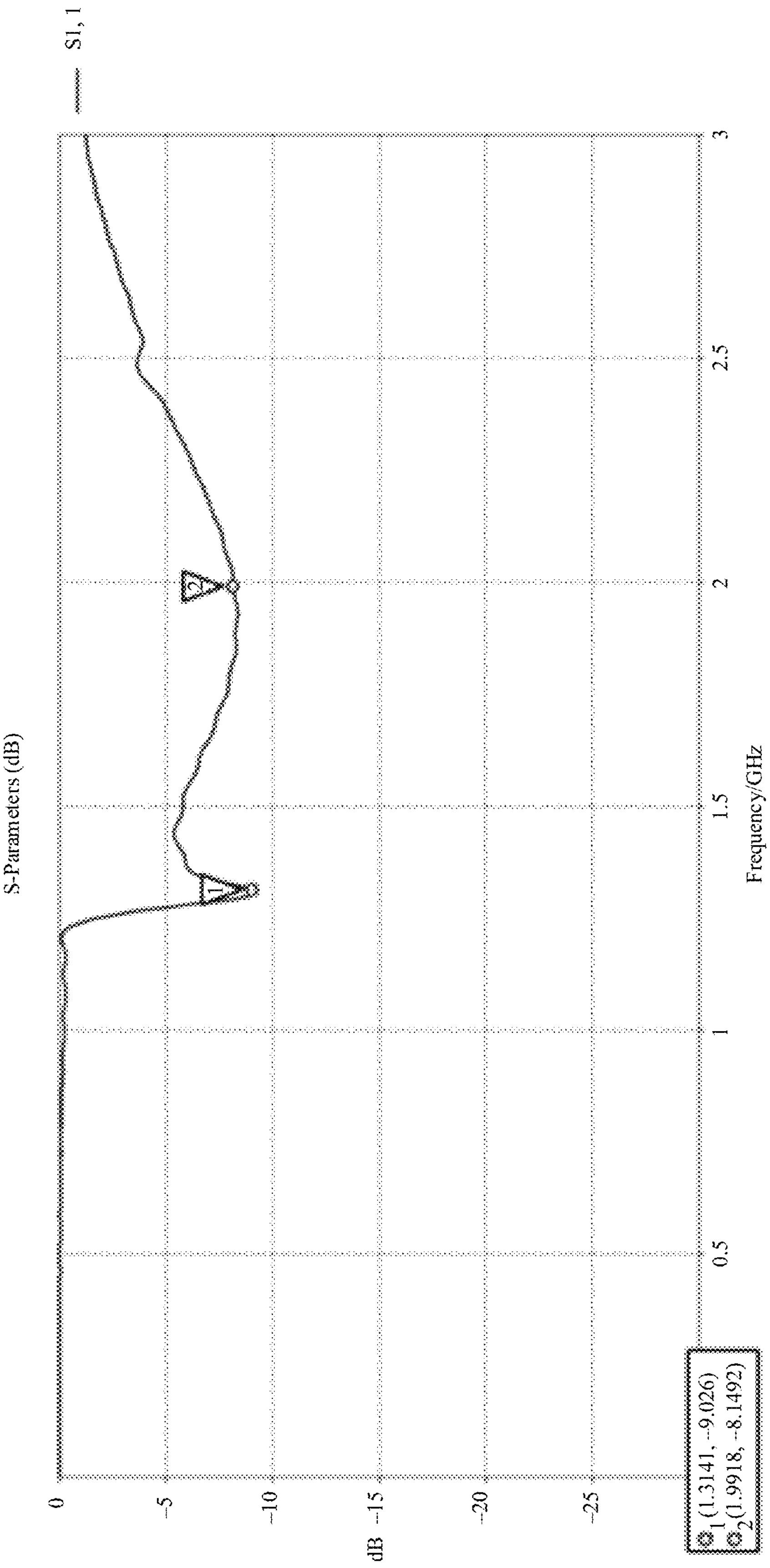
FIG. 14C shows a resonance mode generated by an antenna structure shown in FIG. 14A and FIG. 14B.

Referring to FIG. 14C, “1” and “2” in FIG. 14C represent different resonances. The coupled antenna structure may generate the resonance “1” in the vicinity of 1.3 GHz and the resonance “2” in the vicinity of 2.0 GHz. Specifically, the resonance “1” may be generated by a quarter-wavelength mode of the slot antenna 123, and the resonance “2” may be generated by a quarter-wavelength mode of the wire antenna 121.

Figure 14D:
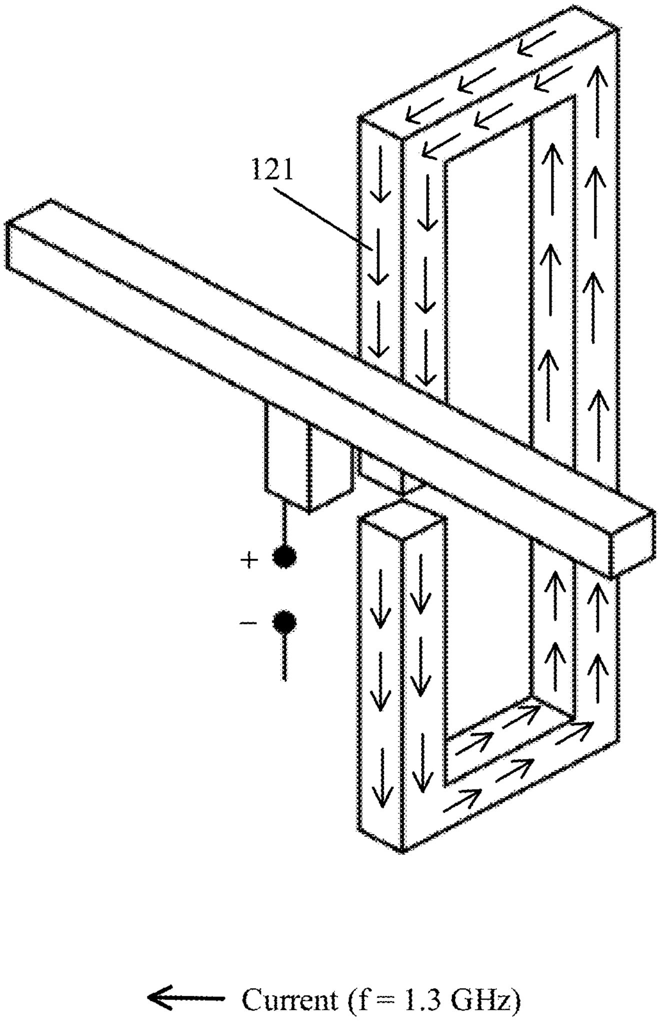
FIG. 14D and FIG. 14E show current distribution of each resonance in FIG. 14C.
Figure 14E:
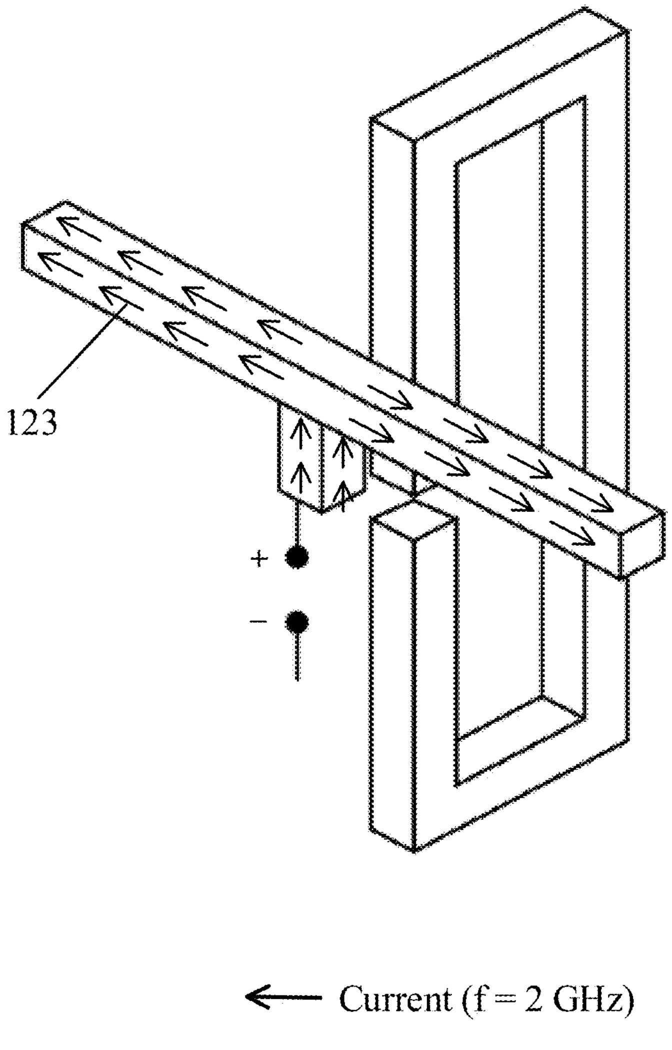

FIG. 14D and FIG. 14E show current distribution examples of the resonances “1” and “2”. As shown in FIG. 14D, a current 121 of the resonance “1” is distributed in a same direction on the slot antenna 123 surrounding the slot 127. Specifically, the current is weak in the vicinity of a middle of the slot 127 and strong in the vicinity of two ends of the slot 127. As shown in FIG. 14E, a current 123 of the resonance “2” is distributed in opposite directions on the wire antenna 121, and specifically, is symmetrically distributed in opposite directions on two sides of the feed point 125. The current is strong in a middle of the wire antenna 121 and weak at two ends of the wire antenna 121.

A wavelength mode in which the slot antenna 123 generates the resonance “1” is not limited, and the resonance “1” may alternatively be generated by a three-quarter wavelength mode or the like of the slot antenna 123. A wavelength mode in which the wire antenna 121 generates the resonance “2” is not limited, and the resonance “2” may alternatively be generated by a three-quarter wavelength mode or the like of the wire antenna 121.

In addition to the 1.3 GHz frequency band and the 2.0 GHz frequency band shown in FIG. 14C, the antenna structure example shown in FIG. 14A may generate a resonance of another frequency band, which may be set by adjusting sizes of antenna radiators (for example, the slot antenna 123 and the wire antenna 121) in the antenna structure.

It may be learned that, in the antenna design solution provided in Embodiment 5, the fed wire antenna 121 works in the CM wire antenna mode, and may be further coupled to the slot antenna 123 that works in the CM slot antenna mode, to cover a plurality of frequency bands. In the antenna structure, the fed wire antenna 121 may be further coupled to more slot antennas 123 of different sizes, to cover more frequency bands.

Embodiment 6

The same as Embodiment 5, an antenna structure provided in Embodiment 6 may also excite the CM wire antenna mode and the CM slot antenna mode. Different from Embodiment 5, a fed antenna in Embodiment 6 may be the CM slot antenna shown in FIG. 4A, and a coupled antenna may be the CM wire antenna shown in FIG. 2A.

For a position relationship between the CM wire antenna and the CM slot antenna in the antenna structure provided in Embodiment 6, refer to the position relationship between the wire antenna 121 and the slot antenna 123 in Embodiment 5, and details are not described herein. A feed may be connected at the opening 129 of the CM slot antenna. The positive electrode of the feed may be connected to one side of the opening 129, and the negative electrode of the feed may be connected to the other side of the opening 129.

Embodiment 7

In Embodiment 7, a fed antenna may be a CM wire antenna shown in FIG. 2A, a coupled antenna may be a DM slot antenna shown in FIG. 5A, and a CM wire antenna mode and a DM slot antenna mode may be excited.

Figure 15A:
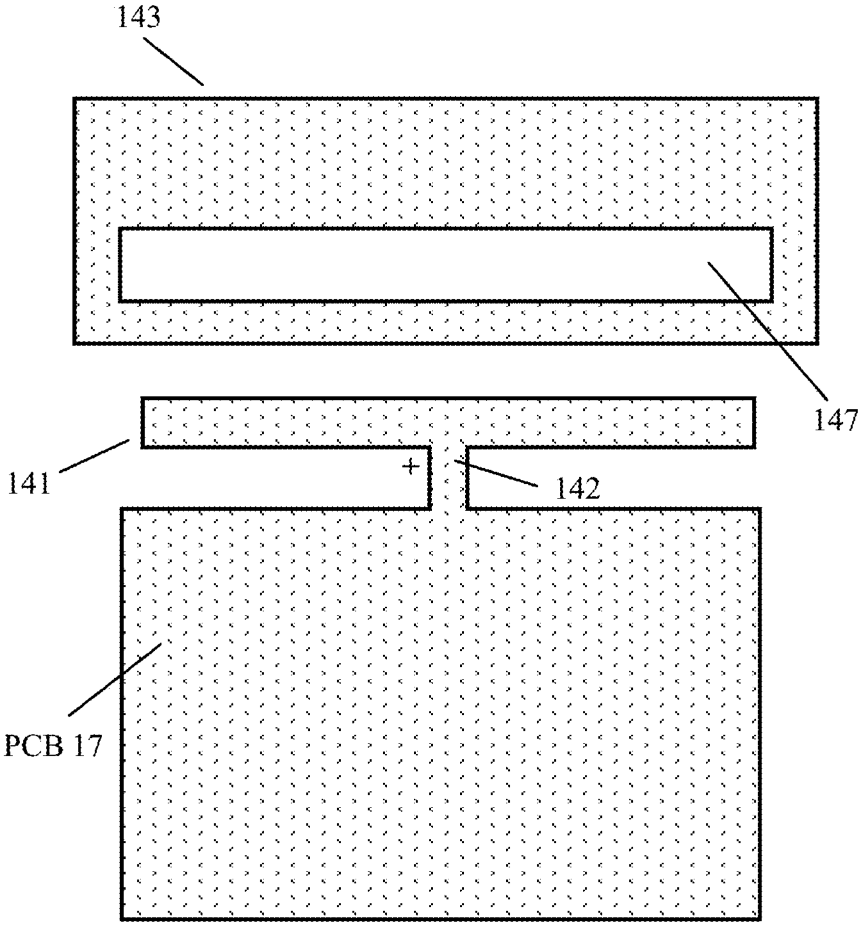
FIG. 15A and FIG. 15B show an antenna design solution according to embodiment 7.
Figure 15B:
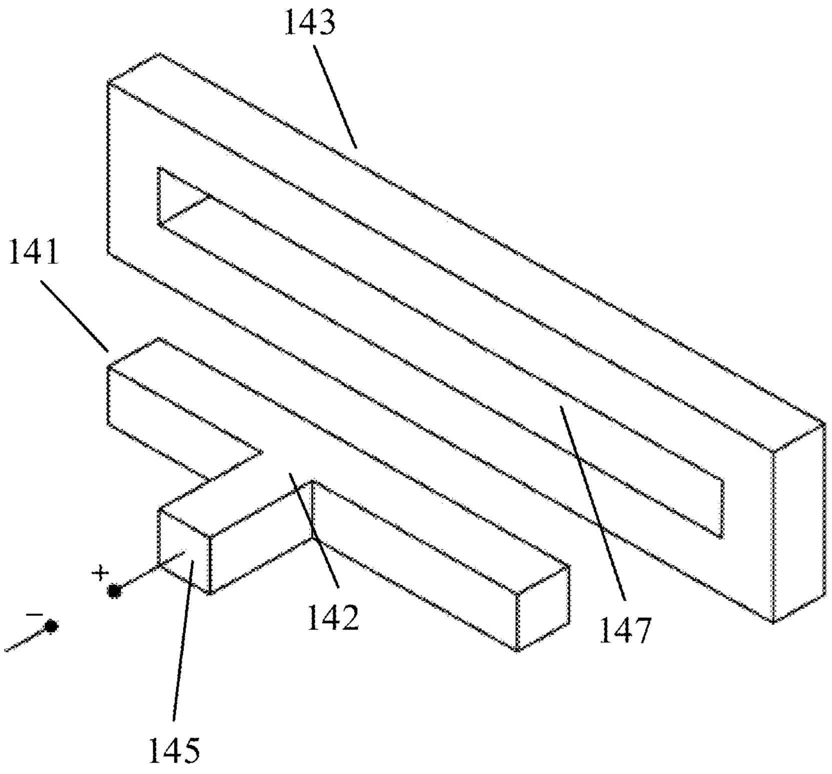

FIG. 15A and FIG. 15B show an antenna design solution according to embodiment 7. As shown in FIG. 15A, an antenna structure provided in Embodiment 7 may include a wire antenna 141 and a slot antenna 143. In FIG. 15A, the wire antenna 141 and the slot antenna 143 may be coplanar. In FIG. 15B, a plane of the wire antenna 141 and a plane of the slot antenna 143 may be perpendicular to each other.

The wire antenna 141 may be the CM wire antenna shown in FIG. 2A. A feed position 142 of the wire antenna 141 may be disposed at a middle position of the wire antenna 141. The feed position 142 may be connected to a feed. A positive electrode of the feed may be connected to the feed position 142, and a negative electrode of the feed may be connected to ground (for example, a ground plate).

The slot antenna 143 may be the DM slot antenna shown in FIG. 5A. The slot antenna 143 may be formed by slotting a metal plate. The slot antenna 143 may include a slot 147. The slot 147 may be filled with materials such as a polymer, glass, ceramics, or a combination of these materials.

The fed wire antenna 141 and the slot antenna 143 may be close to and parallel to each other. Specifically, the wire antenna 141 may be parallel to the slot antenna 143, and a connection line between the middle position of the wire antenna 141 and a middle position of the slot antenna 143 may be perpendicular to both the wire antenna 141 and the slot antenna 143. In other words, the wire antenna 141 and the slot 147 share a perpendicular bisector plane.

A coupling distance between the wire antenna 141 and the slot antenna 143 may be a distance between the wire antenna 141 and the slot antenna 143. The distance may be less than a specific value, for example, 5 mm. It should be understood that a smaller coupling distance leads to a stronger coupling effect. A specific value of the coupling distance is not limited in this application, provided that the fed wire antenna 141 can be coupled to the slot antenna 143.

The following describes a resonance mode that may be generated by an antenna structure example shown in FIG. 15A and FIG. 15B.

Figure 15C:
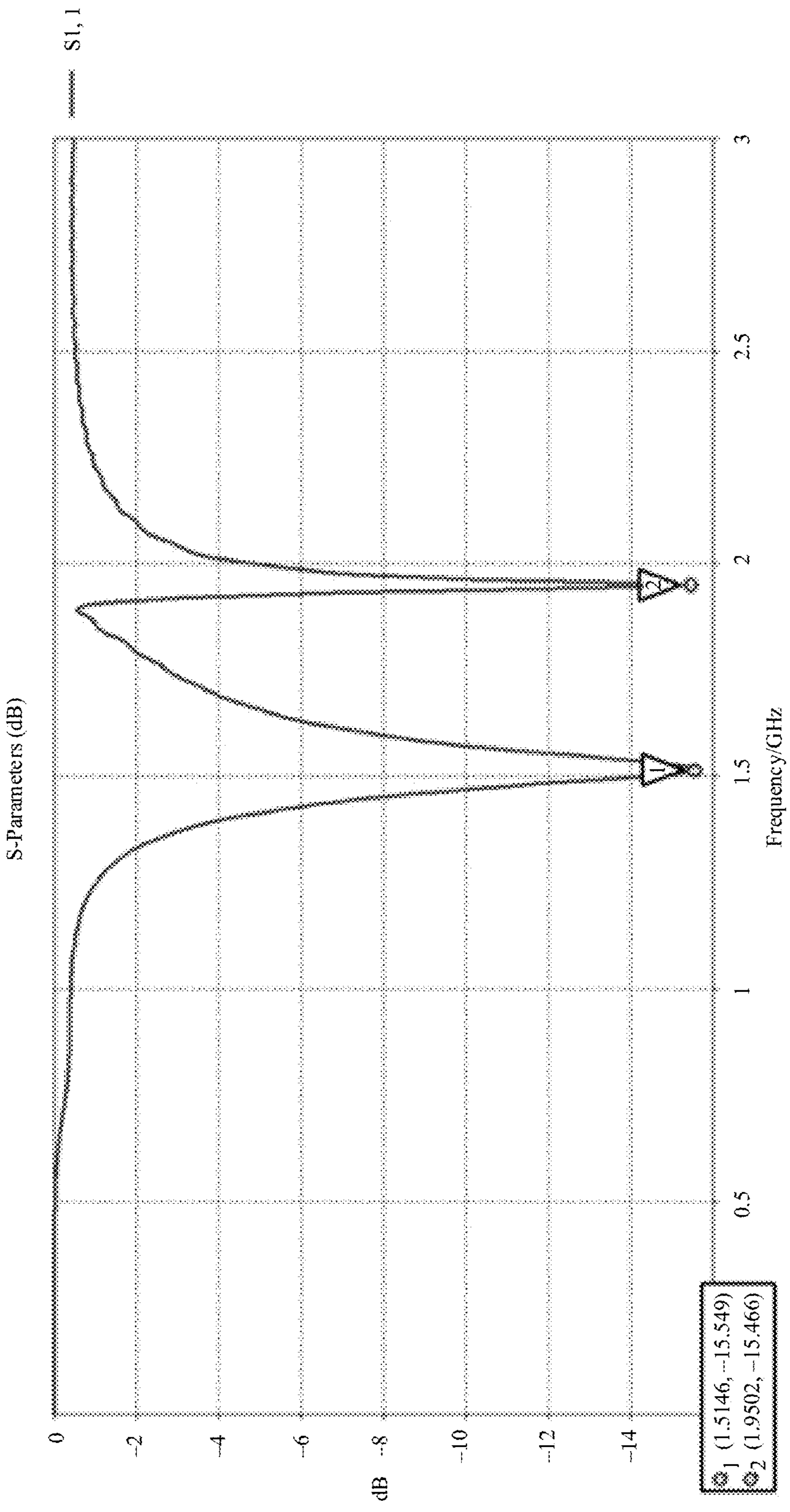
FIG. 15C shows a resonance mode generated by an antenna structure shown in FIG. 15A and FIG. 15B.

Referring to FIG. 15C, "1" and "2" in FIG. 15C represent different resonances. The coupled antenna structure may generate the resonance "1" in the vicinity of 1.51 GHz and the resonance "2" in the vicinity of 1.95 GHz. Specifically, the resonance "1" may be generated by a quarter-wavelength mode of the wire antenna 141, and the resonance "2" may be generated by a half-wavelength mode of the slot antenna 143.

Figure 15D:
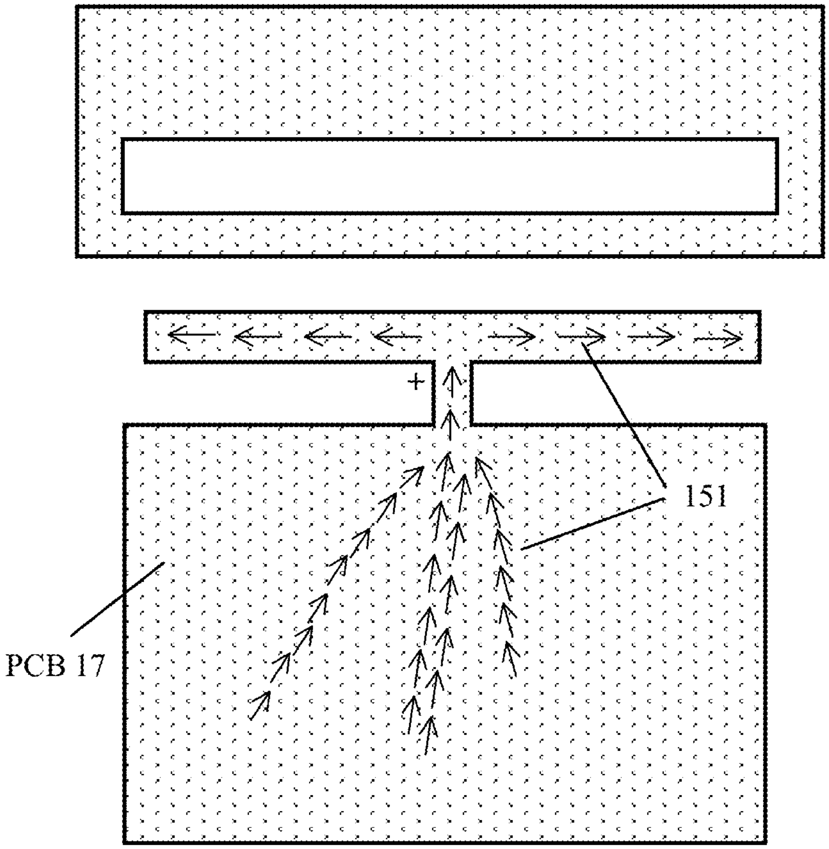
FIG. 15D and FIG. 15E show current distribution of each resonance in FIG. 15C.
Figure 15E:
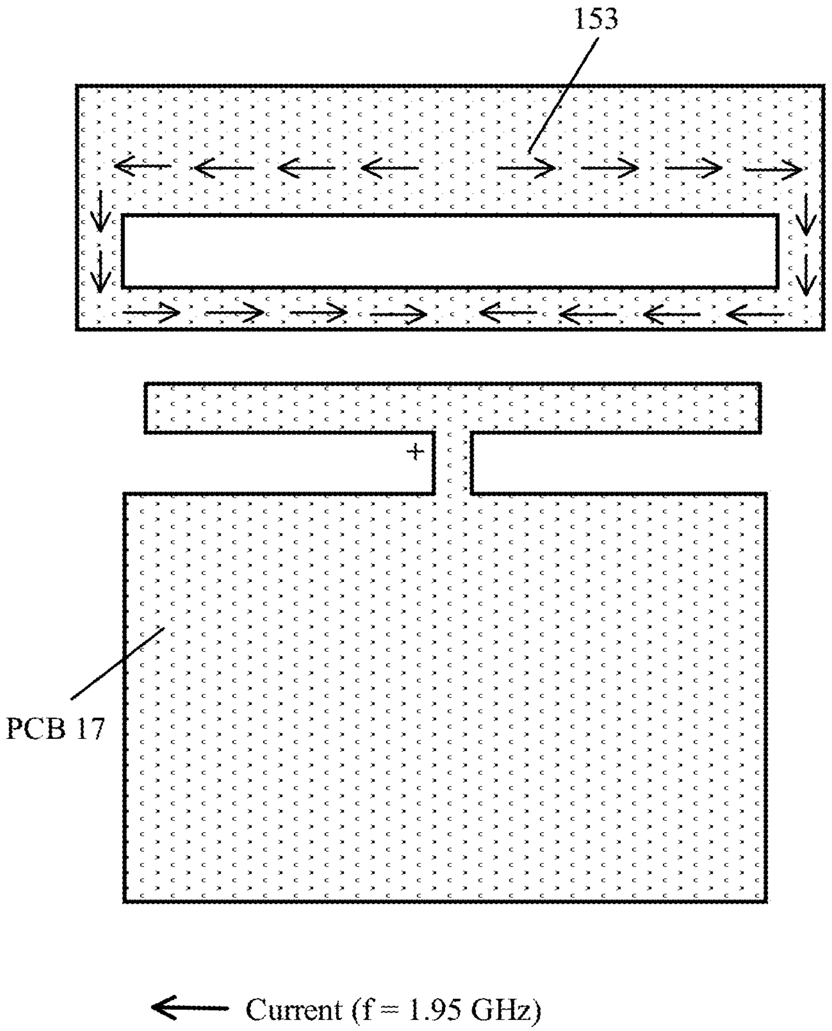

FIG. 15D and FIG. 15E show current distribution examples of the resonances "1" and "2". As shown in FIG. 15D, a current 151 of the resonance "1" is distributed on the wire antenna 141 and the ground plate, that is, the wire antenna 141 further excites the ground plate to generate radiation. The current 151 is symmetrically distributed in opposite directions on the wire antenna 141, and is strong in a middle of the wire antenna 141 and weak at two ends of the wire antenna 121. As shown in FIG. 15E, a current 153 of the resonance "2" is distributed in opposite directions on the slot antenna 143 surrounding the slot 147, and specifically, is symmetrically distributed in opposite directions on two sides of a middle position of the slot 147. The current is weak in the vicinity of a middle of the slot 147 and strong in the vicinity of two ends of the slot 147.

A wavelength mode in which the wire antenna 141 generates the resonance "1" is not limited, and the resonance "1" may alternatively be generated by a three-quarter wavelength mode or the like of the wire antenna 141. A wavelength mode in which the slot antenna 143 generates the resonance "2" is not limited, and the resonance "2" may alternatively be generated by a one-wavelength mode, a three-half wavelength mode, or the like of the slot antenna 143.

In addition to the 1.51 GHz frequency band and the 1.95 GHz frequency band shown in FIG. 15C, the antenna structure example shown in FIG. 15A and FIG. 15B may generate a resonance of another frequency band, which may be specifically set by adjusting sizes of antenna radiators (for example, the wire antenna 141 and the slot antenna 143) in the antenna structure.

It may be learned that, in the antenna design solution provided in Embodiment 7, the fed wire antenna 141 works in the CM wire antenna mode, and may be further coupled to the slot antenna 143 that works in the DM slot antenna mode, to cover a plurality of frequency bands. In the antenna structure, the fed wire antenna 121 may be further coupled to more slot antennas 123 of different sizes, to cover more frequency bands.

Embodiment 8

The same as Embodiment 7, an antenna structure provided in Embodiment 8 may also excite the CM wire antenna mode and the DM slot antenna mode. Different from Embodiment 7, a fed antenna in Embodiment 8 may be the DM slot antenna shown in FIG. 5A, and a coupled antenna may be the CM wire antenna shown in FIG. 2A.

Figure 16:
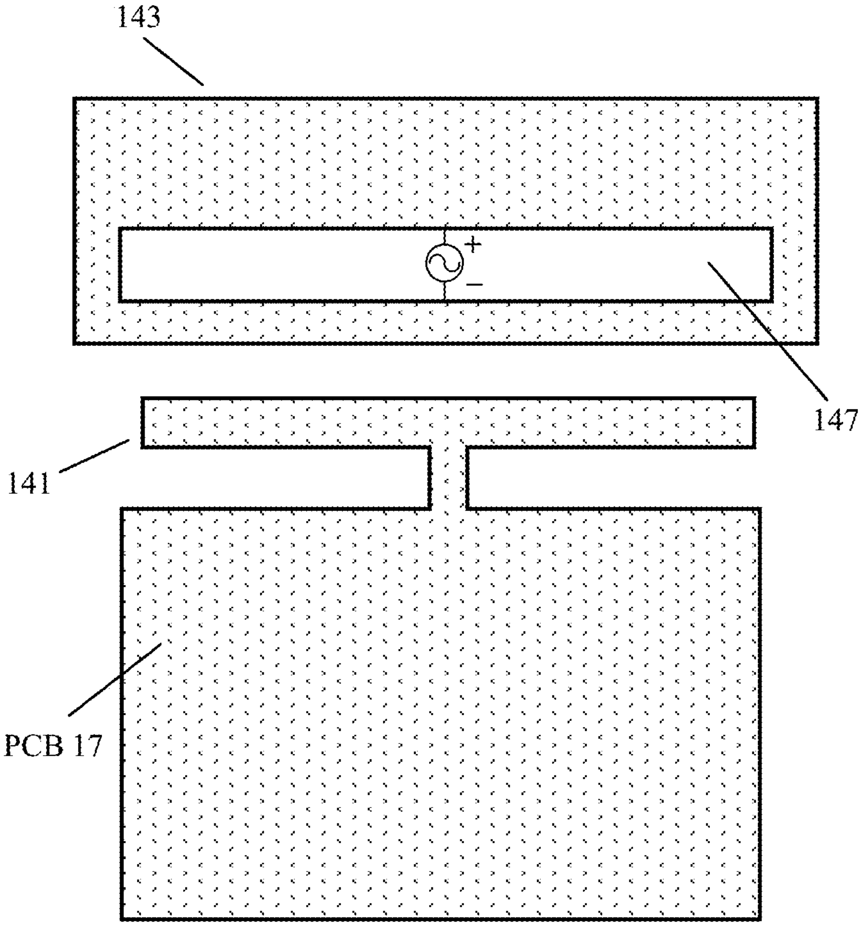
FIG. 16 shows an antenna design solution according to embodiment 8.

As shown in FIG. 16, for a position relationship between the CM wire antenna and the DM slot antenna in the antenna structure provided in Embodiment 8, refer to the position relationship between the wire antenna 121 and the slot antenna 123 in Embodiment 7, and details are not described herein. A feed position of the DM slot antenna may be disposed at a middle position of the DM slot antenna. At the feed position, a positive electrode of a feed is connected to one side of the DM slot antenna, and a negative electrode of the feed is connected to the other side of the DM slot antenna.

Embodiment 9

In Embodiment 9, a fed antenna may be a DM wire antenna shown in FIG. 3A, a coupled antenna may be a CM slot antenna shown in FIG. 4A, and a DM wire antenna mode and a CM slot antenna mode may be excited.

Figure 17A:
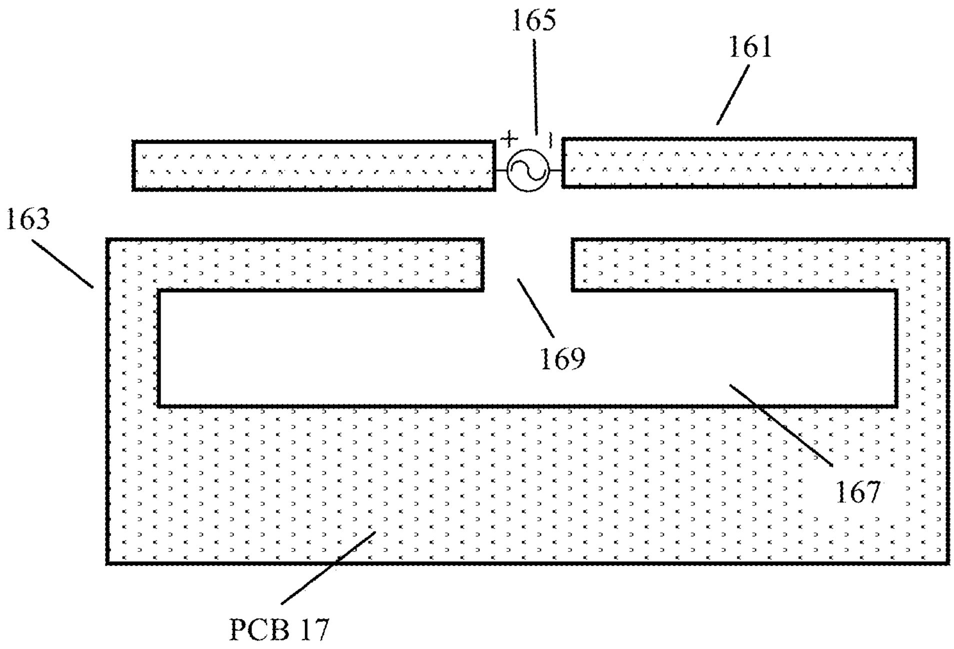
FIG. 17A shows an antenna design solution according to embodiment 9.

FIG. 17A shows an antenna design solution according to Embodiment 9. As shown in FIG. 17A, an antenna structure provided in Embodiment 9 may include a wire antenna 161 and a slot antenna 163.

The wire antenna 161 may be the DM wire antenna shown in FIG. 3A. A feed may be connected at a middle position of the wire antenna 161, that is, a feed position 165 of the wire antenna 161 may be the middle position of the wire antenna 161. Specifically, a positive electrode of the feed may be connected to one side of the middle position, and a negative electrode of the feed may be connected to the other side of the middle position. The wire antenna 161 may be a floating antenna, and may be disposed on an inner surface of a rear cover 21, or disposed on an outer surface of the rear cover 21, or built in the rear cover 21.

The slot antenna 163 may be the CM slot antenna shown in FIG. 4A. The slot antenna 163 may be formed by slotting a metal plate. The slot antenna 163 may include a slot 167. An opening 169 may be disposed on a side that is of the slot 167 and that is close to the wire antenna 161, and the opening 169 may be disposed at the middle position of the side. The slot 167 may be filled with materials such as a polymer, glass, ceramics, or a combination of these materials. The opening 169 may also be filled with materials such as a polymer, glass, ceramics, or a combination of these materials.

The fed wire antenna 161 and the slot antenna 163 may be close to and parallel to each other. Specifically, the wire antenna 161 may be parallel to the slot antenna 163, and a connection line between the middle position of the wire antenna 161 and a middle position of the slot antenna 163 may be perpendicular to both the wire antenna 161 and the slot antenna 163. In other words, a radiation strip 141-A and the slot 147 share a perpendicular bisector plane.

A coupling distance between the wire antenna 161 and the slot antenna 163 may be a distance between the wire antenna 161 and the slot antenna 163. The distance may be less than a specific value, for example, 5 mm. It should be understood that a smaller coupling distance leads to a stronger coupling effect. A specific value of the coupling distance is not limited in this application, provided that the fed wire antenna 161 can be coupled to the slot antenna 163.

Figure 17B:
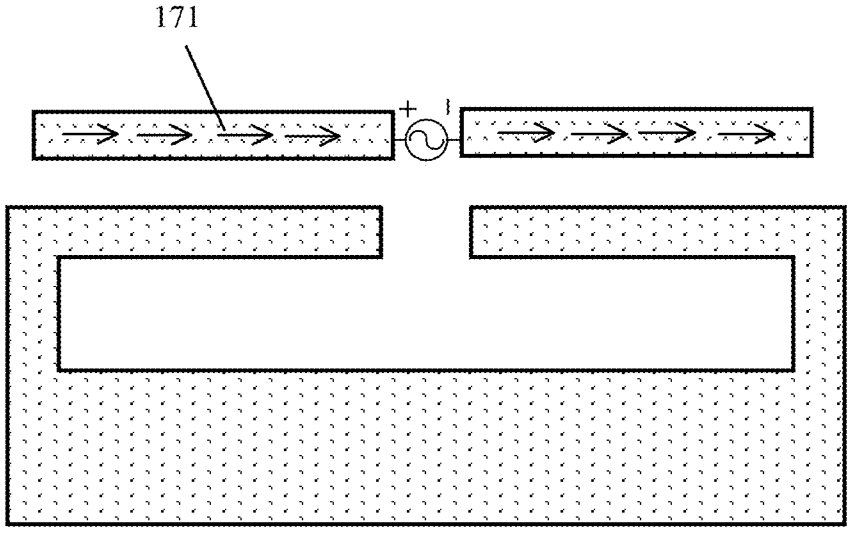
FIG. 17B and FIG. 17C show a modal current and a modal electric field of an antenna structure shown in FIG. 17A.
Figure 17C:
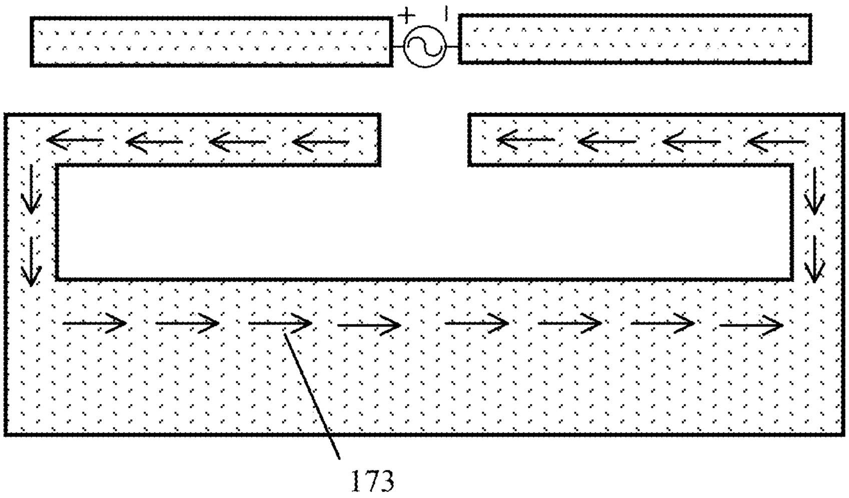

FIG. 17B and FIG. 17C show current distribution examples of the DM wire antenna mode and the CM slot antenna mode. As shown in FIG. 17B, a current 171 of the DM wire antenna mode is distributed in a same direction on the wire antenna 161. The current 171 is strong in a middle of the wire antenna 161 and weak at two ends of the wire antenna 161. As shown in FIG. 17C, a current 173 of the CM slot antenna mode is distributed in a same direction on the slot antenna 163 surrounding the slot 167. The current 173 is specifically weak in the vicinity of a middle of the slot 167 and strong in the vicinity of two ends of the slot 167.

In the antenna design solution provided in Embodiment 9, the fed wire antenna 161 works in the DM wire antenna mode, and may be further coupled to the slot antenna 163 that works in the CM slot antenna mode, to cover a plurality of frequency bands. The wire antenna 161 may be designed as a floating antenna disposed on the rear cover, does not occupy design space in the electronic device, and is little affected by internal components. In the antenna structure, the fed wire antenna 161 may be further coupled to more slot antennas 163 of different sizes, to cover more frequency bands.

Embodiment 10

The same as Embodiment 9, an antenna structure provided in Embodiment 10 may also excite the DM wire antenna mode and the CM slot antenna mode. Different from Embodiment 9, a fed antenna in Embodiment 10 may be the CM slot antenna shown in FIG. 4A, and a coupled antenna may be the DM wire antenna shown in FIG. 3A.

Figure 18:
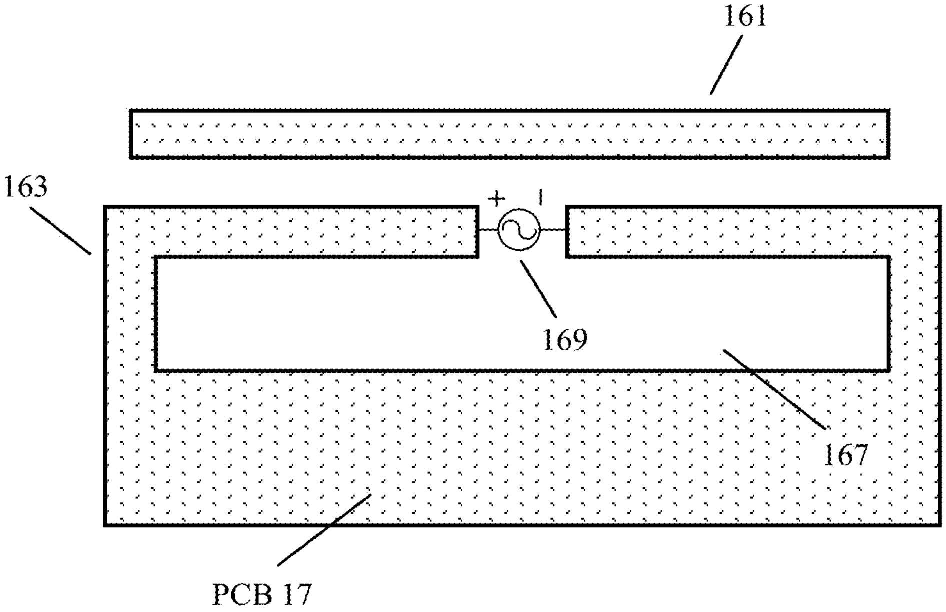
FIG. 18 shows an antenna design solution according to embodiment 10.

As shown in FIG. 18, for a position relationship between the DM wire antenna and the CM slot antenna in the antenna structure provided in Embodiment 10, refer to the position relationship between the wire antenna 161 and the slot antenna 163 in Embodiment 9, and details are not described herein. A feed may be connected at the opening 169 of the CM slot antenna. The positive electrode of the feed may be connected to one side of the opening 169, and the negative electrode of the feed may be connected to the other side of the opening 169.

Solution 3

In solution 3, a slot antenna and a wire antenna are combined, to obtain an antenna having strip features of both the slot antenna and the wire antenna, thereby having a wire antenna mode and a slot antenna mode. The two antenna modes are excited by using a single feed design, to cover a plurality of frequency bands when an antenna is miniaturized.

The following describes in detail a plurality of embodiments of solution 3 with reference to the accompanying drawings.

Embodiment 11

In Embodiment 11, a CM wire antenna and a CM slot antenna are combined, to obtain an antenna structure having both a CM wire antenna mode and a CM slot antenna mode. A feed design may be used to excite the CM wire antenna mode and the CM slot antenna mode.

Figure 19A:
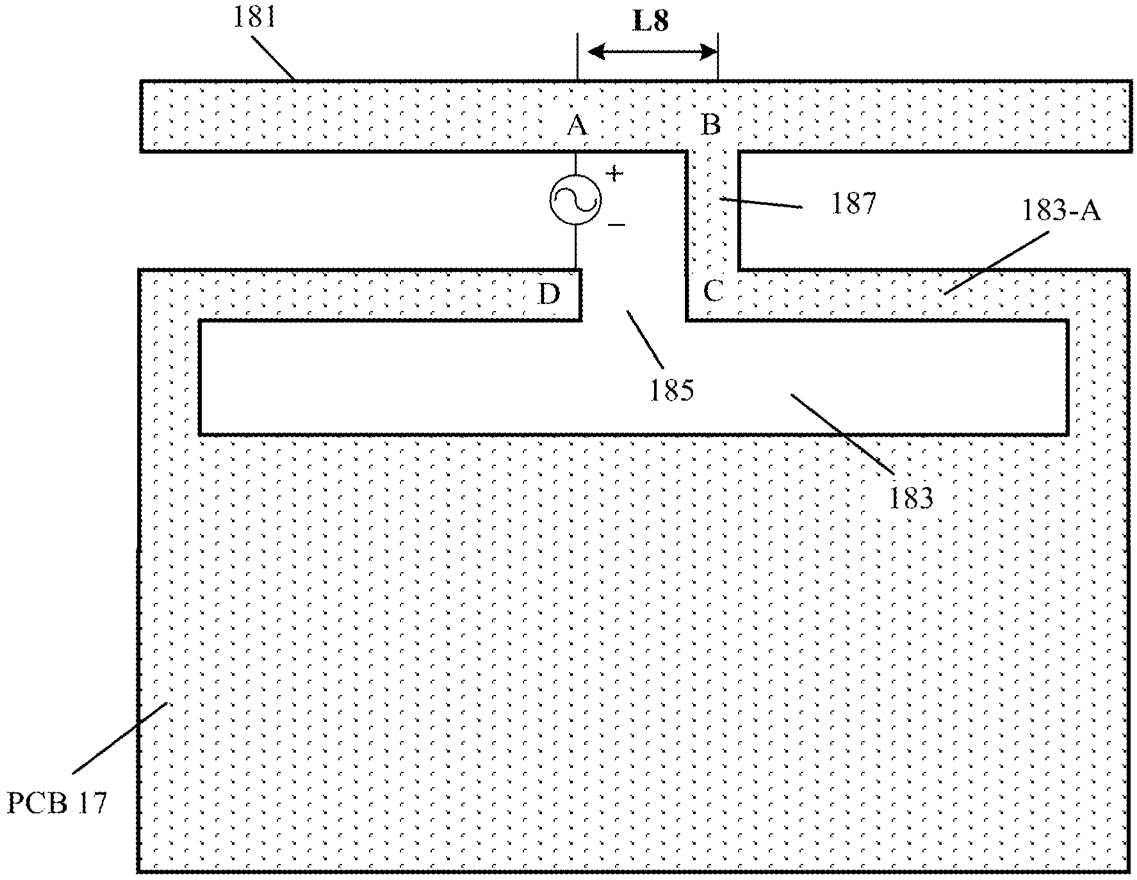
FIG. 19A shows an antenna design solution according to embodiment 11.

FIG. 19A shows an antenna design solution according to embodiment 11. As shown in FIG. 19A, an antenna structure provided in Embodiment 11 may include a strip 181 and a slot 183.

The strip 181 and the slot 183 may be parallel to each other. The slot 183 may be formed by slotting a ground plate. A side 183-A of the slot 183 is close to the strip 181, and an opening 185 may be disposed on the side 183-A. The opening 185 may be disposed at the middle position of the side 183-A, or may be disposed at a position deviating from the middle position. In some embodiments, the side 183-A may be referred to as a first side.

The strip 181 may have a connection point B, and may be connected to a grounding stub 187 at the connection point B. The grounding stub 187 may be configured to connect the side 183-A of the slot 183 and the strip 181 at one end (an end C) of the opening 185. A feed point A may be disposed on the strip 181, and the feed point A may be configured to be connected to a feed. Specifically, the positive electrode of the feed is connected to the feed point A, and the negative electrode of the feed is connected to the side 183-A of the slot 183 at the other end (an end D) of the opening 185.

The distance L8 between the feed point A and the connection point B on the strip 181 may be less than a quarter of an operating wavelength 5. The operating wavelength 5 is an operating wavelength of the strip 181, that is, an operating wavelength of the CM wire antenna mode. In Embodiment 11, the operating wavelength 5 may be referred to as a first wavelength.

The following describes a resonance mode that may be generated by an antenna structure example shown in FIG. 19A.

Figure 19B:
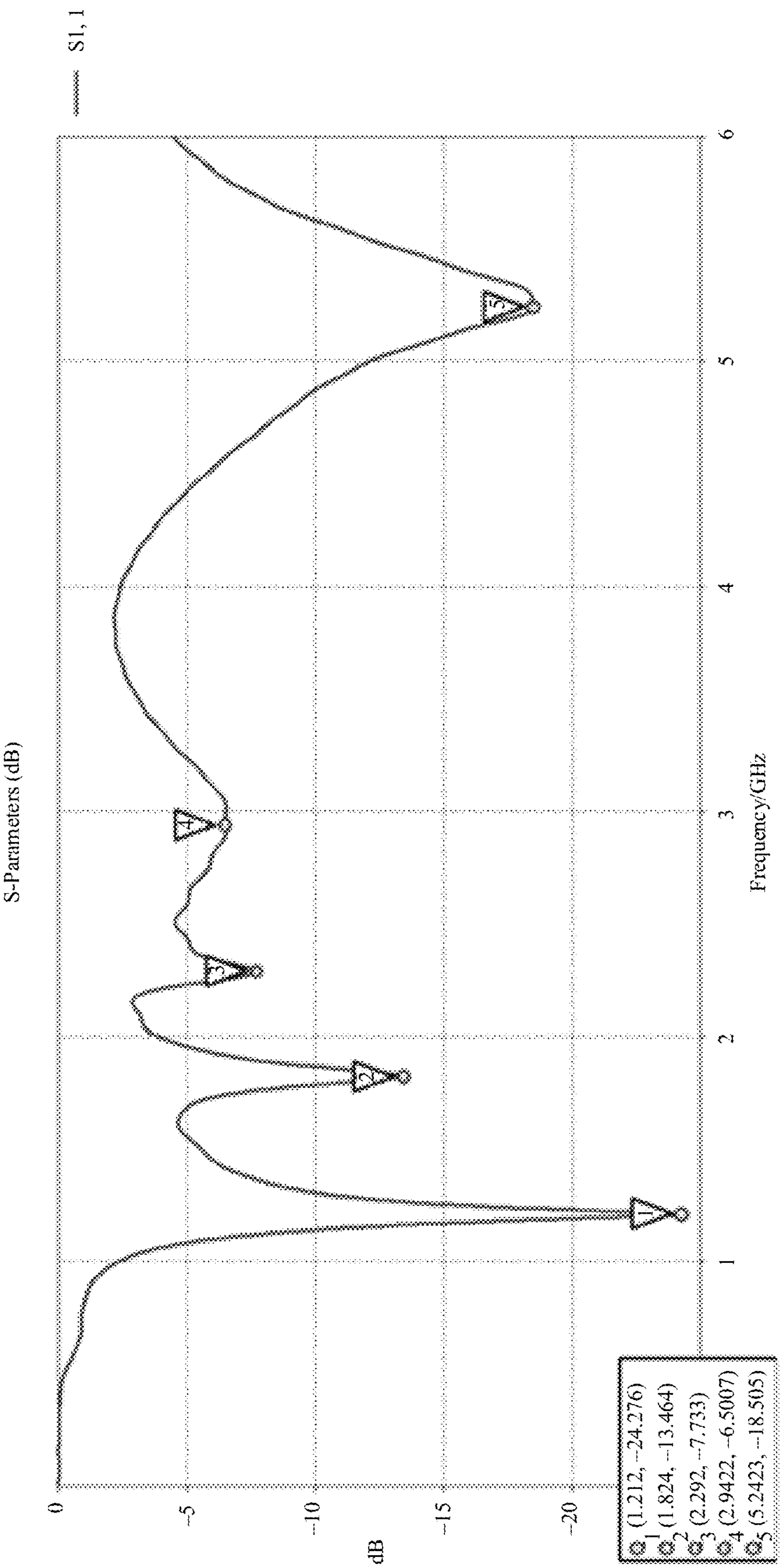
FIG. 19B shows a resonance mode generated by an antenna structure shown in FIG. 19A.

Referring to FIG. 19B, "1", "2", "3", "4", and "5" in FIG. 19B represent different resonances. The antenna structure may generate the resonance "1" in the vicinity of 1.2 GHz, the resonance "2" in the vicinity of 1.8 GHz, the resonance "3" in the vicinity of 2.3 GHz, the resonance "4" in the vicinity of 3.0 GHz, and the resonance "5" in the vicinity of 5.3 GHz. Specifically, the resonance "1" may be generated by a quarter-wavelength mode of the strip 181, and is a resonance of the CM wire antenna mode. The resonance "2" may be generated by a half-wavelength mode of the strip 181, and is a resonance of a DM wire antenna mode. The resonance "3" may be generated by a multiplied frequency (doubled frequency) of the quarter-wavelength mode of the strip 181. The resonance "4" may be generated by a quarter-wavelength mode of the slot 183, and is a resonance of the CM slot antenna mode. The resonance "5" may be generated by a multiplied frequency of the quarter-wavelength mode of the slot 183.

Figure 19C:
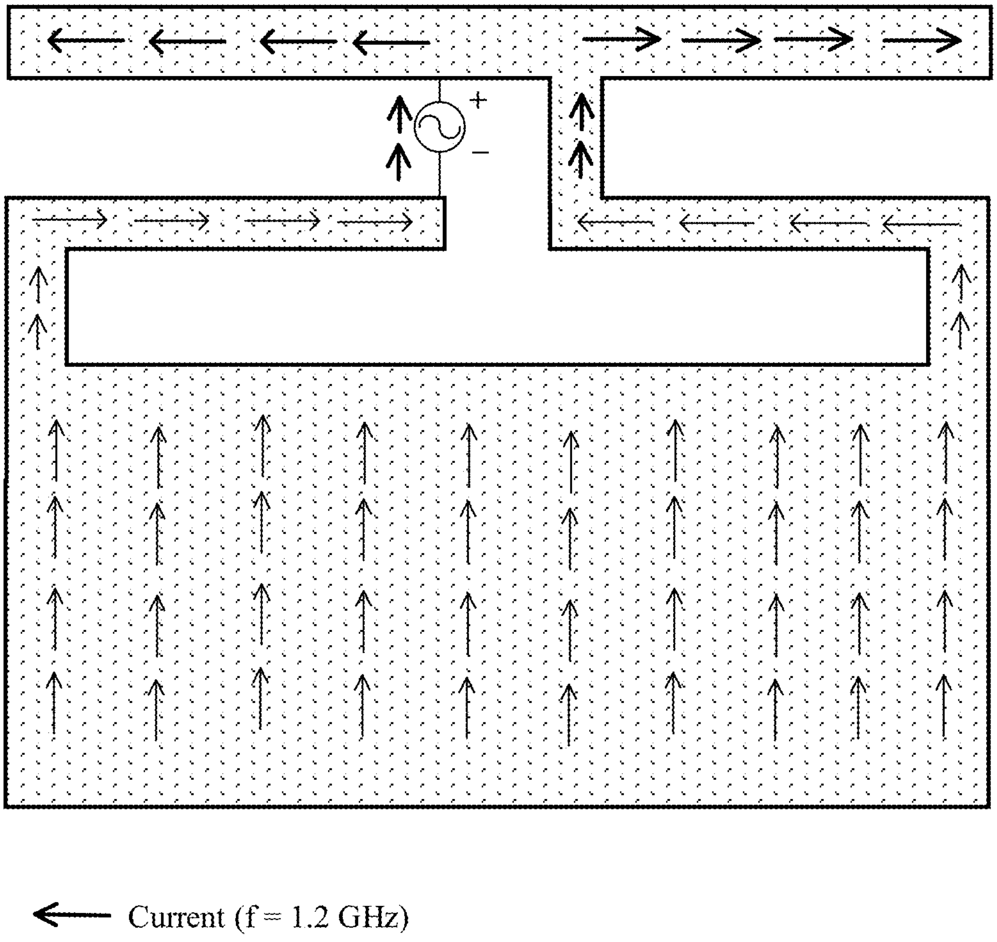
FIG. 19C and FIG. 19D show current distribution of some resonances in FIG. 19B.
Figure 19D:
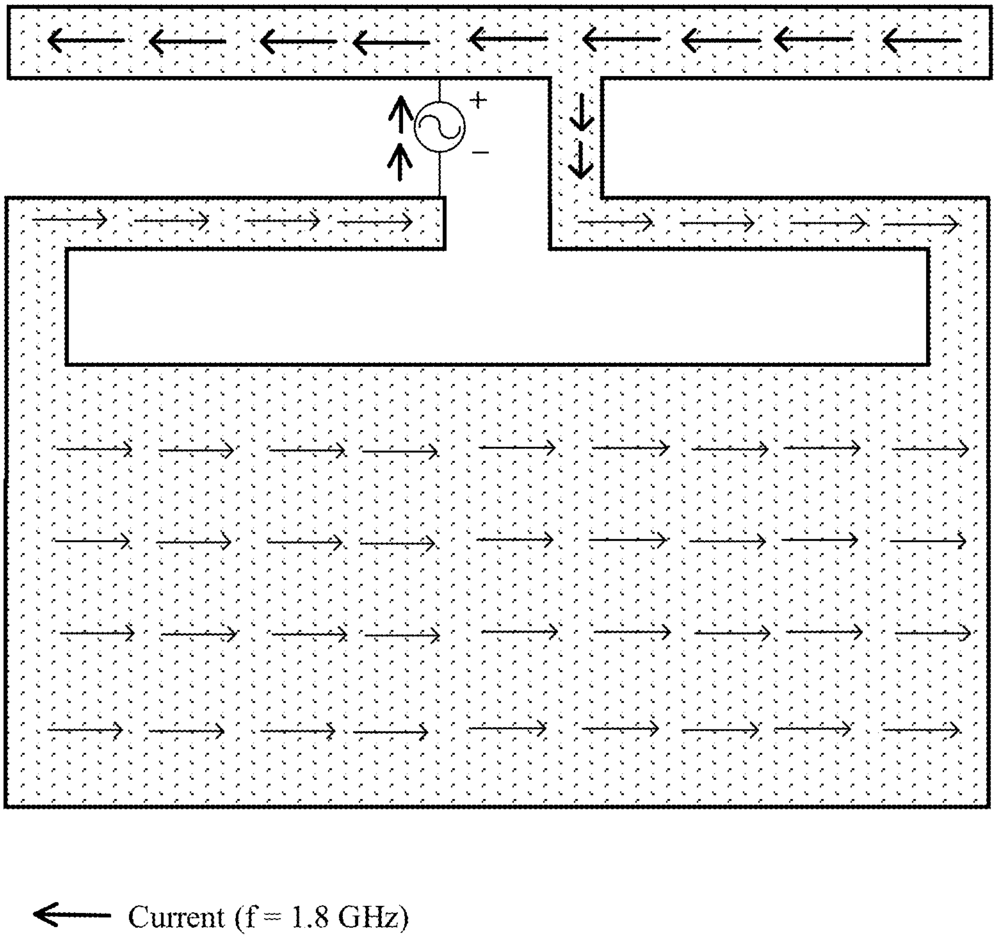

FIG. 19C and FIG. 19D show current distribution examples of the resonances "1" and "2". As shown in FIG. 19C, a current of the resonance "1" is distributed in opposite directions on the strip 181, and is strong in a middle of the strip 181 and weak at two ends of the strip 181. The current of the resonance "1" is a current generated by the quarter-wavelength mode of the strip 181, and is a current of the CM wire antenna mode. The CM wire antenna mode also excites the ground plate to generate a resonance. As shown in FIG. 19D, a current of the resonance "2" is distributed in a same direction on the strip 181, and is strong in a middle of the strip 181 and weak at two ends of the strip 181. A current (not shown) of the resonance "4" is distributed in a same direction surrounding the slot 183, is a current generated by a half-wavelength mode of the slot 183, and is a current of the DM wire antenna mode.

Figure 19E:
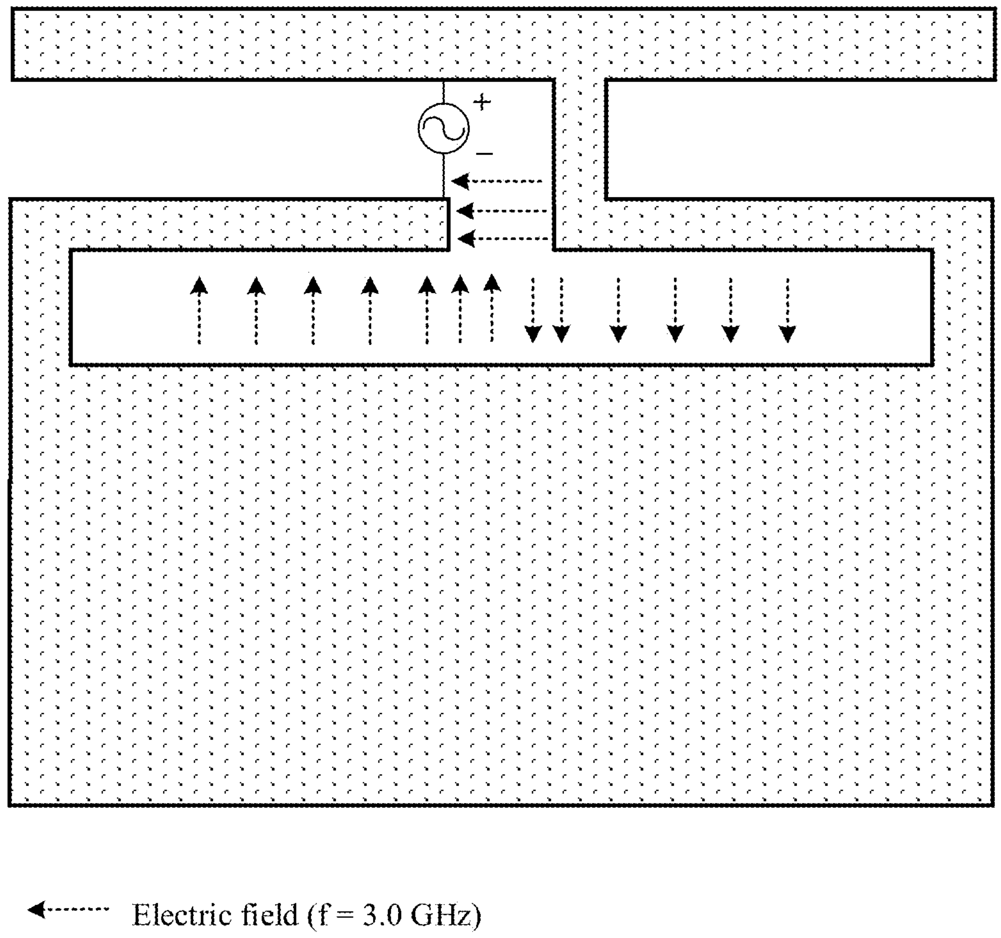
FIG. 19E shows current distribution of some resonances in FIG. 19B.

FIG. 19E shows an electric field distribution example of the resonance "4". As shown in FIG. 19E, an electric field of the resonance "4" is distributed in opposite directions on the slot 183, and is strong in a middle of the slot 183 and weak at two ends of the slot 183. The electric field of the resonance "4" is an electric field generated by the quarter-wavelength mode of the slot 183, and is an electric field of the CM slot antenna mode.

A wavelength mode in which the strip 181 generates the resonance "1" is not limited, and the resonance "1" may alternatively be generated by a three-quarter wavelength mode or the like of the strip 181. A wavelength mode in which the strip 181 generates the resonance "2" is not limited, and the resonance "2" may alternatively be generated by a three-half wavelength mode, a five-half wavelength mode, or the like of the strip 181. A wavelength mode in which the slot 183 generates the resonance "4" is not limited, and the resonance "4" may alternatively be generated by a three-half wavelength mode, a five-half wavelength mode, or the like of the slot 183.

In addition to the 1.2 GHz frequency band, the 1.8 GHz frequency band, the 2.3 GHz frequency band, the 3.0 GHz frequency band, and the 5.3 GHz frequency band shown in FIG. 19B, the antenna structure example shown in FIG. 19A may generate a resonance of another frequency band, which may be set by adjusting sizes of strips (for example, the strip 181 and the slot 183) in the antenna structure.

It may be learned that, in the antenna design solution provided in Embodiment 11, a CM wire antenna and a CM slot antenna are combined, to obtain an antenna structure having strip features of both the CM wire antenna and the CM slot antenna. A single feed design may be used to excite the CM wire antenna mode and the CM slot antenna mode, to cover a plurality of frequency bands.

Embodiment 12

In Embodiment 12, a DM wire antenna and a DM slot antenna are combined, to obtain an antenna structure having strip features of both the DM wire antenna and the DM slot antenna. A feed design may be used to excite a DM wire antenna mode and a DM slot antenna mode.

Figure 20A:
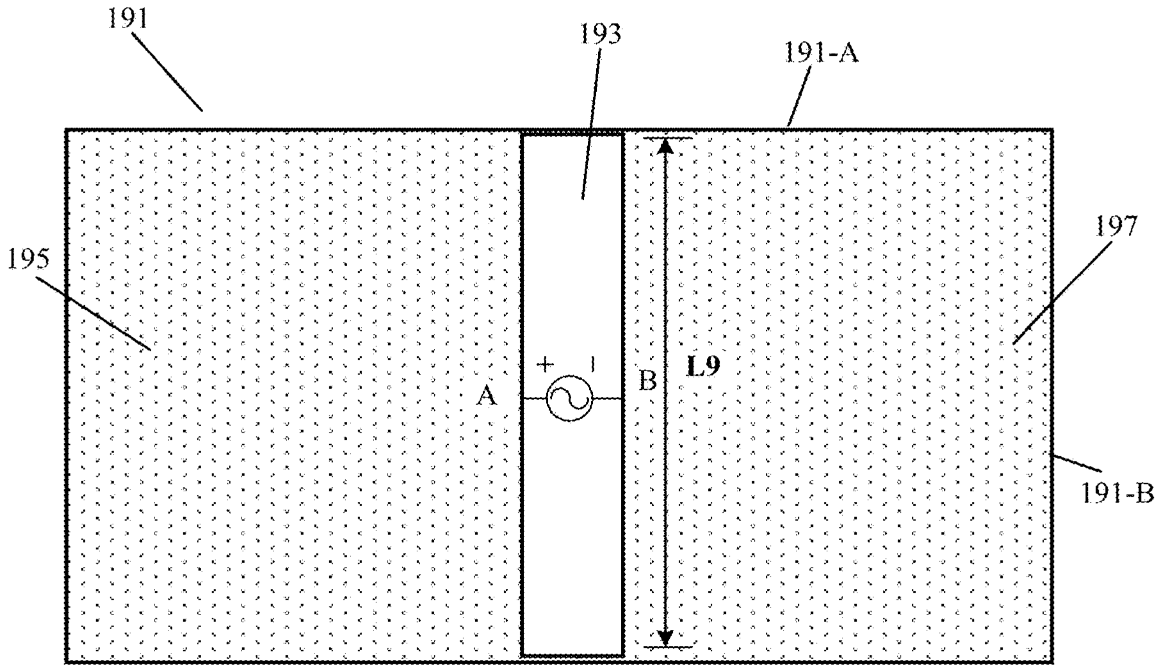
FIG. 20A shows an antenna design solution according to embodiment 12.

FIG. 20A shows an antenna design solution according to embodiment 12. As shown in FIG. 20A, an antenna structure provided in Embodiment 12 may include a strip conductor 191 and a slot 193.

The slot 193 may be formed by slotting the strip conductor 191. A slotting direction of the slot 193 may be perpendicular to an extension direction of the strip conductor 193. The slot 193 may be perpendicular to the strip conductor 193 at a middle position of the strip conductor 193. A feed may be connected at a middle position of the slot 193, a positive electrode of the feed may be connected to one side of the slot 193, and a negative electrode of the feed may be connected to the other side of the slot 193.

Figure 20B:
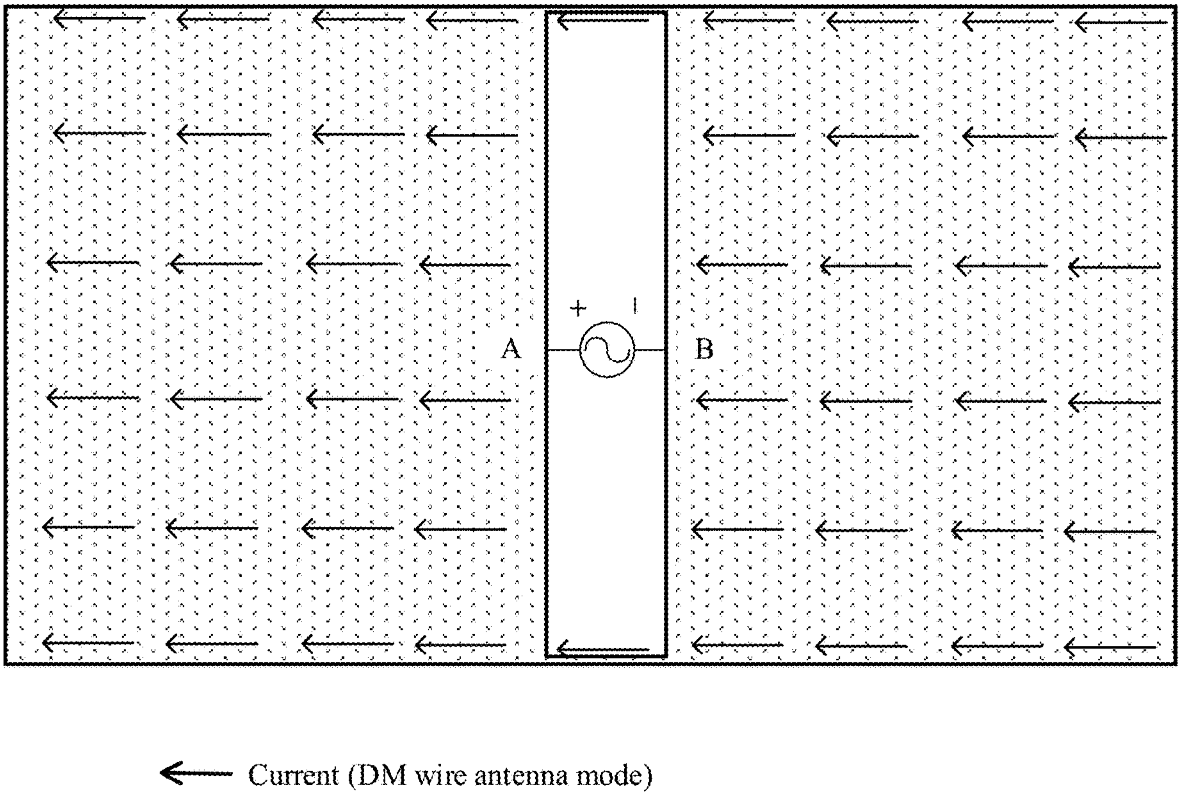
FIG. 20B and FIG. 20C show a modal current and a modal electric field of an antenna structure shown in FIG. 20A.
Figure 20C:
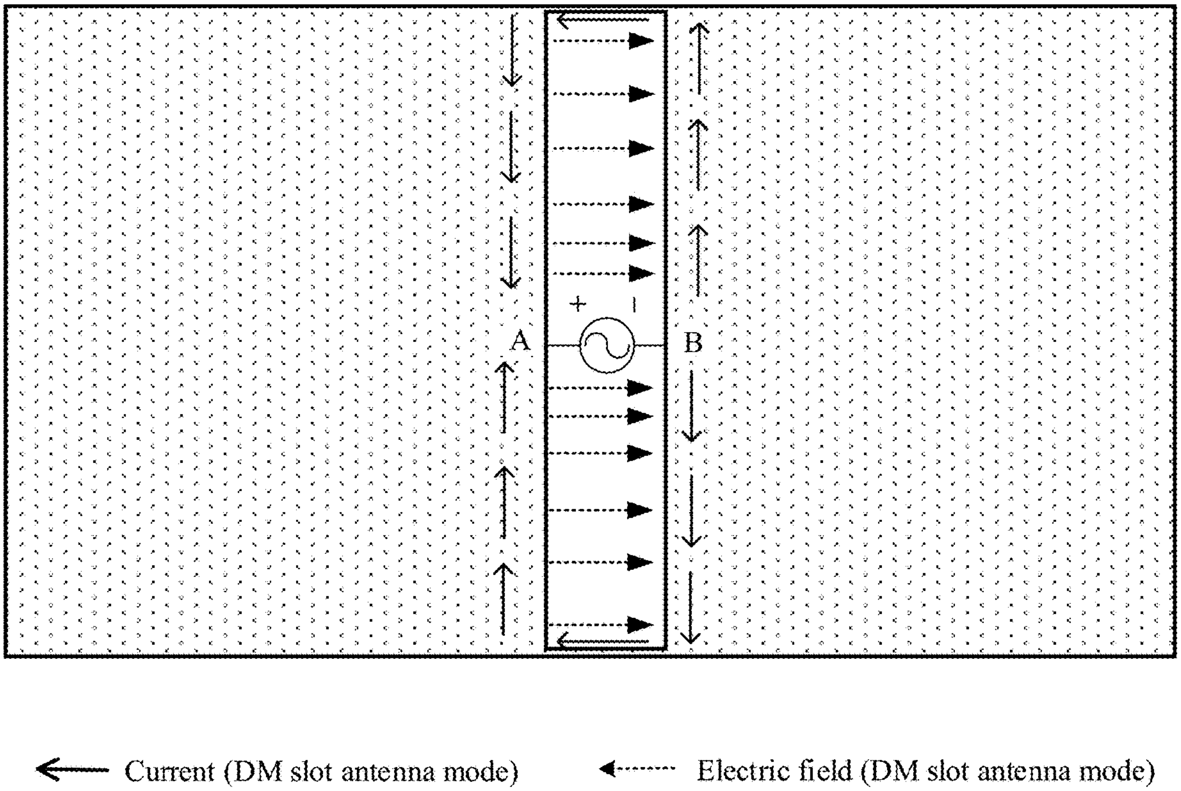

FIG. 20B and FIG. 20C show examples of a modal current and a modal electric field of the antenna structure shown in FIG. 20A. A current shown in FIG. 20B is distributed on the conductor in a same direction on two sides of the slot 193, a direction of the current is specifically consistent with the extension direction of the strip conductor 191, and the current is a current of a CM wire antenna mode of the antenna structure. A current shown in FIG. 20C is distributed in opposite directions surrounding the slot 193, and is a current of a CM slot antenna mode of the antenna structure. An electric field shown in FIG. 20C is distributed in a same direction on the slot 193, and is an electric field of the CM slot antenna mode of the antenna structure.

It may be learned that, in the antenna design solution provided in Embodiment 12, the strip conductor may be slotted to have strip features of both a DM wire antenna and a DM slot antenna, and a feed design may be used to excite two slot antenna modes: the DM wire antenna mode and the DM slot antenna mode, to cover a plurality of frequency bands when an antenna is miniaturized.

Figure 20D:
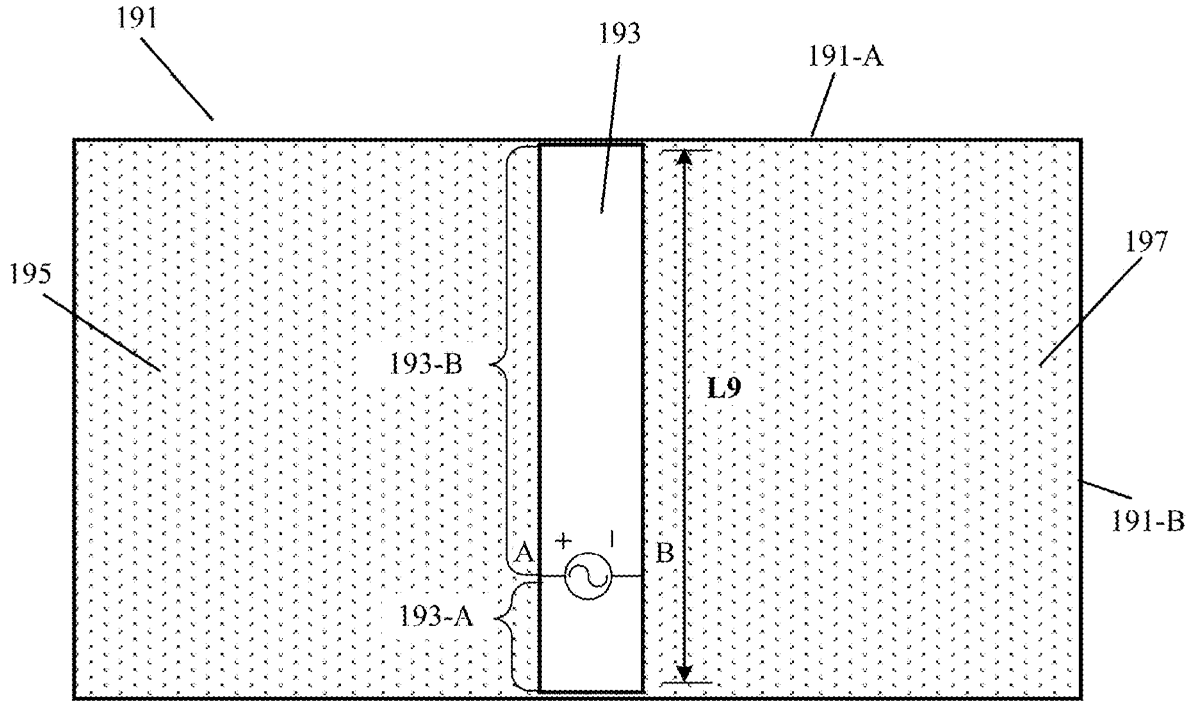
FIG. 20D shows an extended solution of embodiment 12.

In Embodiment 12, a feed point A may alternatively be disposed at a position deviating from the middle position of the slot 193, as shown in FIG. 20D. The deviated feed point A may divide the slot 193 into a short slot body 193-A and a long slot body 193-B. This feed point deviation may enable the antenna structure to cover more frequency bands. The following describes a resonance mode that may be generated by an antenna structure example shown in FIG. 20D.

Figure 20E:
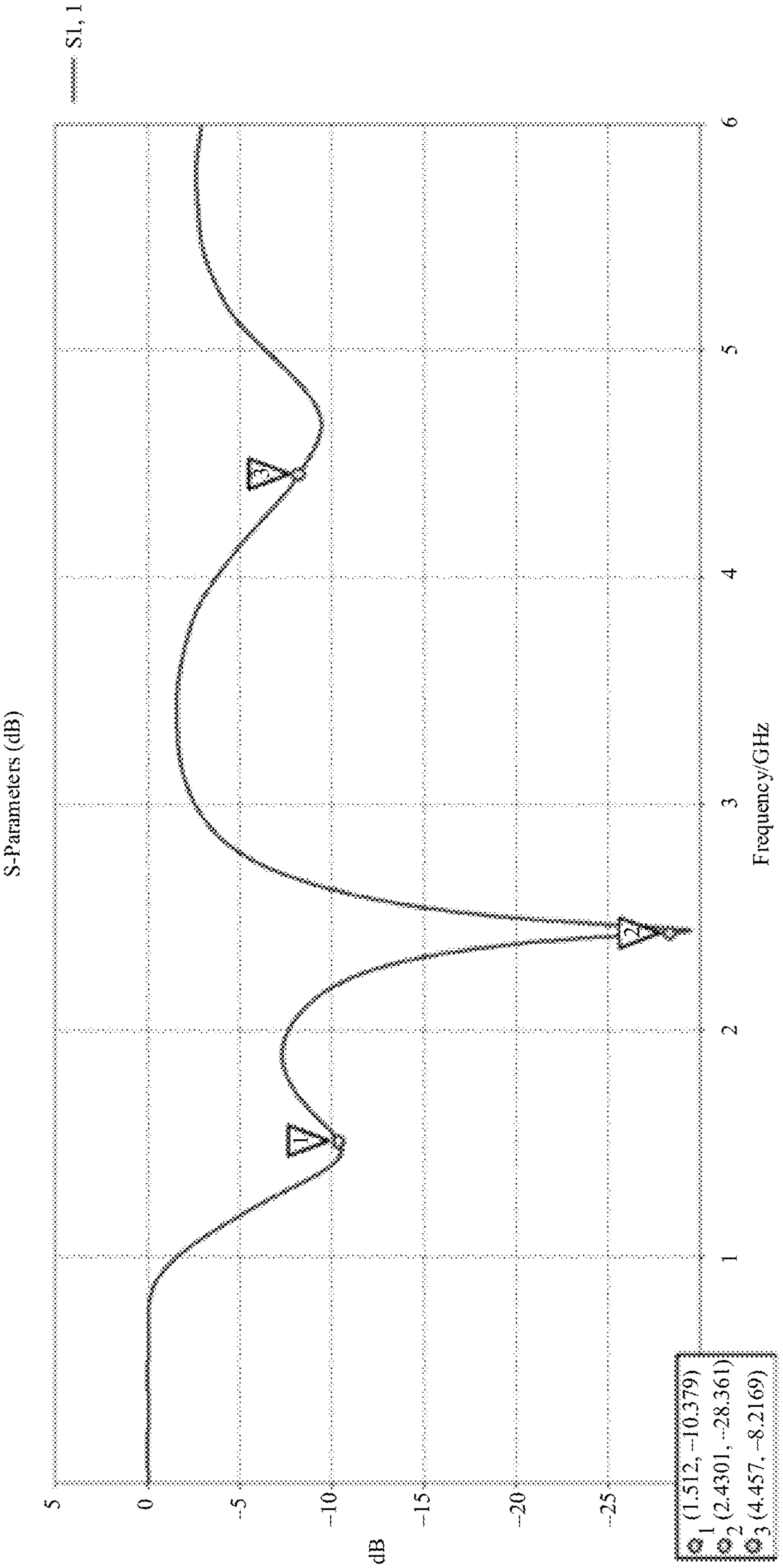
FIG. 20E shows a resonance mode generated by an antenna structure shown in FIG. 20D.

Referring to FIG. 20E, "1", "2", and "3" in FIG. 20E represent different resonances. The antenna structure may generate the resonance "1" in the vicinity of 1.5 GHz, the resonance "2" in the vicinity of 2.4 GHz, and the resonance "3" in the vicinity of 4.6 GHz. Specifically, the resonance "1" may be generated by a half-wavelength mode of the slot 193, the resonance "2" may be generated by a half-wavelength mode of the strip conductor 191, and the resonance "3" may be generated by a multiplied frequency (triple frequency) of the half-wavelength mode of the slot 193.

Figure 20F:
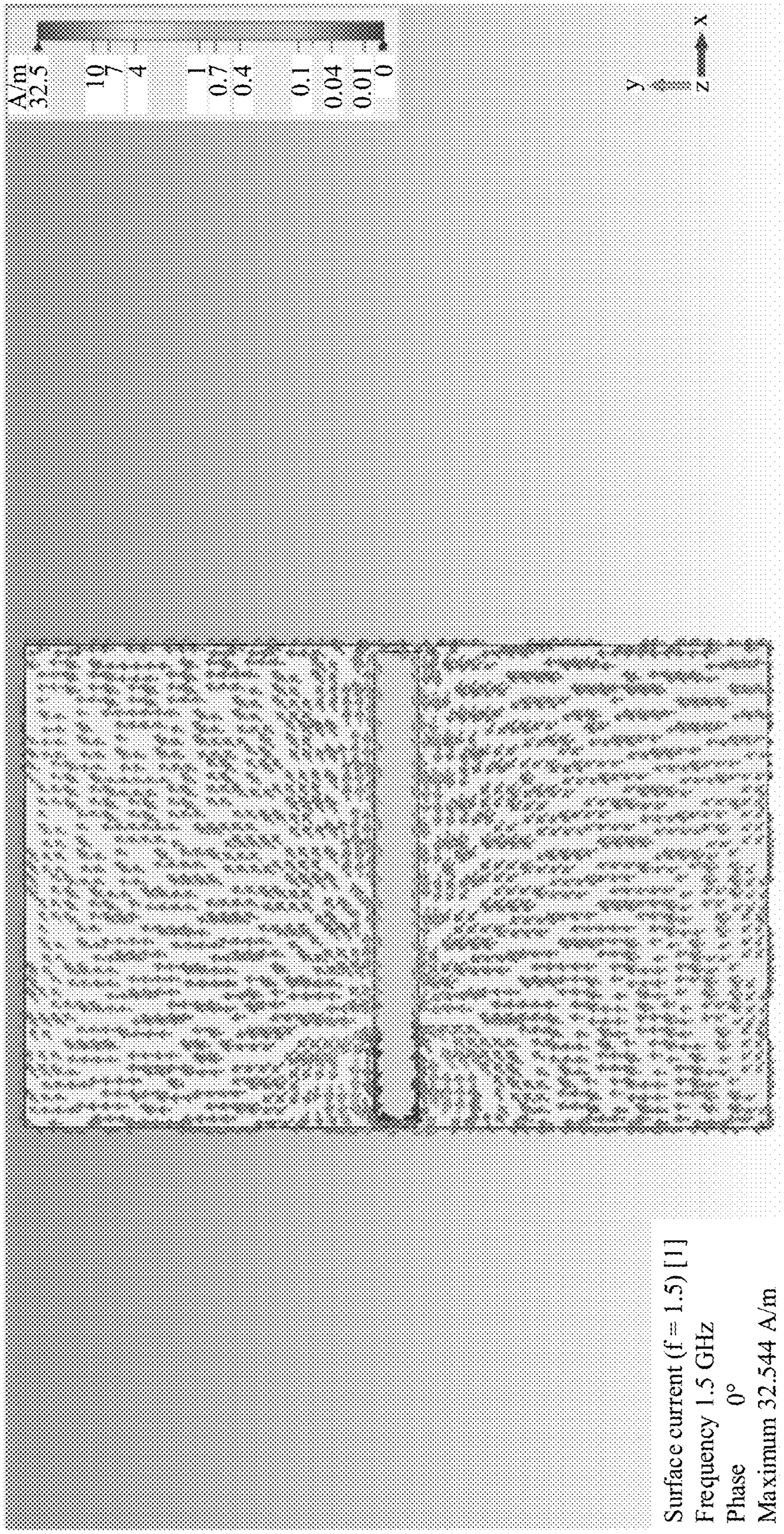
FIG. 20F to FIG. 20H show current distribution of each resonance in FIG. 20E.
Figure 20G:
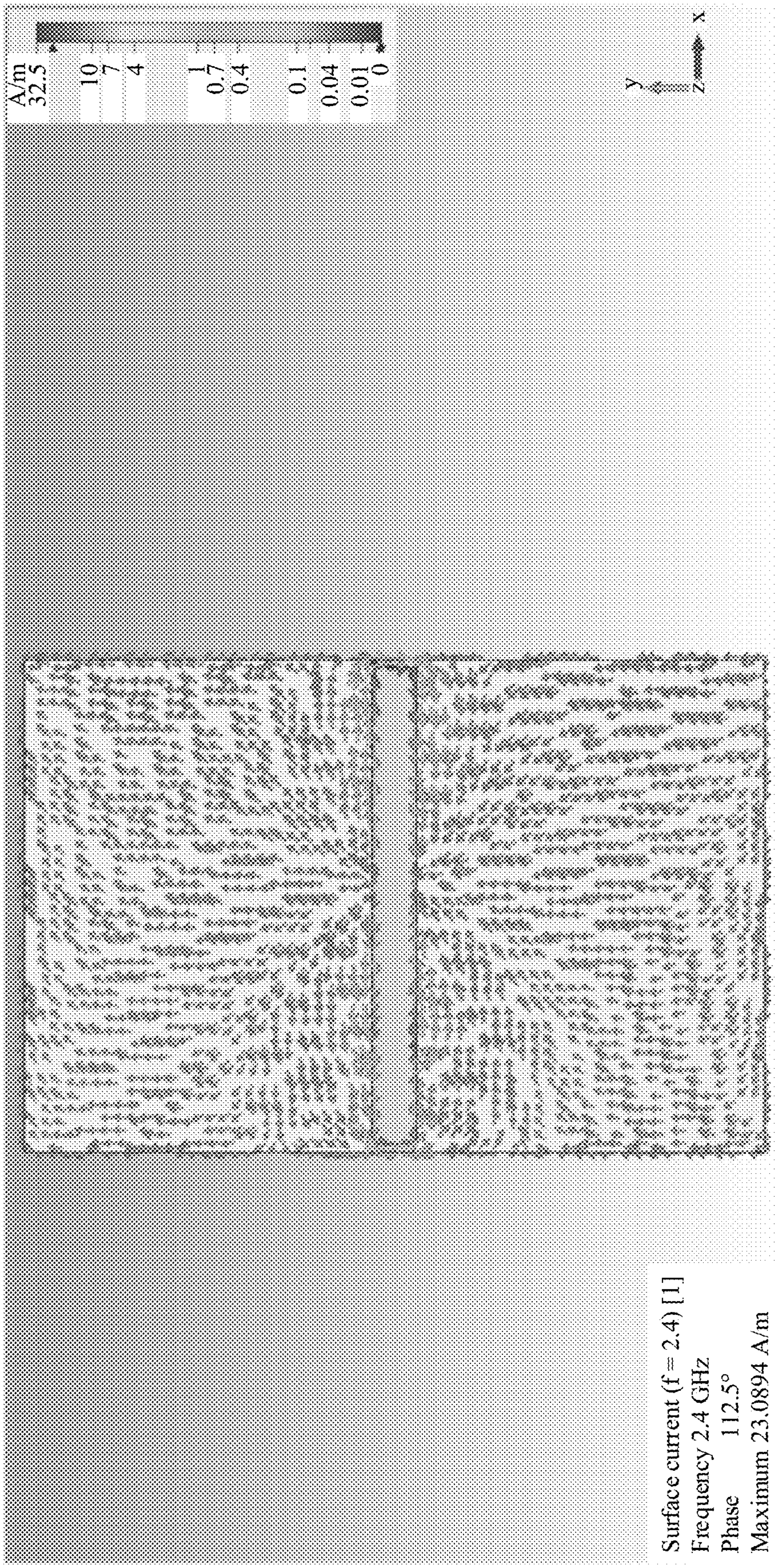
Figure 20H:
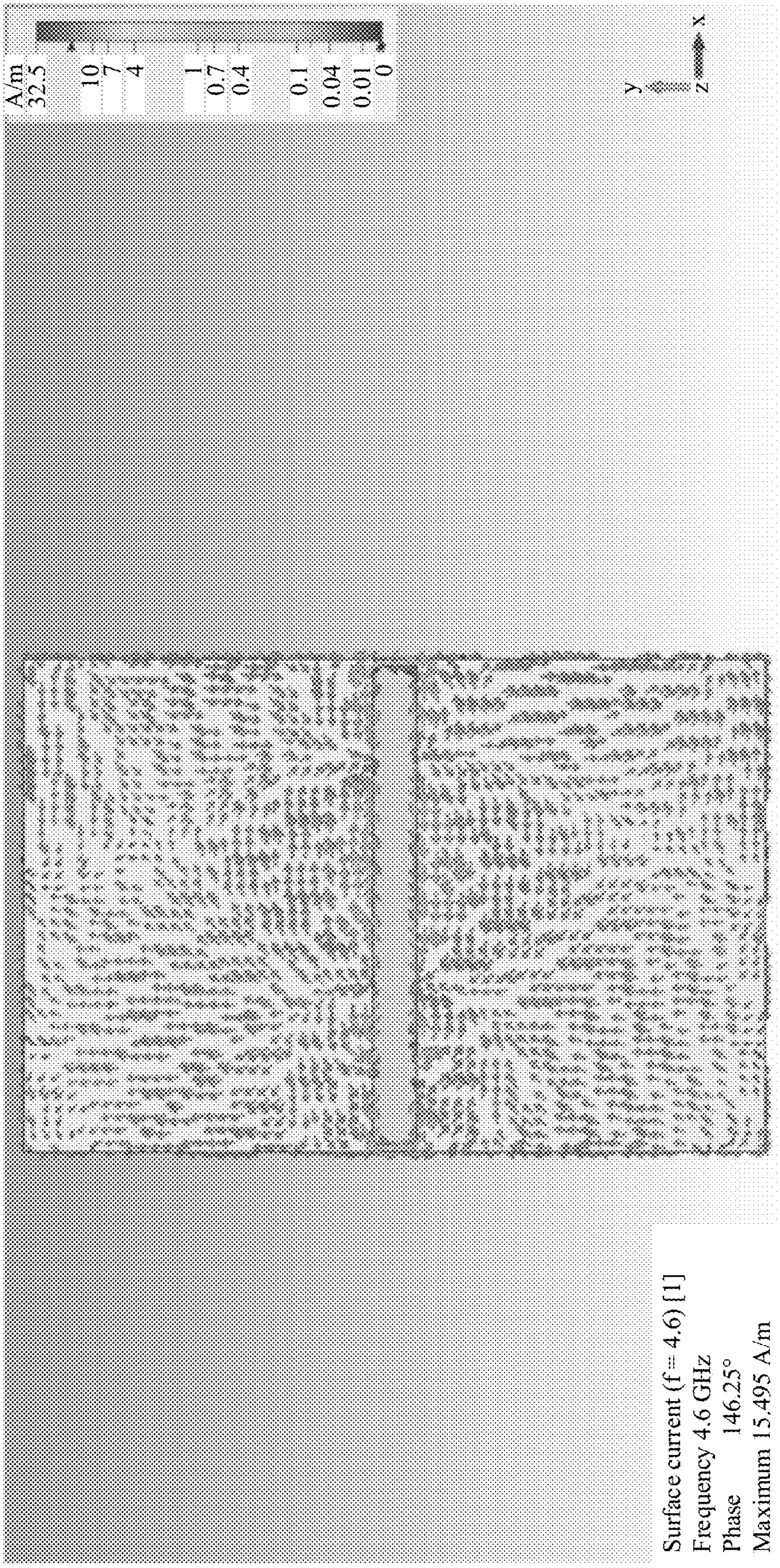

FIG. 20F to FIG. 20H show current distribution examples of the resonances "1", "2", and "3". As shown in FIG. 20F, a current of the resonance "1" is distributed in opposite directions surrounding the slot 193, and the current is strong around the short slot 193-A and weak around the long slot 193-B. As shown in FIG. 20G, a current of the resonance "2" is distributed in a same direction on the strip conductor 191, and is strong in a middle of the strip conductor 191 and weak at two ends of the strip conductor 191. As shown in FIG. 20H, a current of the resonance "3" is distributed in opposite directions surrounding the slot 193, and the current is strong around the long slot 193-B and weak around the short slot 193-A.

A wavelength mode in which the slot 193 generates the resonance "1" is not limited, and the resonance "1" may alternatively be generated by a three-half wavelength mode or the like of the slot 193. A wavelength mode in which the strip 181 generates the resonance "2" is not limited, and the resonance "2" may alternatively be generated by a three-half wavelength mode, a five-half wavelength mode, or the like of the strip conductor 191.

In addition to the 1.5 GHz frequency band, the 2.4 GHz frequency band, and the 4.6 GHz frequency band shown in FIG. 20E, the antenna structure example shown in FIG. 20D may generate a resonance of another frequency band, which may be set by adjusting sizes of strips (for example, the strip conductor 191 and the slot 193) in the antenna structure.

Embodiment 13

In Embodiment 13, a CM wire antenna and a DM slot antenna are combined, to obtain an antenna structure having strip features of both the CM wire antenna and the DM slot antenna. A feed design may be used to excite a CM wire antenna mode and a DM slot antenna mode.

Figure 21A:
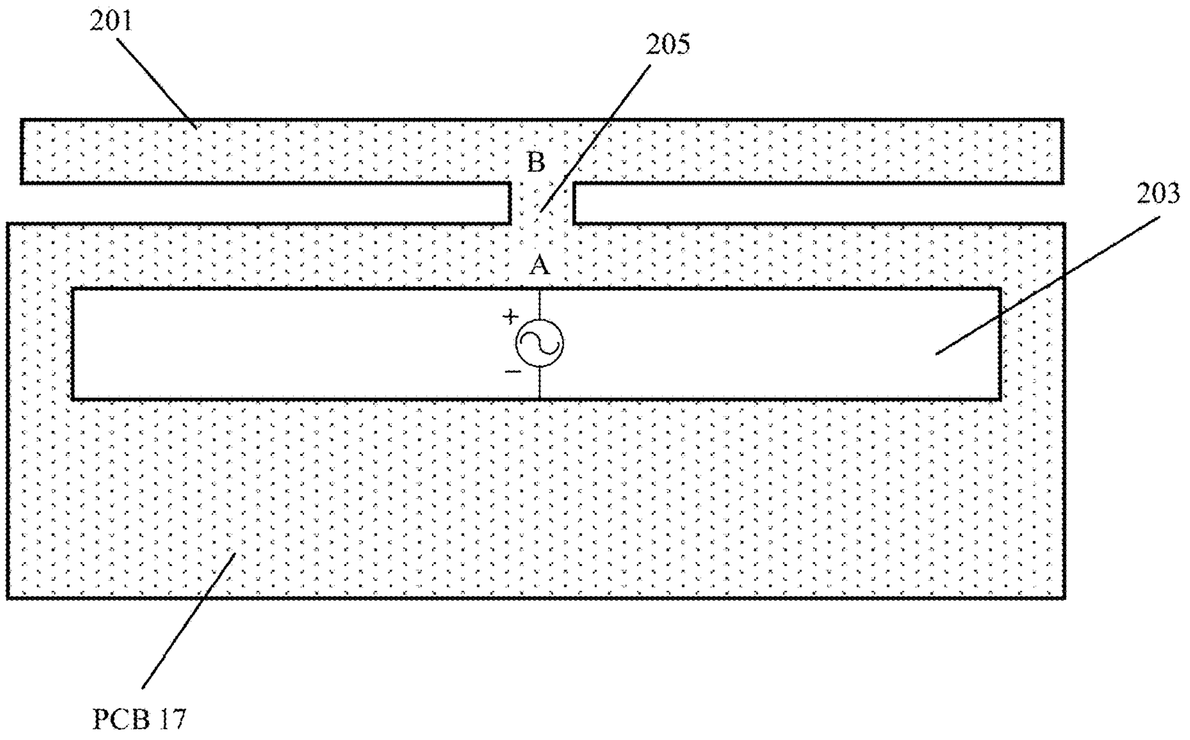
FIG. 21A shows an antenna design solution according to embodiment 13.

FIG. 21A shows an antenna design solution according to embodiment 13. As shown in FIG. 21A, an antenna structure provided in Embodiment 13 may include a strip 201 and a slot 203.

The strip 201 and the slot 203 may be parallel to each other. The slot 203 may be formed by slotting a ground plate. The strip 201 may have a connection point B, and may be connected to a strip 205 at the connection point B. The strip 205 may be configured to be connected to one side of the slot 203. The connection point B may be disposed at the middle position of the strip 201.

A feed may be connected at the middle position of the slot 203. At the middle position, the positive electrode of the feed is connected to one side of the slot 203, and the negative electrode of the feed is connected to the other side of the slot 203.

The following describes a resonance mode that may be generated by an antenna structure example shown in FIG. 21A.

Figure 21B:
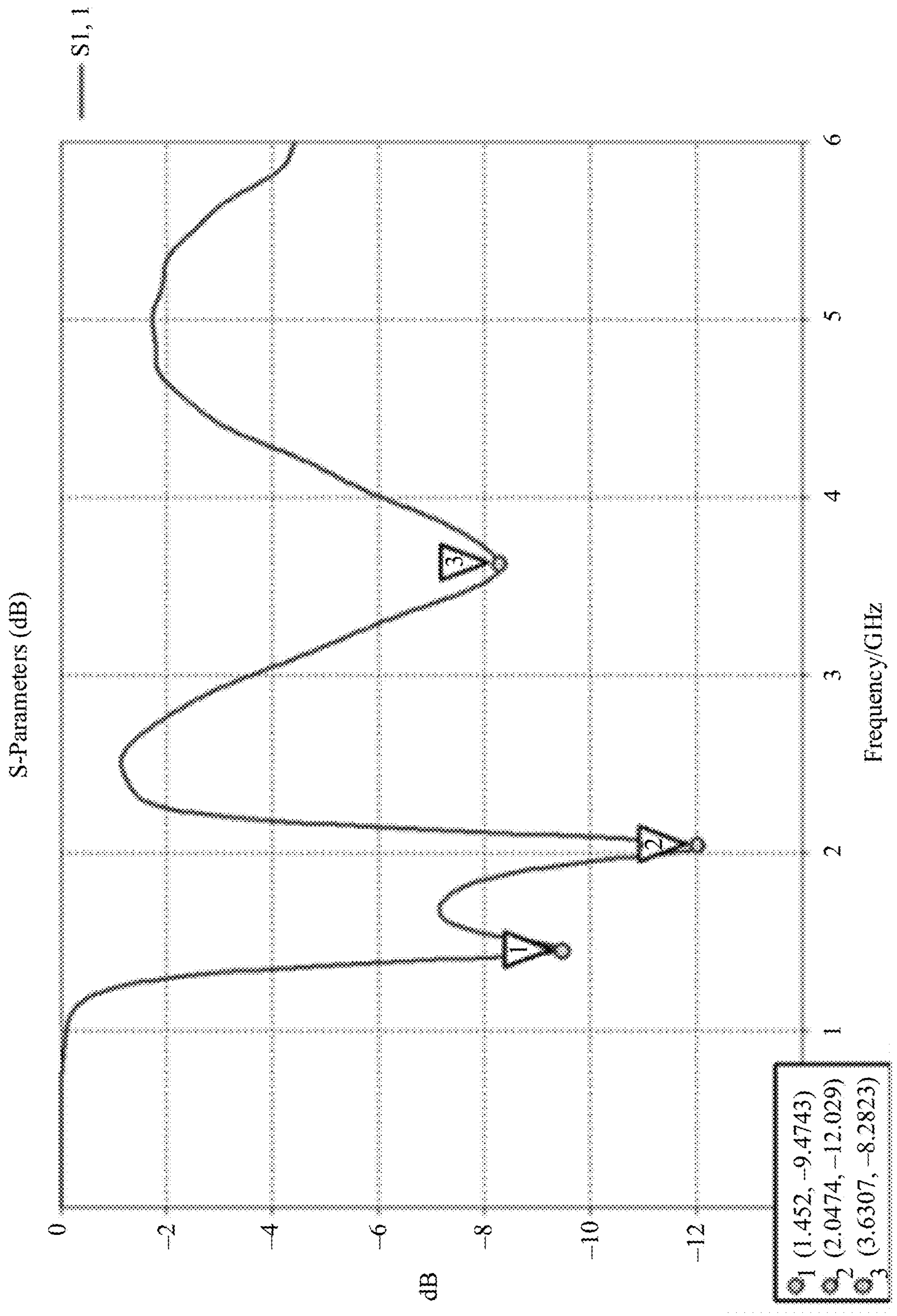
FIG. 21B shows a resonance mode generated by an antenna structure shown in FIG. 21A.

Referring to FIG. 21B, "1", "2", and "3" in FIG. 21B represent different resonances. The antenna structure may generate the resonance "1" in the vicinity of 1.45 GHz, the resonance "2" in the vicinity of 2.0 GHz, and the resonance "3" in the vicinity of 3.6 GHz. Specifically, the resonance "1" may be generated by a half-wavelength mode of the slot 203, and is a resonance of the DM slot antenna mode. The resonance "2" may be generated by a quarter-wavelength mode of the strip 201, and is a resonance of the CM wire antenna mode. The resonance "3" may be generated by a multiplied frequency (triple frequency) of the half-wavelength mode of the slot 203.

Figure 21C:
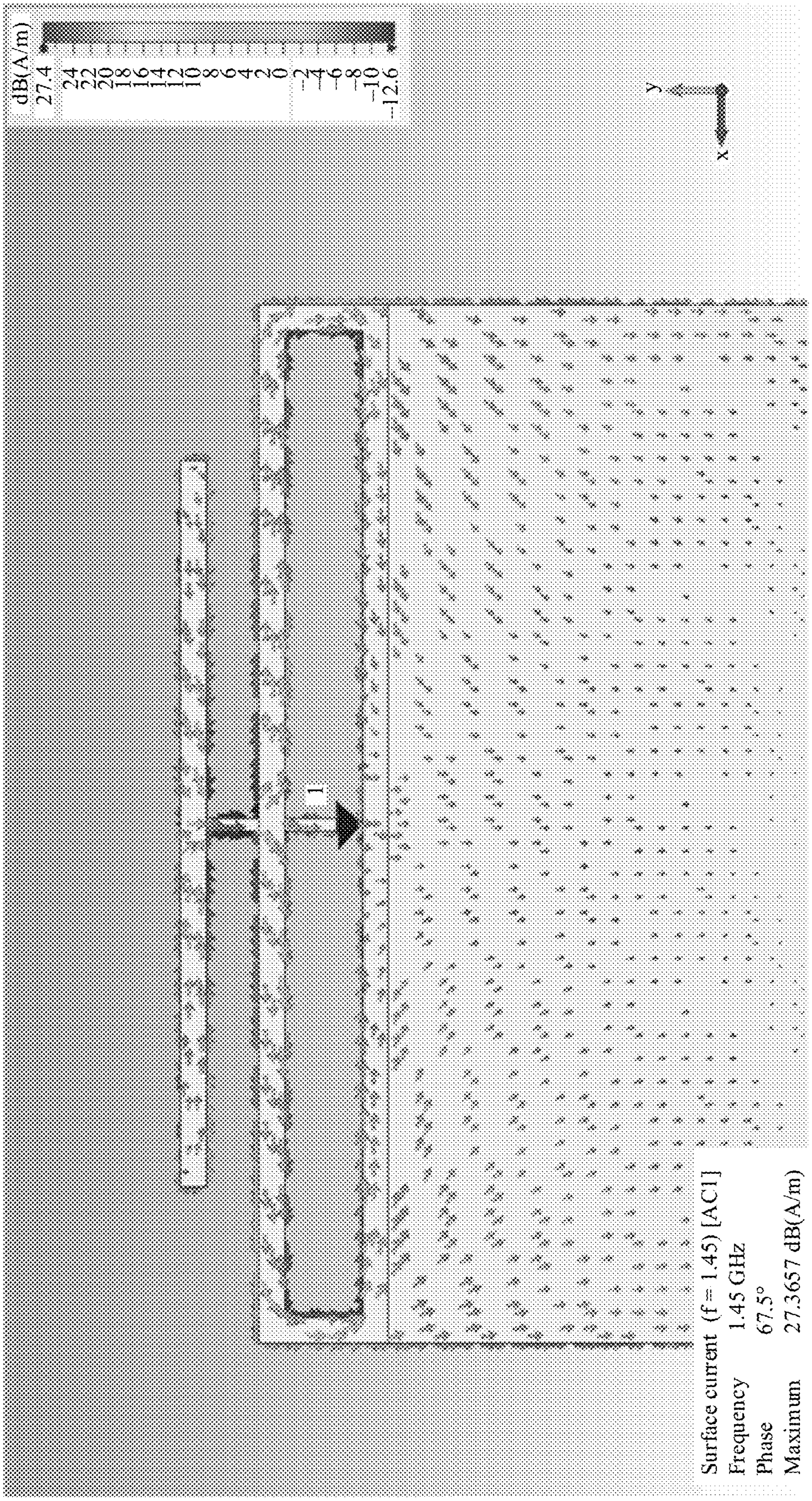
FIG. 21C to FIG. 21E show current distribution of each resonance in FIG. 21B.
Figure 21D:
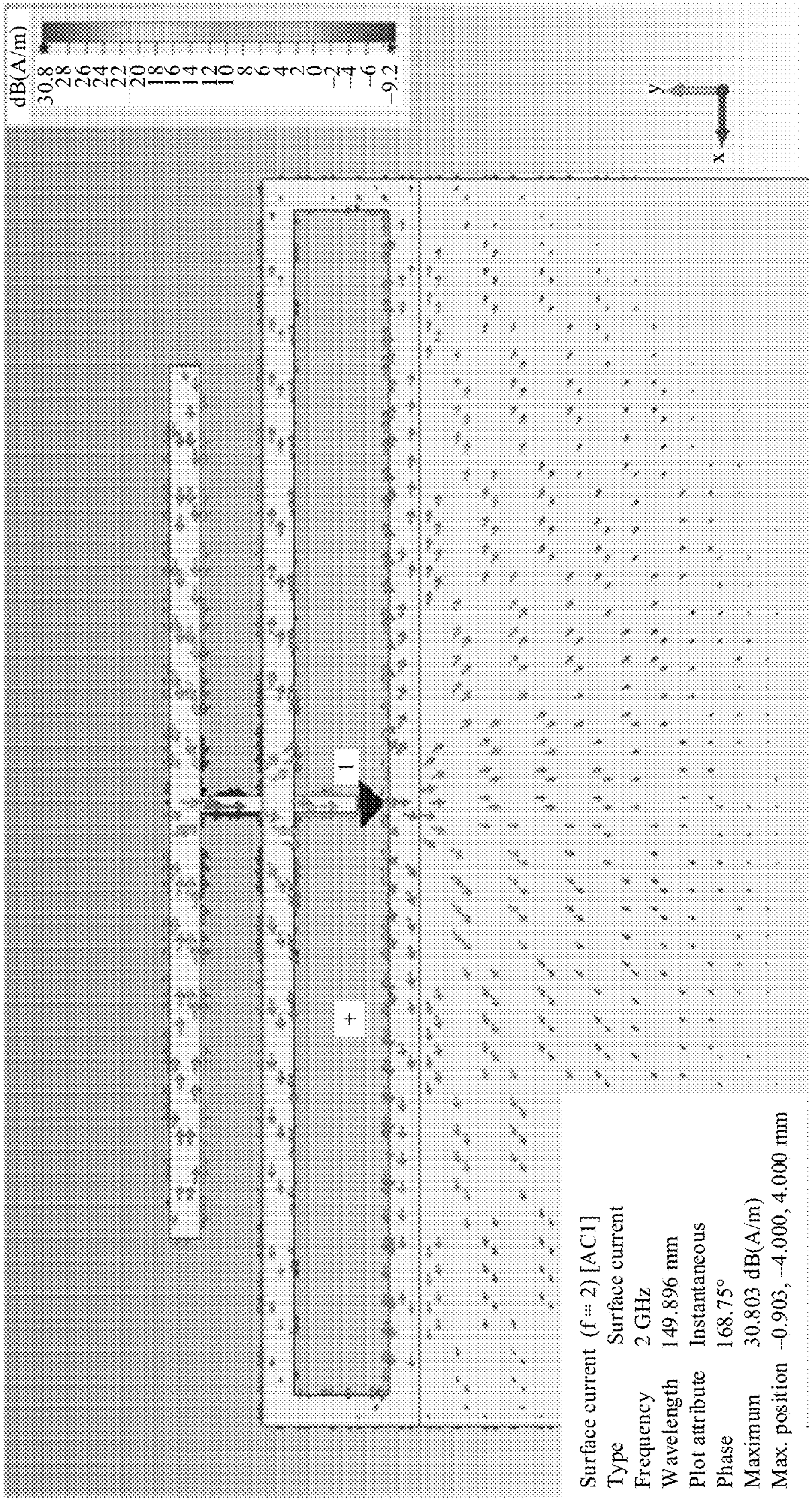
Figure 21E:
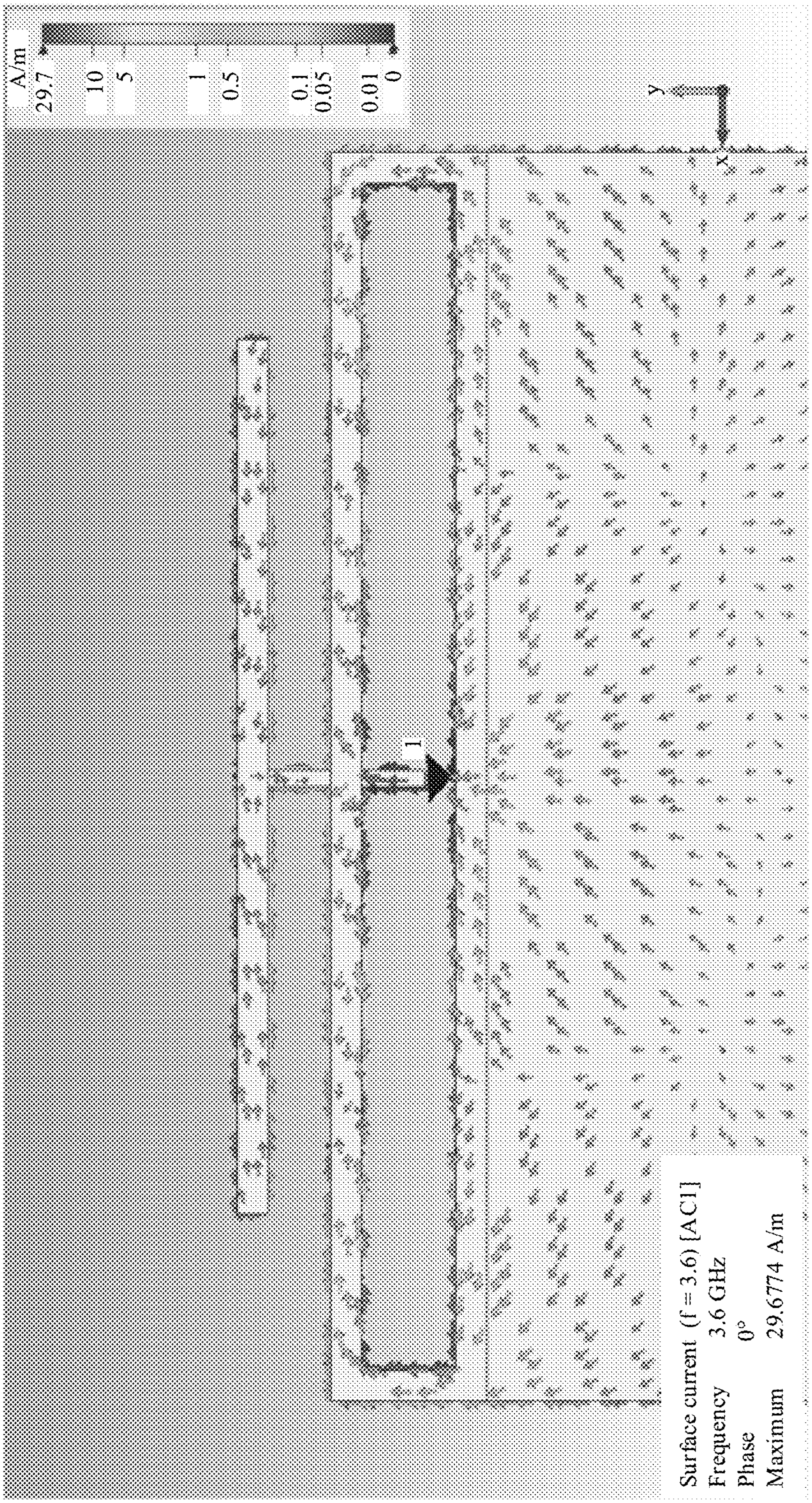

FIG. 21C to FIG. 21E show current distribution examples of the resonances "1", "2", and "3". As shown in FIG. 21C, a current of the resonance "1" is distributed in opposite directions surrounding the slot 203, and the current is strong at two ends of the slot 203 and weak in a middle of the slot 203. The current of the resonance "1" is a current generated by the half-wavelength mode of the slot 203, and is a current of the DM slot antenna mode. As shown in FIG. 21D, a current of the resonance "2" is distributed in opposite directions on the strip 201, and is strong in a middle of the strip 201 and weak at two ends of the strip 201. The current of the resonance "2" is a current generated by the quarter-wavelength mode of the strip 201, and is a current of the CM wire antenna mode. As shown in FIG. 21E, a current of the resonance "3" is distributed in opposite directions surrounding the slot 203, and the current is strong at two ends of the slot 203 and weak in a middle of the slot 203. The current of the resonance "3" is a current generated by a multiplied frequency (triple frequency) of the half-wavelength mode of the slot 203, and is a current of the DM slot antenna mode.

A wavelength mode in which the slot 203 generates the resonance "1" is not limited, and the resonance "1" may alternatively be generated by a three-half wavelength mode or the like of the slot 203. A wavelength mode in which the strip 201 generates the resonance "2" is not limited, and the resonance "2" may alternatively be generated by a three-quarter wavelength mode or the like of the strip 201.

In addition to the 1.45 GHz frequency band, the 2.0 GHz frequency band, and the 3.6 GHz frequency band shown in FIG. 21B, the antenna structure example shown in FIG. 21A may generate a resonance of another frequency band, which may be set by adjusting sizes of strips (for example, the strip 201 and the slot 203) in the antenna structure.

It may be learned that, in the antenna design solution provided in Embodiment 13, a CM wire antenna and a DM slot antenna are combined, to obtain an antenna structure having strip features of both the CM wire antenna and the DM slot antenna. A single feed design may be used to excite the CM wire antenna mode and the DM slot antenna mode, to cover a plurality of frequency bands.

Embodiment 14

In Embodiment 14, a DM wire antenna and a CM slot antenna are combined, to obtain an antenna structure having strip features of both the DM wire antenna and the CM slot antenna. A feed design may be used to excite a DM wire antenna mode and a CM slot antenna mode.

Figure 22A:
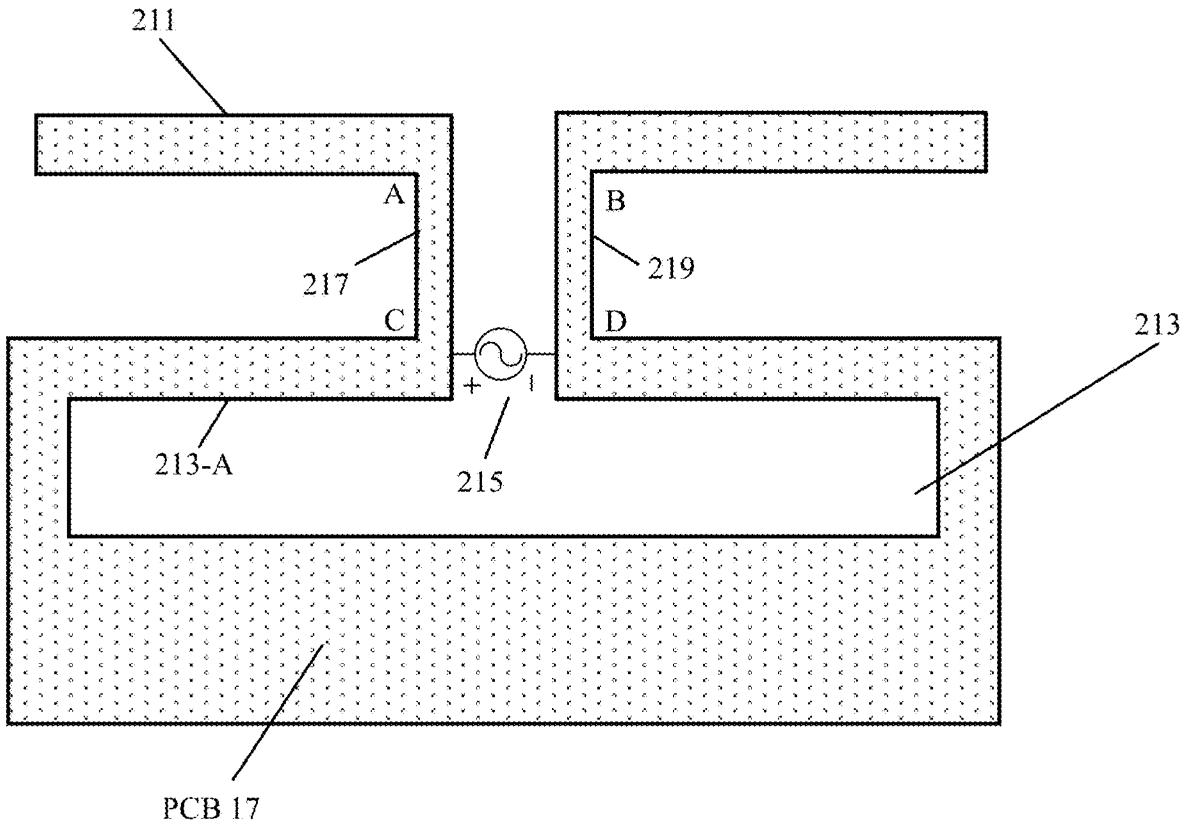
FIG. 22A shows an antenna design solution according to embodiment 14.

FIG. 22A shows an antenna design solution according to embodiment 14. As shown in FIG. 22A, an antenna structure provided in Embodiment 14 may include a strip 211 and a slot 213.

The strip 211 and the slot 213 may be parallel to each other. The slot 213 may be formed by slotting a ground plate. A side 213-A of the slot 213 is close to the strip 211, and an opening 215 may be disposed on the side 213-A. The opening 215 may be disposed at the middle position of the side 213-A, or may be disposed at a position deviating from the middle position. In some embodiments, the side 213-A may be referred to as a first side.

The strip 211 may have a connection point A and a connection point B. The strip 211 may be connected to a strip 217 at the connection point A, and the strip 211 may be connected to a strip 219 at the connection point B. The strip 217 may be configured to connect the side 213-A of the slot 213 and the strip 211 at one end (an end C) of the opening 215. The strip 219 may be configured to connect the side 213-A of the slot 213 and the strip 211 at the other end (an end D) of the opening 215. In some embodiments, the connection point A and the connection point B may be respectively referred to as a first connection point and a second connection point. In some embodiments, the strip 217 and the strip 219 may be respectively referred to as a first strip and a second strip.

A feed may be connected at the opening 215. At the opening 215, the positive electrode of the feed is connected to the strip 217 at one end (the end C) of the opening 215, and the negative electrode of the feed is connected to the strip 219 at the other end (the end D) of the opening 215.

The following describes a resonance mode that may be generated by an antenna structure example shown in FIG. 22A.

Figure 22B:
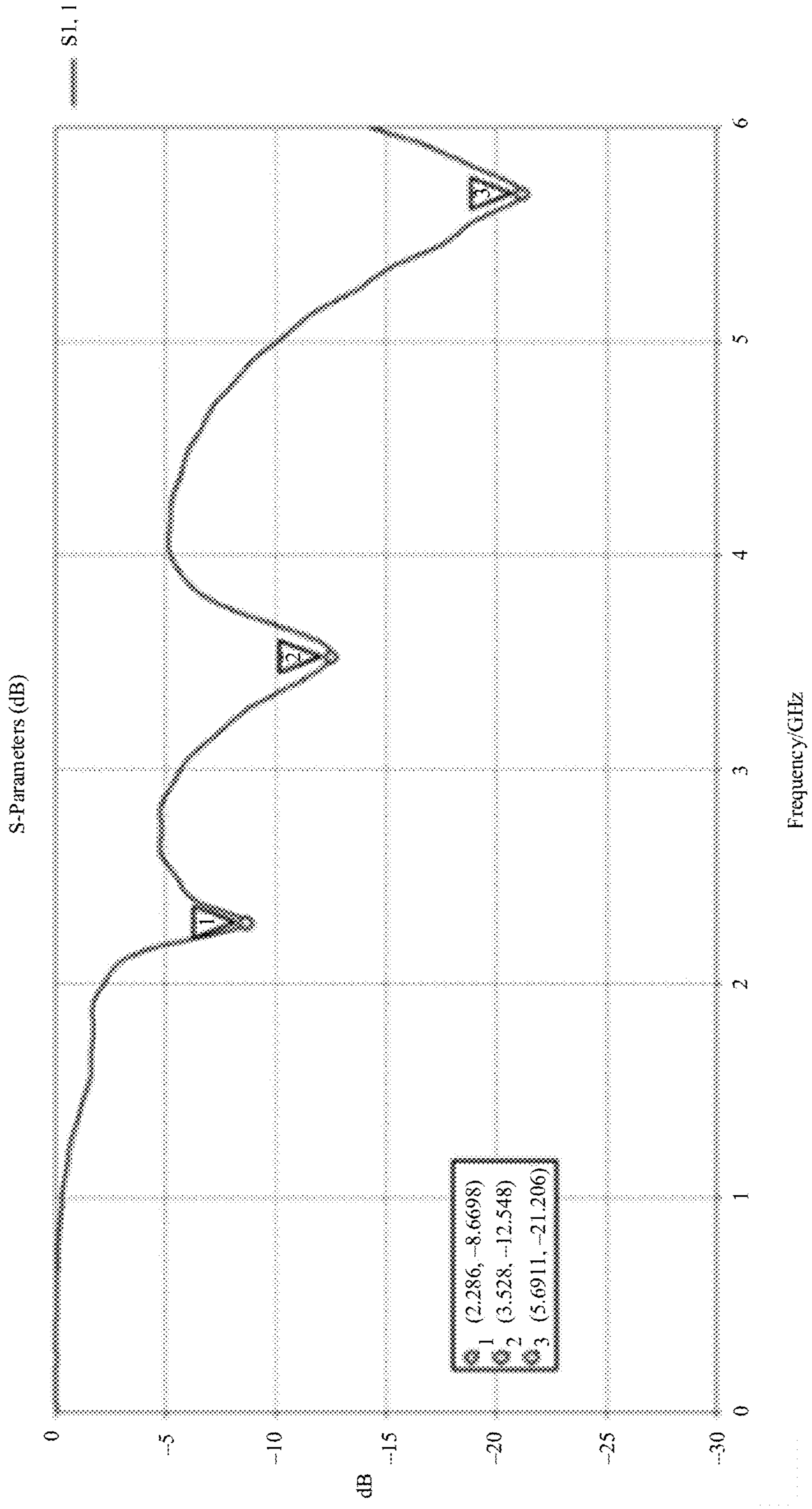
FIG. 22B shows a resonance mode generated by an antenna structure shown in FIG. 22A.

Referring to FIG. 22B, “1”, “2”, and “3” in FIG. 22B represent different resonances. The antenna structure may generate the resonance “1” in the vicinity of 2.28 GHz, the resonance “2” in the vicinity of 3.5 GHz, and the resonance “3” in the vicinity of 5.7 GHz. Specifically, the resonance “1” may be generated by a half-wavelength mode of the strip 211, and is a resonance of the DM wire antenna mode. The resonance “2” may be generated by a quarter-wavelength mode of the slot 213, and is a resonance of the CM slot antenna mode. The resonance “3” may be generated by a multiplied frequency (triple frequency) of the half-wavelength mode of the strip 211.

Figure 22C:
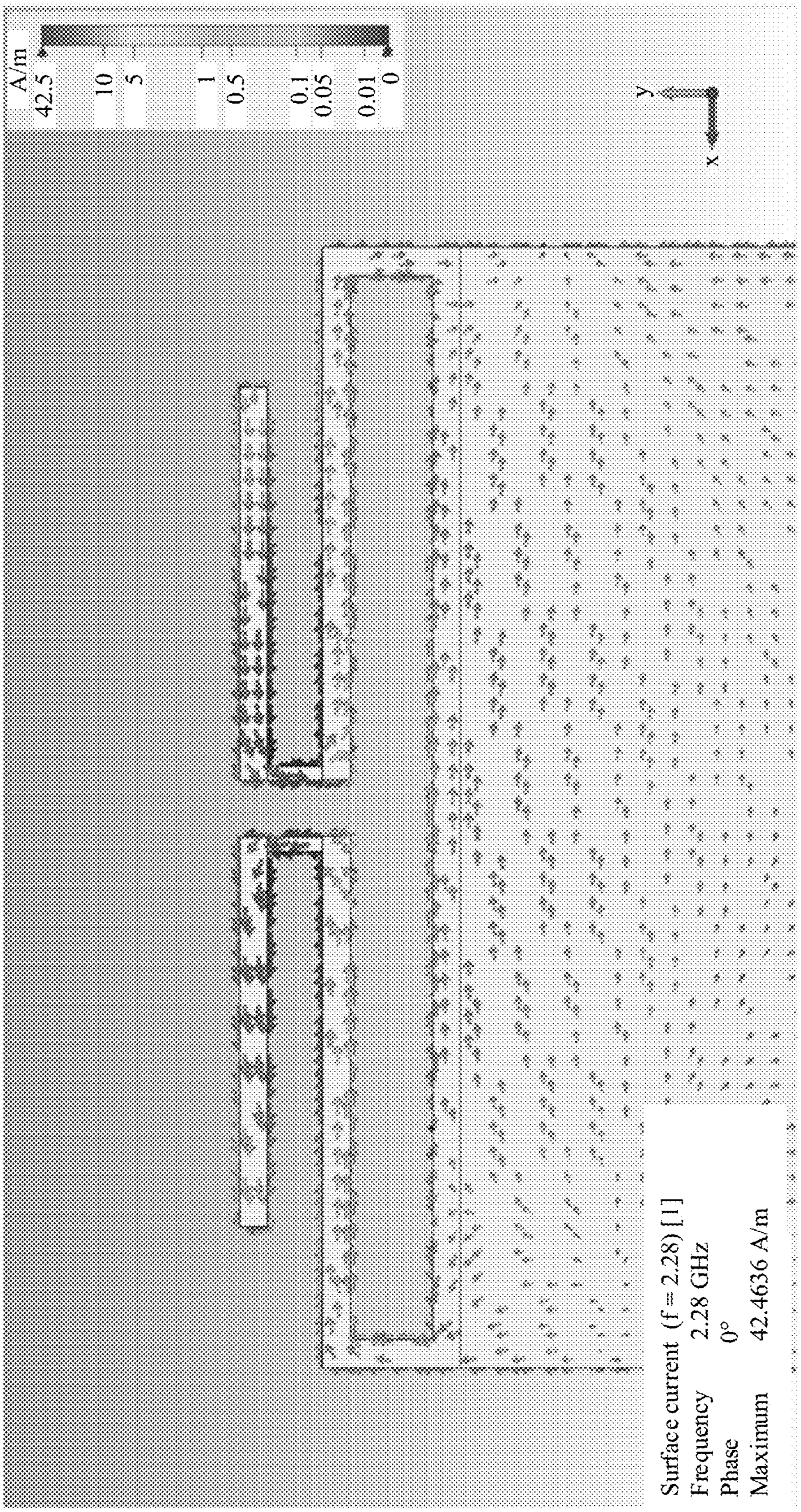
FIG. 22C to FIG. 22E show current distribution of each resonance in FIG. 22B.
Figure 22D:
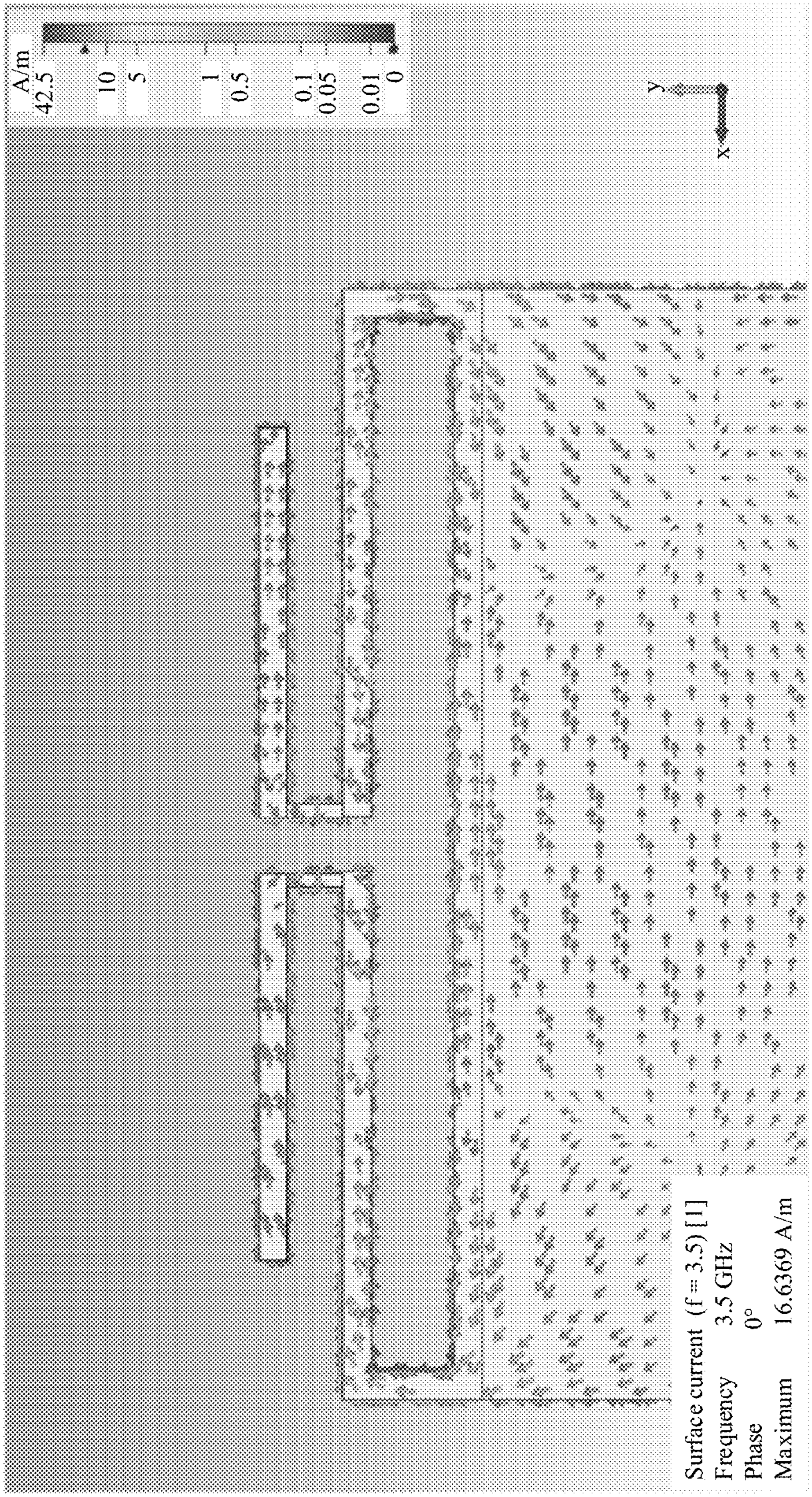
Figure 22E:
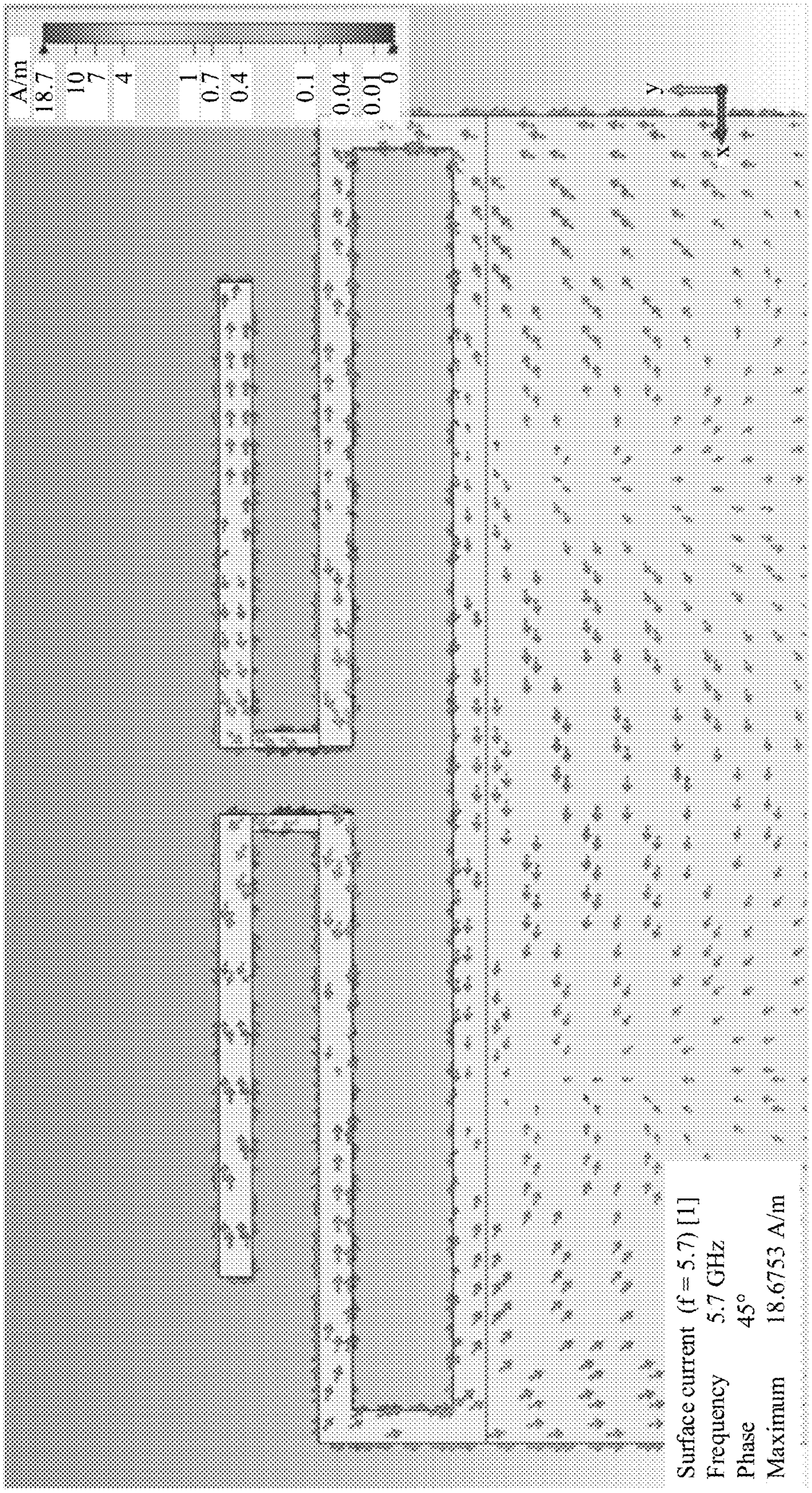

FIG. 22C to FIG. 22E show current distribution examples of the resonances “1”, “2”, and “3”. As shown in FIG. 22C, a current of the resonance “1” is distributed in a same direction on the strip 211, and is strong in a middle of the strip 211 and weak at two ends of the strip 211. The current of the resonance “1” is a current generated by the half-wavelength mode of the strip 211, and is a current of the DM wire antenna mode. As shown in FIG. 22D, a current of the resonance “2” is distributed in opposite directions surrounding the slot 213, and the current is strong at two ends of the slot 213 and weak in a middle of the slot 213. The current of the resonance “2” is a current generated by the quarter-wavelength mode of the slot 213, and is a current of the CM slot antenna mode. As shown in FIG. 22E, a current of the resonance “3” is distributed in a same direction on the strip 211, and is strong in a middle of the strip 211 and weak at two ends of the strip 211. The current of the resonance “3” is a current generated by the multiplied frequency (triple frequency) of the half-wavelength mode of the strip 211, and is a current of the DM wire antenna mode.

A wavelength mode in which the strip 211 generates the resonance “1” is not limited, and the resonance “1” may alternatively be generated by a three-half wavelength mode or the like of the strip 211. A wavelength mode in which the slot 213 generates the resonance “2” is not limited, and the resonance “2” may alternatively be generated by a three-quarter wavelength mode or the like of the slot 213.

In addition to the 2.28 GHz frequency band, the 3.5 GHz frequency band, and the 5.7 GHz frequency band shown in FIG. 22B, the antenna structure example shown in FIG. 22A may generate a resonance of another frequency band, which may be set by adjusting sizes of strips (for example, the strip 211 and the slot 213) in the antenna structure.

When the opening 215 of the slot 213 is disposed at a position deviating from the middle position of the side 213-A, the antenna structure example shown in FIG. 22A may cover more frequency bands.

It may be teamed that, in the antenna design solution provided in Embodiment 14, a DM wire antenna and a CM slot antenna are combined, to obtain an antenna structure having strip features of both the DM wire antenna and the CM slot antenna. A single feed design may be used to excite the DM wire antenna mode and the CM slot antenna mode, to cover a plurality of frequency bands.

Various slots mentioned in the foregoing embodiments may alternatively be formed by slotting a ground plate (metal plate) other than a PCB 17.

In an embodiment of this application, a wavelength in a wavelength mode (for example, a half-wavelength mode or a quarter-wavelength mode) of an antenna may be a wavelength of a signal radiated by the antenna. For example, the half-wavelength mode of the antenna may generate a resonance in a 2.4 GHz frequency band, where a wavelength in the half-wavelength mode is a wavelength of a signal radiated by the antenna in the 2.4 GHz frequency band. It should be understood that a wavelength of a radiated signal in the air may be calculated as follows: Wavelength=Speed of light/Frequency, where the frequency is a frequency of the radiated signal. A wavelength of a radiated signal in a medium may be calculated as follows: Wavelength=(Speed of light/$\sqrt{\varepsilon}$)/Frequency, where $\varepsilon$ is a relative dielectric constant of the medium, and the frequency is a frequency of the radiated signal.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An antenna apparatus, wherein the antenna apparatus comprises a strip radiator, and a feed point and a ground point are disposed on the strip radiator;

the ground point is connected to a grounding stub, and the grounding stub is configured for grounding of the strip radiator, and a sum of a distance between the feed point and the ground point and a length of the grounding stub is less than a quarter of a first wavelength, wherein a first current and a second current with different frequencies are distributed on the strip radiator, directions of the first current on two sides of the feed point are opposite, and directions of the second current on the two sides of the feed point are the same, the first wavelength corresponds to a frequency of the first current.

2. The antenna apparatus according to claim 1, wherein the strip radiator comprises a first end and a second end, a distance from the feed point to the first end of the strip radiator is not equal to a distance from the feed point to a second end of the strip radiator.

3. The antenna apparatus according to claim 1, wherein the antenna apparatus comprises a metal plate, the metal plate is grounded, and the grounding stub is connected to the metal plate, wherein a third current is distributed on the metal plate, and a frequency of the third current is different from the frequencies of the first current or the second current.

4. The antenna apparatus according to claim 3, wherein the frequency of the third current is lower than the frequencies of the first current and the second current.

5. The antenna apparatus according to claim 1, wherein the grounding stub is a metal dome disposed on the metal plate and connected to the strip radiator.

6. The antenna apparatus according to claim 1, wherein the antenna apparatus is disposed in an electronic device having a metal bezel, and the strip radiator is a part of the metal bezel of the electronic device.

7. An antenna apparatus, wherein the antenna apparatus comprises a strip radiator, a feed point is disposed on the strip radiator and no ground point is disposed on the strip radiator, the feed point is away from a middle position of the strip conductor;

wherein a first current and a second current with different frequencies are distributed on the strip radiator, directions of the first current on two sides of the feed point are opposite, and directions of the second current on the two sides of the feed point are the same.

8. The antenna apparatus according to claim 7, wherein the strip radiator comprises a first end and a second end, a distance from the feed point to the first end of the strip radiator is not equal to a distance from the feed point to a second end of the strip radiator.

9. The antenna apparatus according to claim 7, wherein a third current is distributed on the strip radiator, and the frequency of the third current is different from the frequencies of the first current and the second current.

10. The antenna apparatus according to claim 7, wherein the antenna apparatus is disposed in an electronic device having a metal bezel, and the strip radiator is a part of the metal bezel of the electronic device.

* * * * *